US012808307B2

(12) United States Patent
Bandhauer et al.

(10) Patent No.: US 12,808,307 B2
(45) Date of Patent: Nov. 24, 2026

(54) SYNERGISTIC HEAT PUMPED THERMAL STORAGE AND FLEXIBLE CARBON CAPTURE SYSTEM

(71) Applicants: Colorado State University Research Foundation, Fort Collins, CO (US); Bright Generation Holdings LLP, Arvada, CO (US)

(72) Inventors: Todd M. Bandhauer, Fort Collins, CO (US); Daniel Herber, Fort Collins, CO (US); Braden Limb, Fort Collins, CO (US); Jason Quinn, Fort Collins, CO (US); Shane Garland, Fort Collins, CO (US); Ethan Markey, Fort Collins, CO (US); Roberto Vercellino, Fort Collins, CO (US); Miles Abarr, Fort Collins, CO (US); Joe Huyett, Fort Collins, CO (US)

(73) Assignee: Colorado State University Research Foundation, Fort Collins, CO (US)

(*) Notice: Subject to any disclaimer, the term of this patent is extended or adjusted under 35 U.S.C. 154(b) by 0 days.

(21) Appl. No.: 18/704,419

(22) PCT Filed: Oct. 25, 2022

(86) PCT No.: PCT/US2022/047763
§ 371 (c)(1),
(2) Date: Apr. 24, 2024

(87) PCT Pub. No.: WO2023/076299
PCT Pub. Date: May 4, 2023

(65) Prior Publication Data

US 2025/0122815 A1 Apr. 17, 2025

Related U.S. Application Data

(63) Continuation-in-part of application No. PCT/US2021/072129, filed on Oct. 29, 2021.

(Continued)

(51) Int. Cl.
*F02C 6/14* (2006.01)
*F01K 3/12* (2006.01)
(Continued)

(52) U.S. Cl.
CPC .............. *F01K 3/12* (2013.01); *F01K 17/025* (2013.01); *F01K 23/10* (2013.01); *F02C 6/04* (2013.01); *F02C 6/14* (2013.01); *F02C 6/18* (2013.01)

(58) Field of Classification Search
CPC ...... F01K 17/005; F01K 17/025; F01K 17/04; F01K 23/10; F02C 6/14; F02C 6/18; Y02E 20/18
See application file for complete search history.

(56) References Cited

U.S. PATENT DOCUMENTS

2004/0148922 A1* 8/2004 Pinkerton ................ F02C 7/08 60/670
2005/0236602 A1 10/2005 Viteri et al.
(Continued)

FOREIGN PATENT DOCUMENTS

BR 112019013453 A2 12/2019
EP 2603762 B1 10/2019
(Continued)

OTHER PUBLICATIONS

Conventional Energy. Natural Gas Fired Electricity Generation Market Size, Share & Trends analysis Report by Technology (Open Cycle, Combined Cycle), By End Use (Power & Utility, Industrial), By Region, and Segment Forecasts, 2020-2027, 7 pgs.
(Continued)

*Primary Examiner* — Gerald L Sung
(74) *Attorney, Agent, or Firm* — Robinson IP Law, PLLC

(57) ABSTRACT

A power plant system is disclosed. The power plant system includes a combustor, a turbine configured to generate electricity, a carbon capture system configured to remove at least a portion of carbon-based gasses from the flue gas downstream from the combustor, and a thermal storage system including a hot storage unit configured to store heat generated at least by resistively-heated gas at a hot tempera-
(Continued)

ture, the hot temperature greater than ambient temperature. The power plant is configured to operate in at least a first mode for storing thermal energy in the thermal storage system and a second mode for releasing the stored thermal energy from the thermal storage system and during the second mode, heat stored in the hot storage unit is transferred to the carbon capture system.

16 Claims, 48 Drawing Sheets

Related U.S. Application Data

(60) Provisional application No. 63/273,800, filed on Oct. 29, 2021, provisional application No. 63/262,998, filed on Oct. 25, 2021, provisional application No. 63/262,996, filed on Oct. 25, 2021, provisional application No. 63/107,915, filed on Oct. 30, 2020.

(51) Int. Cl.

| | |
|---|---|
| ***F01K 17/02*** | (2006.01) |
| ***F01K 23/10*** | (2006.01) |
| ***F02C 6/04*** | (2006.01) |
| ***F02C 6/18*** | (2006.01) |

(56) References Cited

U.S. PATENT DOCUMENTS

| | | | | |
|---|---|---|---|---|
| 2013/0125525 | A1* | 5/2013 | Hein | F01K 23/10 60/659 |
| 2013/0139543 | A1* | 6/2013 | Baxter | F25J 1/0245 62/611 |
| 2013/0312386 | A1 | 11/2013 | Wirsum et al. | |
| 2014/0060064 | A1 | 3/2014 | Agostinelli et al. | |
| 2015/0267612 | A1* | 9/2015 | Bannari | F02C 6/16 60/659 |
| 2016/0177822 | A1* | 6/2016 | Howes | F02C 6/16 60/785 |
| 2018/0221807 | A1* | 8/2018 | Sinatov | F25J 1/0242 |
| 2019/0353100 | A1* | 11/2019 | Mokheimer | F22B 1/1815 |
| 2020/0056511 | A1 | 2/2020 | Conlon | |
| 2020/0173692 | A1 | 6/2020 | Buscheck et al. | |
| 2022/0389844 | A1* | 12/2022 | Zemlak | F02C 6/18 |
| 2023/0366350 | A1* | 11/2023 | Prabhudharwadkar | F02C 6/16 |
| 2023/0392523 | A1 | 12/2023 | Bandhauer et al. | |

FOREIGN PATENT DOCUMENTS

| | | | |
|---|---|---|---|
| WO | WO 2018/125638 | A2 | 7/2018 |
| WO | WO 2021/205011 | A1 | 10/2021 |
| WO | WO 2023/076299 | A1 | 5/2023 |

OTHER PUBLICATIONS

Da Venne TR et al. An Analysis of Pumped Thermal Energy Storage with De-coupled Thermal Stores. Frontiers in Energy Research 8:160 (Aug. 2020).

EPA. Literature Survey of Carbon Capture Technology. Technical Support Document Jul. 10, 2015, 58 pgs.

International Search Report and Written Opinion, PCT/US2021/072129, dated Jan. 28, 2022, 10 pgs.

Leung D et al. An overview of current status of carbon dioxide capture and storage technologies. Renewable and Sustainable Energy Reviews 39 (2014) 426-443.

Luis P. Use of monoethanolamine (MEA) for $CO_2$ capture in a global scenario: Consequences and alternatives. Desalination 380 (2016) 93-99.

Non-Final Office Action, U.S. Appl. No. 18/034,469, dated Jun. 28, 2024, 17 pgs.

International Search Report and Written Opinion, PCT/US2022/047763, dated Mar. 20, 2023.

* cited by examiner

SYNERGISTIC HEAT PUMPED THERMAL STORAGE AND FLEXIBLE CARBON CAPTURE SYSTEM

CROSS REFERENCE TO RELATED APPLICATION

This Patent Cooperation Treaty (PCT) application is related to and claims priority from Int'l Patent Application No. PCT/US2021/072129 filed Oct. 29, 2021, titled "Synergistic Heat Pumped Thermal Storage and Flexible Carbon Capture System", U.S. Provisional Patent Application No. 63/273,800 filed Oct. 29, 2021, titled "Synergistic Heat Pumped Thermal Storage and Flexible Carbon Capture System", U.S. Provisional Patent Application No. 63/262,996 filed Oct. 25, 2021, titled "Resistively Heated Thermal Storage and Flexible Carbon Capture System", and U.S. Provisional Patent Application No. 63/262,998 filed Oct. 25, 2021, titled "Synergistic Heat Pumped Thermal Storage and Flexible Carbon Capture System", the entirety of each is incorporated by reference herein.

This application is also related to and incorporates by reference in its entirety U.S. Provisional Patent Application No. 63/107,915 filed Oct. 30, 2020, titled "Thermal Storage Configurations for NGCG-SWITCC".

STATEMENT REGARDING FEDERALLY SPONSORED RESEARCH OR DEVELOPMENT

This invention was made with government support under grant number DE-AR0001306 awarded by the Department of Energy. The Government has certain rights in the invention.

FIELD OF THE INVENTION

This application relates to heat-pumped thermal storage systems. In particular, this application relates to heat-pumped, direct extraction, and resistively heated thermal storage systems that enable load shifting to achieve high net plant capacities.

BACKGROUND OF THE INVENTION

As the power grid evolves toward reducing carbon emissions, fossil generation assets need to operate in highly variable renewable energy penetration markets while also decreasing carbon emissions. Post combustion carbon capture is a technology which has been gaining popularity due to the ability to capture 90% or greater of power plant $CO_2$ emissions. However, systems implementing carbon capture technology typically have not been cost effective at low capacity factors and flexible operating conditions required in highly variable renewable energy penetration markets. Carbon capture systems are sized based on the maximum $CO_2$ flow rates emanating from the fossil fuel power plant. Furthermore, the energetic requirement for all carbon capture systems is driven by heat required for solvent regeneration, which is typically supplied by ~150° C. steam from a heat recovery steam generator, reducing net power production and increasing the levelized cost of electricity. Also, in highly variable renewable energy markets, power plants operate dynamically, sending less energy to the grid when electricity prices are low, exacerbating cost pressures by reducing capacity factor. Thus, a need exists for a power plant system to increase net plant capacity and peak power output while continuously capturing a high amount of $CO_2$.

SUMMARY OF THE INVENTION

In a first exemplary embodiment of the present invention, a power plant system is disclosed. The system may include a carbon-based fuel-fired power plant including a combustor configured to receive and combust air and a carbon-based fuel thereby producing heat and exhausting a flue gas, and a turbine configured to generate electricity. The power plant system may also include a carbon capture system configured to remove at least a portion of carbon-based gasses from the flue gas downstream from the combustor and a thermal storage system including a hot storage unit configured to store heat generated at least by resistively-heated gas at a hot temperature, the hot temperature greater than ambient temperature. The power plant system may be configured to operate in at least a first mode for storing thermal energy in the thermal storage system and a second mode for releasing the stored thermal energy from the thermal storage system. During the second mode, heat stored in the hot storage unit may be transferred to the carbon capture system.

In some versions of the first embodiment, the resistively-heated air may be generated by a resistive heater powered by electricity from the power grid. The thermal storage system may include a cold storage unit configured to store thermal energy at a cold temperature, the cold temperature less than ambient temperature, and during the second mode, before the air is combusted in the combustor, the air may be configured to transfer heat to the cold storage unit thereby lowering the temperature of the air received in the combustor. The thermal storage system may include a first heat pump using a refrigerant as a first working fluid and a second heat pump using a second refrigerant as a second working fluid, the first refrigerant may be configured to transfer heat from the cold storage unit and the second refrigerant may be configured to transfer heat to the hot storage unit, and the second refrigerant may be steam. The thermal storage system may include a heat pump configured to use the flue gas as a working fluid. The thermal storage system may include a heat pump configured to use air as a working fluid. The flue gas may be configured to transfer heat to the air in the heat pump during the first mode. The thermal storage system may include a heat pump configured to use steam as a working fluid. The flue gas may be configured to transfer heat to the steam in the heat pump during the first mode but not in the second mode. The power plant may further include a heat recovery steam generator including at least one heat exchanger and at least one steam turbine, the at least one heat exchanger configured to receive the flue gas and transfer heat from the flue gas to a fluid before the fluid enters the at least one steam turbine. Steam from the heat recovery steam generator may be configured to transfer heat to the steam in the heat pump during the first mode. Steam from the heat recovery steam generator may be configured to be the working fluid. Steam from the heat recovery steam generator may be configured to transfer heat to the hot storage unit during the first mode.

In a second exemplary embodiment of the present invention, a power plant system is disclosed. The system may include a carbon-based fuel-fired power plant including a combustor configured to receive and combust air and a carbon-based fuel thereby producing heat and exhausting a flue gas, and a turbine configured to generate electricity. Also, the power plant system may include a carbon capture system configured to remove at least a portion of carbon-based gasses from the flue gas downstream from the combustor. The power plant system may include a thermal storage system including a hot storage unit configured to store heat generated at a hot temperature, the hot temperature greater than ambient temperature. The power plant system may be configured to operate in at least a first mode for storing thermal energy in the thermal storage system and a second mode for releasing the stored thermal energy from the thermal storage system. The hot storage unit may include one or more concrete blocks having a plurality of channels therein. During the second mode, heat stored in the hot storage unit may be transferred to the carbon capture system.

In some versions of the second exemplary embodiment, the thermal storage system may include a heat pump configured to use the flue gas as a working fluid. The thermal storage system may include a heat pump configured to use air as a working fluid. The thermal storage system may include a heat pump configured to use steam as a working fluid. The power plant may further include a heat recovery steam generator including at least one heat exchanger and at least one steam turbine, the at least one heat exchanger configured to receive the flue gas and transfer heat from the flue gas to a fluid before the fluid enters the at least one steam turbine. Steam from the heat recovery steam generator may be configured to transfer heat to the steam in the heat pump during the first mode. Steam from the heat recovery steam generator may be configured to transfer heat to the hot storage unit during the first mode. The thermal storage system may include a resistive heater and the hot storage unit may be configured to store heat generated by the resistive heater during the first mode. Also, the resistive heater may be powered by electricity from the power grid. The resistive heater may be configured to transfer heat to the hot storage unit via a gas. In addition, at least some of the plurality of channels in the one or more concrete blocks may include metallic pipes and the resistive heater may be configured to transfer heat to the hot storage unit via a fluid flowing through the metallic pipes. The resistive heater may be embedded within the concrete of the hot storage unit. The thermal storage system may include a cold storage unit configured to store thermal energy at a cold temperature, the cold temperature less than ambient temperature, and during the second mode, before the air is combusted in the combustor the air may be configured to transfer heat to the cold storage unit thereby lowering the temperature of the air received in the combustor. The thermal storage system may include a first heat pump using a refrigerant as a first working fluid and a second heat pump using a second refrigerant as a second working fluid, and the first refrigerant may be configured to transfer heat from the cold storage unit and the second refrigerant may be configured to transfer heat to the hot storage unit. The second refrigerant may be steam.

In a third exemplary embodiment of the present invention, a method of operating the first exemplary power plant system discussed above is disclosed. The method may include generating, with the power plant system, electricity to be supplied to a power grid; determining, with a controller, when to begin the first mode for temporarily storing thermal energy with the thermal storage system; determining, with the controller, when to begin the second mode for transferring heat from the hot storage unit to the carbon capture system; and transferring, during the second mode, heat from the hot storage unit to the carbon capture system.

In some versions of the third exemplary embodiment, the method may further include resistively-heating the air with a resistive heater powered by electricity from the power grid.

In a fourth exemplary embodiment of the present invention, a method of operating the second exemplary power plant system discussed above is disclosed. The method may include generating, with the power plant system, electricity to be supplied to a power grid; determining, with a controller, when to begin the first mode for temporarily storing thermal energy with the thermal storage system; determining, with the controller, when to begin the second mode for transferring heat from the air to the cold storage unit; and transferring, during the second mode, heat from the air to the cold storage unit.

In some versions of the fourth exemplary embodiment, the method may further include resistively-heating the air with a resistive heater powered by electricity from the power grid.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION

Figure 1:
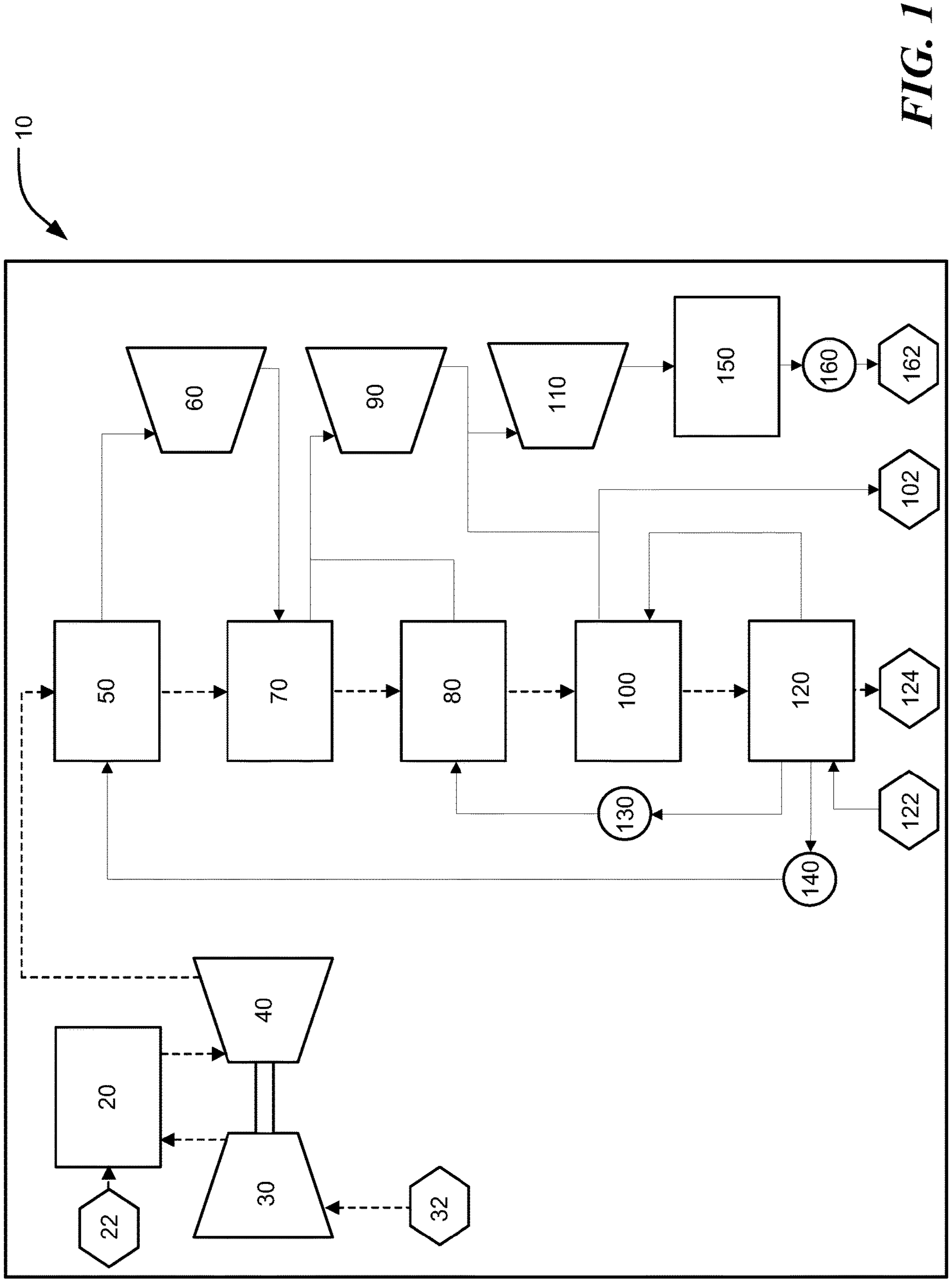
FIG. 1 is a block diagram of a partial base power plant including a natural gas-fired combined cycle power plant and a heat recovery steam generator according to an exemplary embodiment of the present disclosure.

Reference will now be made in detail to the exemplary embodiments, which are illustrated in the accompanying drawings. Wherever possible, the same reference numbers will be used throughout the drawings to refer to the same or like parts.

Described herein are synergistic heat pumped thermal storage and flexible carbon capture systems. More specifically, power plants having thermal energy storage with the ability to switch between a charging mode, a discharging mode, and a bypass mode are described herein. FIGS. 1-46 show various embodiments of natural gas-fired combined cycle power plants each combined with a carbon capture system and thermal energy storage systems. Exemplary temperatures, pressures, mass flow rates, etc. for each position in the aforementioned power plants are provided in U.S. provisional application Nos. 63/262,996 and 63/262,998, which are incorporated by reference in its entirety. For any discrepancies between FIGS. 1-46 and corresponding figures in the '996 and '998 applns., the figures in the '996 and '998 applns. are controlling. In other embodiments, coal or any other combustible fuel may be used. Each of power plants 1-1U discussed below has a charging mode and a discharging mode and are configured to capture 0-50%, at least 50%, at least 75%, at least 85%, at least 90% or preferably at least 95% of $CO_2$ emissions during times of low energy demand and also at peak energy demand. During peak energy demand, electricity prices may be at a premium and at low demand electricity prices are typically much lower. Thus, at peak energy demand, it may be profitable for power plants to be at or near full capacity. At low energy demands, the power plants 1-1U may use electricity generated by the power plants 1-1U or electricity from the grid to run various compressors, pumps, resistive heaters, etc. to generate excess thermal energy that can be stored for when demand is high. When demand is high, the stored thermal energy may help provide the heat required to regenerate solvent in the carbon capture system and permit the power plants 1-1U to continue to operate at or near full capacity while still performing carbon dioxide removal. Other carbon capture systems may include aqueous ammonia recovery and membrane separation.

FIGS. 1-4 show partial base power plants 10-10C, each including a natural gas-fired combined cycle power plant and a heat recovery steam generator. Although a heat recovery steam generator is depicted in the figures, other embodiments may omit the heat recovery steam generator, such that the power plant outputs directly to a carbon capture system. FIGS. 5-46 show one of the partial base power plants 10-10C integrated with a carbon capture system and various thermal storage systems and can be grouped generally into FIGS. 5-16, which illustrate resistively heated thermal storage systems; FIGS. 17-26, which illustrate Brayton cycle heat pumps; FIGS. 27-38, which illustrate vapor compression heat pumps; and FIGS. 39-46; which illustrate heat recovery steam generators with steam extraction for storage. Each of the power plants 1-1U may have a capacity of 0-100 MW, 100-200 MW, 200-300 MW, 300-400 MW, 400-500 MW, 500-600 MW, 600-700 MW, 700-800 MW, 800-900 MW, 900-1,000 MW, or greater than 1000 MW. Another way to put it, the power plants 1-1U may have a capacity of >100 MW, >200 MW, >300 MW, >400 MW, >500 MW, >600 MW, >700 MW, >800 MW, or >900 MW.

FIG. 1 shows a partial base power plant 10. The power plant 10 includes a compressor 30 which receives air from an air source 32. Although the compressor 30 is shown as a single component in FIG. 1, the compressor 30 may represent one or more compressors. Likewise, all other components shown in the figures may represent one or more of that component. Returning to FIG. 1, the air may be ambient air or chilled air as is discussed in more detail below with respect to FIGS. 5-46. The compressed air flows into a combustor 20, which also receives fuel from a fuel source 22. The exemplary embodiments discussed herein are configured to use natural gas as a fuel, but other combustible gasses may be used instead without departing from the inventive concept. The fuel and air are combusted in the combustor 20 and then the exhaust flue gas flows through a gas turbine 40 causing rotation where work can be extracted.

The power plant 10 may be a combined-cycle power plant having a heat recovery steam generator where the heat from the flue gas may be extracted and used to help generate steam for feeding into steam turbines to generate power. For example, the flue gas from the gas turbine 40 may be fed into a high pressure heat exchanger 50 where heat is transferred from the flue gas to pre-heated water recovered from downstream processes and routed from a low-pressure economizer 120 and a high pressure pump 140 (discussed in more detail below), thus, generating high pressure steam for driving a high pressure steam turbine 60. The high-pressure turbine 60 may also be used for generating work.

After passing through the steam turbine 60, the steam may be fed to an intermediate pressure reheater 70. The intermediate pressure reheater 70 also utilize flue gas to reheat the steam, thus, generating intermediate pressure steam for driving an intermediate pressure steam turbine 90. The intermediate pressure steam may also include steam from an intermediate pressure heat exchanger 80. The intermediate pressure heat exchanger 80 receives water from the low-pressure economizer 120 and a low-pressure pump 130. Heat from the flue gas is transferred to the water in the intermediate pressure heat exchanger 80 where, after heating, it may combine with the steam from the intermediate pressure reheater 70 for driving the intermediate pressure steam turbine 90. The intermediate pressure turbine 90 may also be used for generating work.

The steam exiting the intermediate pressure turbine 90 may combine with steam from a low-pressure heat exchanger 100 and once combined may be split and routed to a low-pressure steam turbine 110 and a carbon capture system 170 (FIGS. 5-46) at an inlet 102. The low-pressure heat exchanger 100 may receive water from the low-pressure economizer 120 and the flue gas downstream from the intermediate pressure heat exchanger 80. Heat from the flue gas may be transferred to evaporate the water in the low-pressure heat exchanger 100 before it combines with steam exiting the intermediate pressure steam turbine 90. A portion of the combined steam is routed to an input 102 of the carbon capture system 170 (which is discussed in more detail below) and the remaining portion is routed to drive the low-pressure steam turbine 110. The intermediate pressure turbine 90 may also be used for generating work.

The steam exiting the low-pressure steam turbine 110 may then be routed to a condenser 150 to convert it to water. Next the water is pumped by a condensate pump 160 from an outlet 162 to a valve 185 and then a reheater 190 as shown in FIGS. 5-46 and discussed below. At the same time, the flue gas is used in the low-pressure economizer 120 where it may heat the water that supplies the low-pressure heat exchanger 100, the intermediate pressure heat exchanger 80, and the high pressure heat exchanger 50 as previously discussed. Water in the low-pressure economizer 120 may be supplied at an inlet 122 from the preheater 190. Also, the flue gas exits the low-pressure economizer 120 at an exit 124, where it may be routed to various components of the plant as is discussed with regard to FIGS. 5-46.

Figure 2:
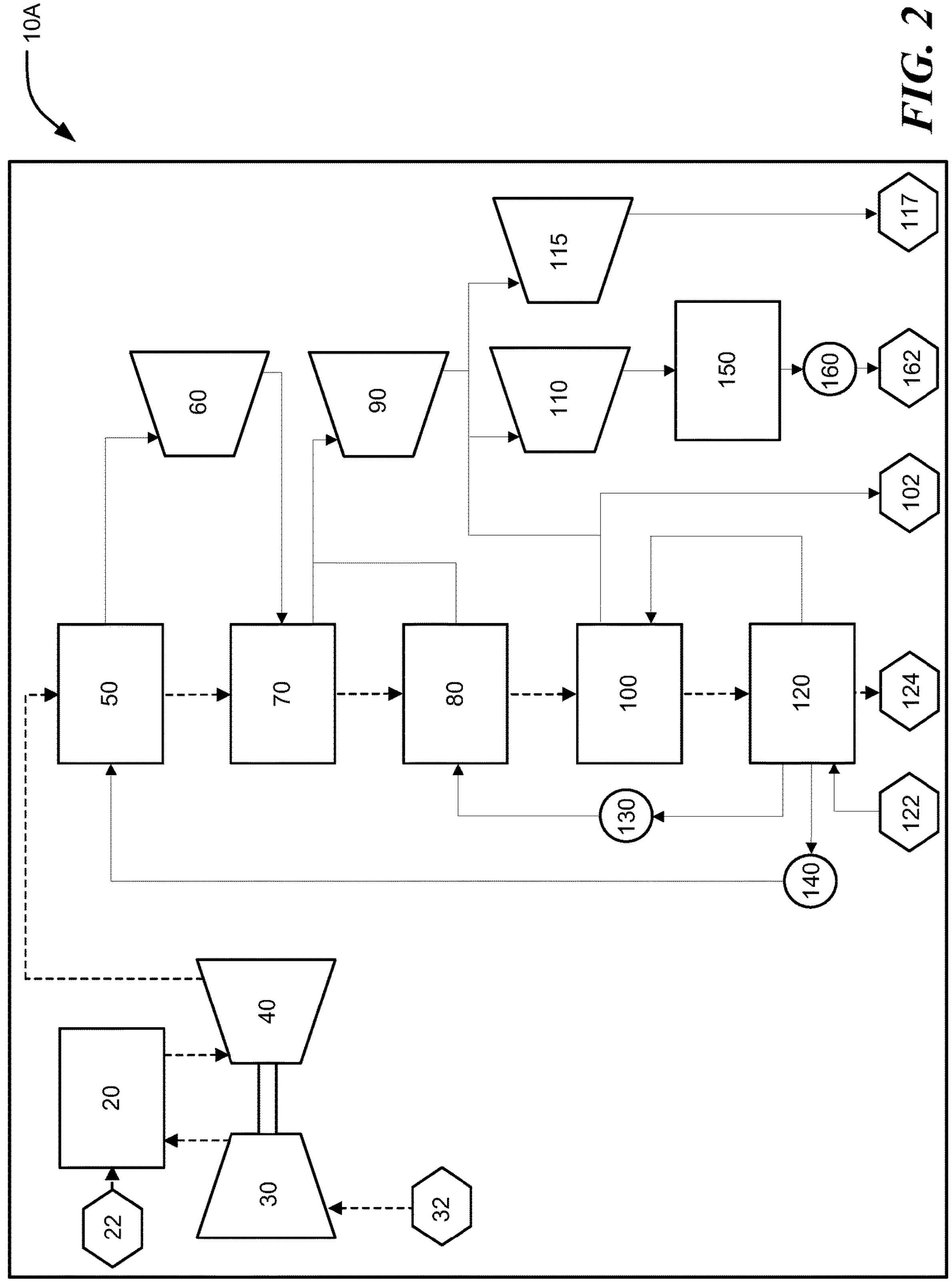
FIG. 2 is a block diagram of a partial base power plant including a natural gas-fired combined cycle power plant and a heat recovery steam generator according to another exemplary embodiment of the present disclosure.

FIG. 2 shows a partial base power plant 10A which is substantially the same as the power plant 10 except for the inclusion of a second low-pressure steam turbine 115, which may receive water in parallel with the low-pressure steam turbine 110. The second low-pressure steam turbine 115 may output water at an exit 117 to a heat exchanger 380, which is discussed in more detail with regard to FIGS. 33-36.

Figure 3:
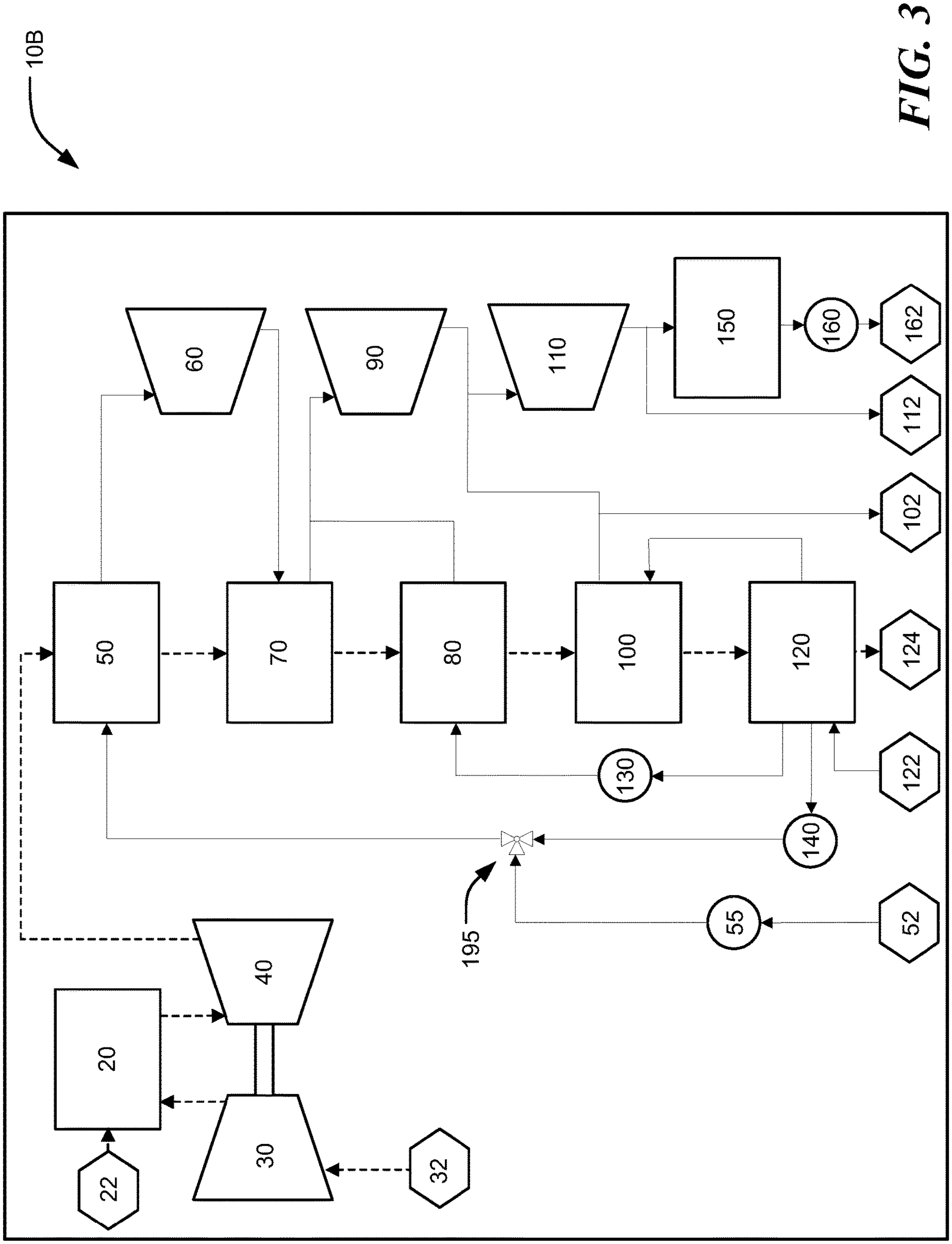
FIG. 3 is a block diagram of a partial base power plant including a natural gas-fired combined cycle power plant and a heat recovery steam generator according to another exemplary embodiment of the present disclosure.

FIG. 3 shows a partial base power plant 10B which is substantially the same as the power plant 10 except for a valve 195 is positioned between the high pressure pump 140 and the high pressure heat exchanger 50, which has a third input for receiving water at an inlet 52 of a pump 55 from a hot storage unit 340. The hot storage unit 340 is discussed in more detail with regard to FIGS. 39-42. The partial base power plant 10B also deviates from the power plant 10 in that some of the water leaving the low-pressure steam turbine 110 before entering the condenser 150 is routed to an inlet 112 of a compressor 360, which is also discussed in more detail with regard to FIGS. 39-42.

Figure 4:
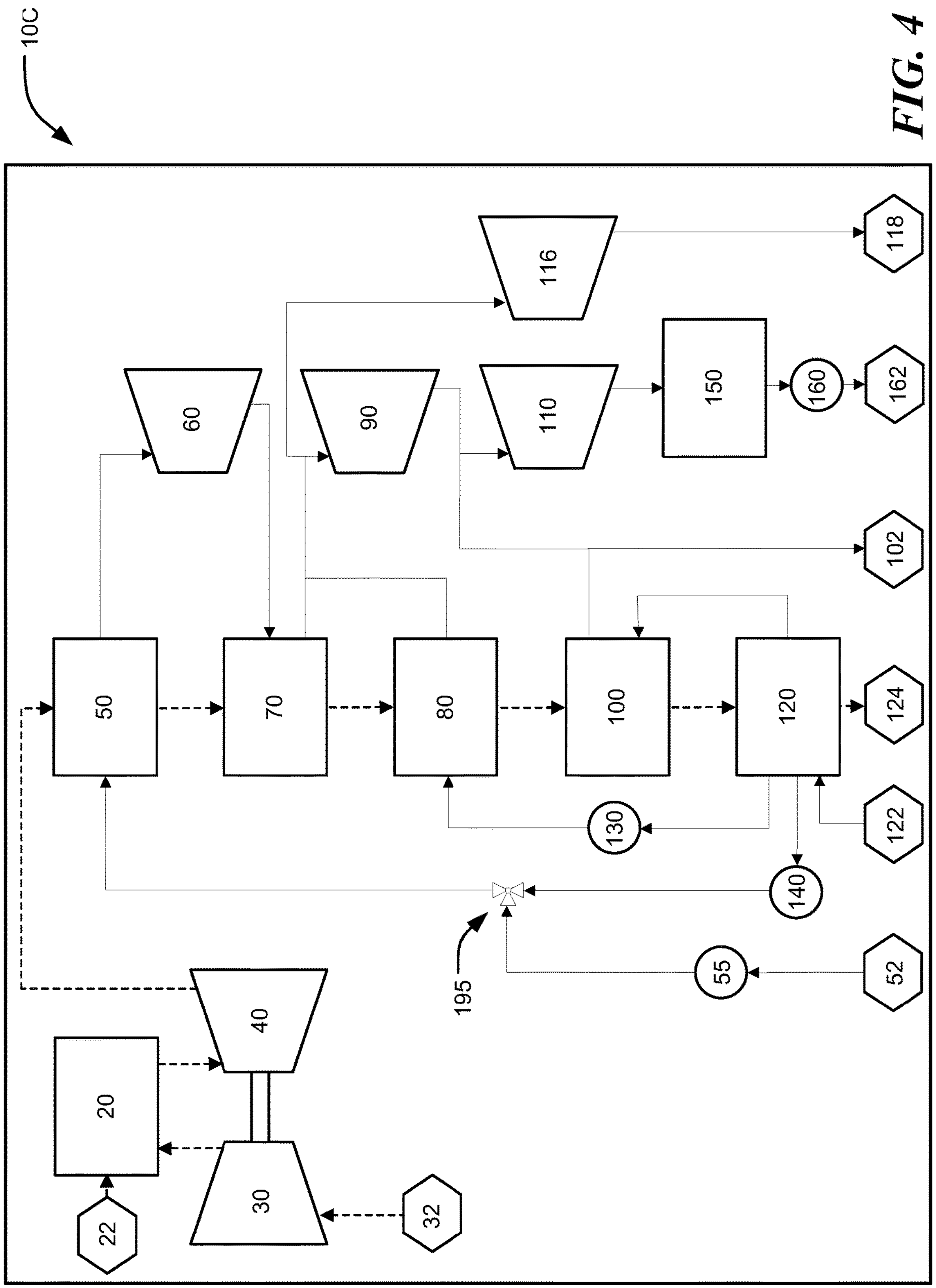
FIG. 4 is a block diagram of a partial base power plant including a natural gas-fired combined cycle power plant and a heat recovery steam generator according to another exemplary embodiment of the present disclosure.

FIG. 4 shows a partial base power plant 10C which is substantially the same as the power plant 10B except that it also includes a second intermediate pressure steam turbine 116 that receives the intermediate pressure steam that is also supplied to the intermediate pressure steam turbine 90. The intermediate pressure steam turbine 116 may output steam at the output 118. The partial base power plant 10C is discussed in more detail with regard to FIGS. 43-46.

Figure 5:
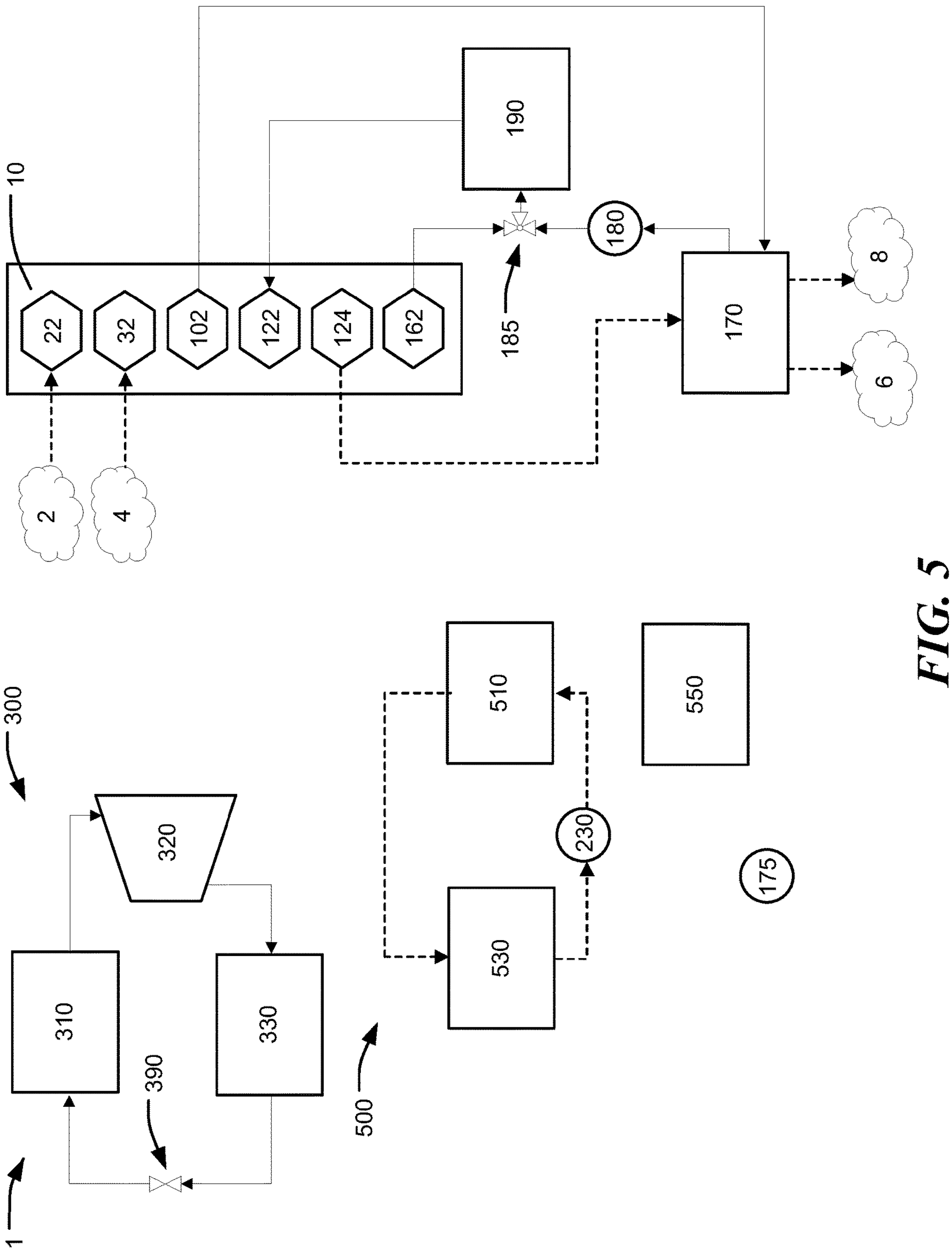
FIG. 5 is a block diagram of an exemplary power plant including the partial base power plant of FIG. 1 along with a carbon capture system and a resistively-heated thermal storage system and a vapor compression heat pump operated with air and a refrigerant and using hot and cold storage units, respectively, during a charging mode.

FIGS. 5-16 disclose various power plants having resistively heated thermal storage systems integrated with the partial base power plant 10. FIG. 5 illustrates a power plant 1 having a resistively-heated thermal storage system 500 and a vapor compression heat pump 300 in a charging mode that uses air and a refrigerant such as, for example, ammonia as the working fluid and includes hot and cold storage units 520, 310. The power plant 1 includes the partial power plant 10. Although ammonia is used as the working fluid in this example, one having ordinary skill in the art would appreciate that other working fluids, such as R134a may be used.

Figure 50:
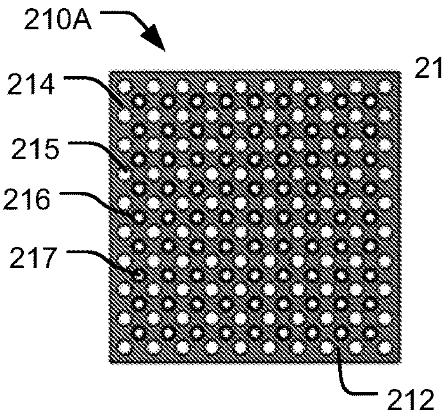
FIG. 50 is a is a front view of an exemplary gas/liquid-fed thermal storage unit.
Figure 51:
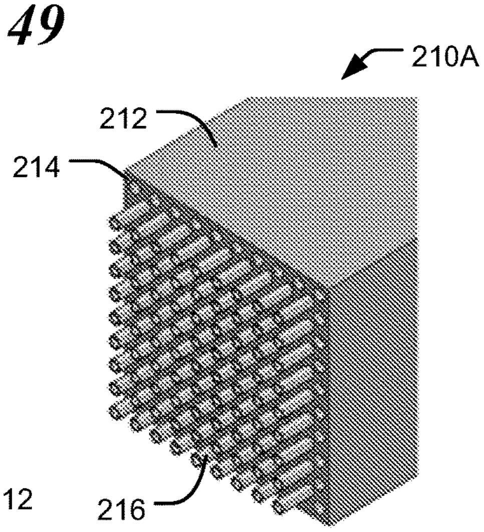
FIG. 51 is a perspective view of the thermal storage unit shown in FIG. 50.

In the heat pump 300, ammonia is compressed in the compressor 320 which is powered by electricity from the power plant 1 or the grid. The compressed ammonia is then routed to a cooling tower 330 where heat is removed. Next the ammonia is routed to a throttling valve 390 where the ammonia expands, evaporates, and absorbs heat from a cold storage unit 310. The cold storage unit 310 may be comprised of a thermal storage unit 210A which is shown in FIGS. 50 and 51 and discussed in more detail below. After absorbing the heat, the ammonia is returned to the compressor 320.

Figure 6:
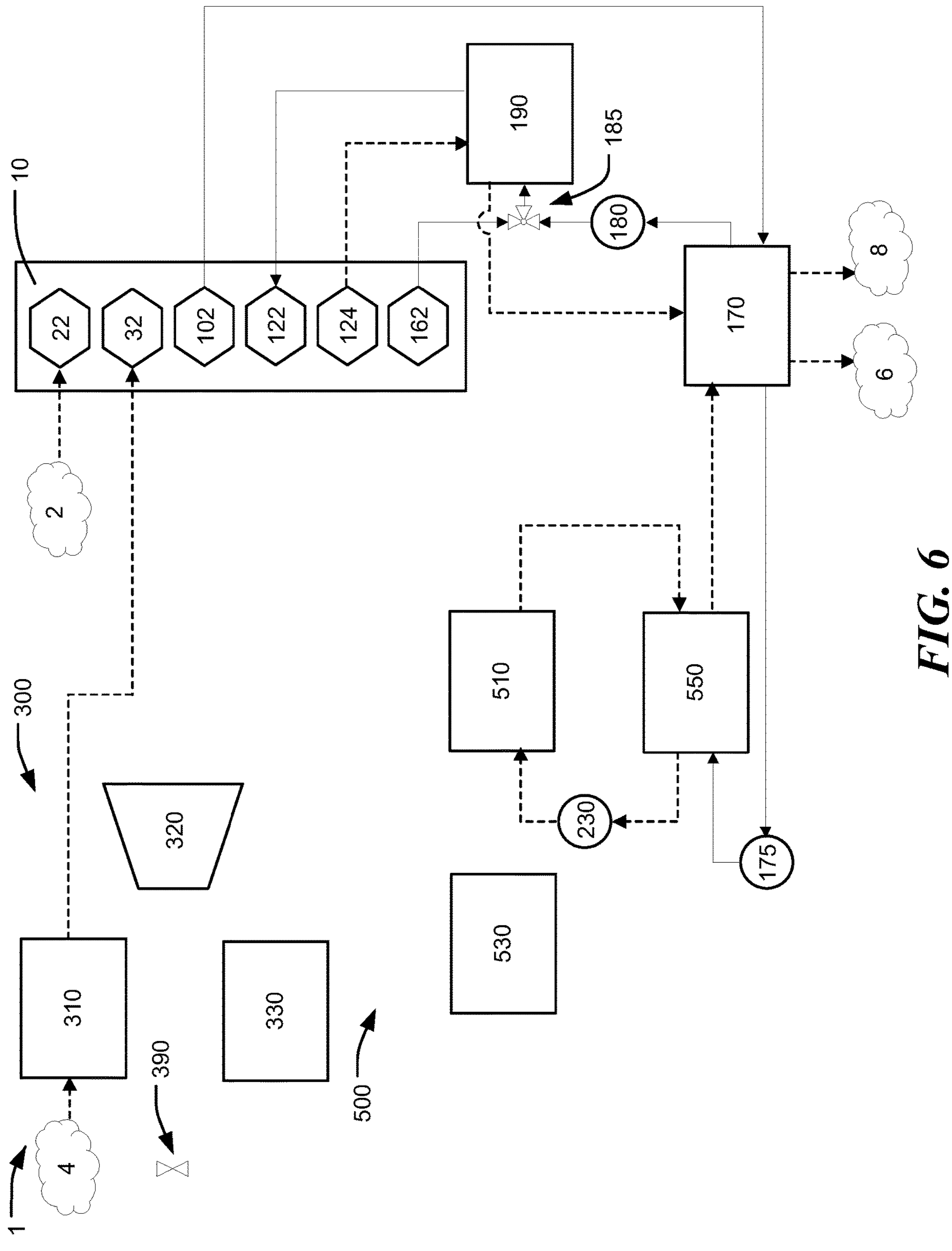
FIG. 6 is a block diagram of the power plant of FIG. 5 during a discharging mode.

Turning briefly to FIGS. 50 and 51, the thermal storage unit 210A may include one or more thermal masses, such as, for example, oil-filled containers, salt blocks, and concrete blocks having a plurality of channels therein. As used herein, the term concrete is intended to include reinforced concrete, cement, reinforced cement, and the like. As depicted in FIGS. 50 and 51, the thermal mass may be one or more blocks 212 with a first set of passageways 215 formed by inward facing surfaces 214 of the blocks 212. The blocks 212 may be comprised of concrete due its high heat capacity and low capital cost. In the embodiment shown in FIGS. 50 and 51, the passageways 215 are depicted as having a substantially circular cross-section, but in other embodiments different geometrical shaped cross sections or irregular cross sections may be possible. The blocks 212 may also include embedded pipes 216 forming a second set of passageways 217 by the inwardly facing surfaces of the pipes 216. The pipes 216 may be comprised of metallic materials, such as, for example, steel, copper, lead, or aluminum. The first set of passageways 215 be fluidically connected to one another with one or more manifolds (not shown) and, likewise, the second set of passageways 217 be fluidically connected to one another with one or more manifolds. Some or all of the first set of passageways 215 may form a portion of a first fluid circuit and may be configured to route gasses, such as air, through the blocks 212 to transfer its heat to or from the blocks 212. Some of all of the first set of passageways 215 may form a portion of a first fluid circuit (such as routing ambient air 4 to an inlet 32 of the compressor 30 and thereby transfer the heat from the ambient air 4 to the blocks 212 of the cold storage unit 310 as shown in FIG. 6, for example). Some or all of the second set of passageways 217 may form a portion of a second fluid circuit (such as routing ammonia from the throttling valve 390 to the compressor 320 and thereby transfer the heat from the blocks 212 of the cold storage unit 310 to the ammonia as shown in FIG. 5, for example). FIGS. 50 and 51 depict the first set of passageways 215 oriented parallel with respect to the second set of passageways 217, but in other embodiments, the first set of passageways 215 may be oriented perpendicular or at another nonzero angle with respect to the second set of passageways 217.

Figure 48:
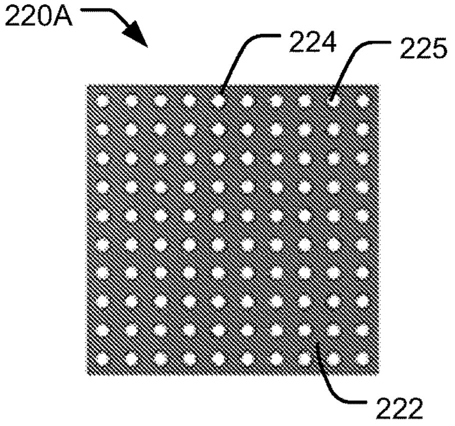
FIG. 48 is a front view of an exemplary gas-fed thermal storage unit.
Figure 49:
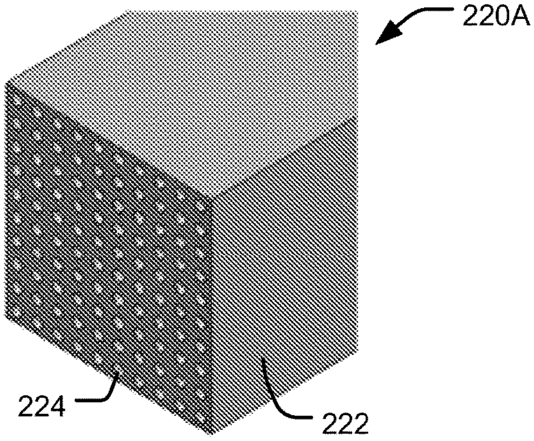
FIG. 49 is a perspective view of the thermal storage unit shown in FIG. 48.

In the resistively-heated thermal storage system 500, electricity from the power plant 1 or the grid may power a resistive heater 530 for heating a gas, such as air, for example. The heated air is circulated by a blower 230 which routes the air from the resistive heater 530 to a hot storage unit 510 to which the air transfers its heat. The hot storage unit 510 may be comprised of a thermal storage unit 220A which is shown in FIGS. 48 and 49 and discussed in more detail below. The blower 230 may also be powered by the power plant 1 or the grid. After the air is cooled, it is then routed back to the resistive heater 530 to absorb heat therefrom.

Turning briefly to FIGS. 48 and 49, the thermal storage unit 220A may include one or more thermal masses, such as, for example, oil-filled containers, salt blocks, and concrete blocks having a plurality of channels therein. As depicted in FIGS. 48 and 49, the thermal mass may be one or more blocks 222 with passageways 225 formed by inward facing surfaces 224 of the blocks 222. The blocks 222 may be comprised of concrete due its high heat capacity and low capital cost. In the embodiment shown in FIGS. 48 and 49, the passageways 225 are depicted as having a substantially circular cross-section, but in other embodiments different geometrical shaped cross sections or irregular cross sections may be possible. The passageways 225 be fluidically connected to one another with one or more manifolds (not shown). In one configuration, all of passageways 225 may form a portion of a first fluid circuit configured to route gasses, such as air, through the blocks 222 to transfer its heat to the blocks 222. In addition, all of the passageways 225 may be configured to switch (via a gate or valve, for example) to form a portion of a second circuit to route gasses, such as air, through the blocks 222 to absorb heat from the blocks 222. In another configuration, some of the passageways 225 may be configured to form a portion of the first fluid circuit and some others of the passageways 225 may be configured to form a portion of the second fluid circuit. In either configuration, the first circuit may be configured to route air from the resistive heater 530 to the blocks 222 of the hot storage unit 510 to thereby transfer heat to the hot storage unit 510 as shown in FIG. 5, for example. Similarly, the second circuit may be configured to route air from the from the blocks 222 of the hot storage unit 510 to a hot storage steam generator 550 as shown in FIG. 6, for example. FIGS. 48 and 49 depict the passageways 225 oriented parallel with respect to each other, but in other embodiments, some of passageways 225 may be oriented perpendicular or at another nonzero angle with respect to some others of the passageways 225.

FIG. 6 illustrates a discharging mode of the resistively-heated thermal storage system 500 and the vapor compression heat pump 300 of power plant 1. During discharge, the ambient air 4 is directed through the cold storage unit 310 to reduce its temperature before entering the inlet 32 of the compressor 320. Also, some or all of the flue gas may be routed from the outlet 124 of the low pressure economizer 120 through the preheater 190 to provide heat to the water stream entering the inlet of the low pressure economizer 120 before being routed to the carbon capture system 170 for $CO_2$ removal. Water that has been recovered in the carbon capture system 170 is pumped through valve 185 where it joins water leaving the condensate pump outlet 162 and into the preheater 190. The preheater 190 and the carbon capture system 170 functions in the same manner as described above.

Also during discharge, the blower 230 forces air through the hot storage unit 510 where it absorbs heat and then routes the hot air to a hot storage steam generator 550 where it transfers its heat to steam therein. The hot storage steam generator 550 may effectively operate as a heat exchanger directly transferring the heat from the air to the steam. Some of the water in the carbon capture system 170 is pumped by a pump 175 to the hot storage steam generator 550 where it absorbs heat to assist in the solvent regeneration upon its return to the carbon capture system 170.

Figure 7:
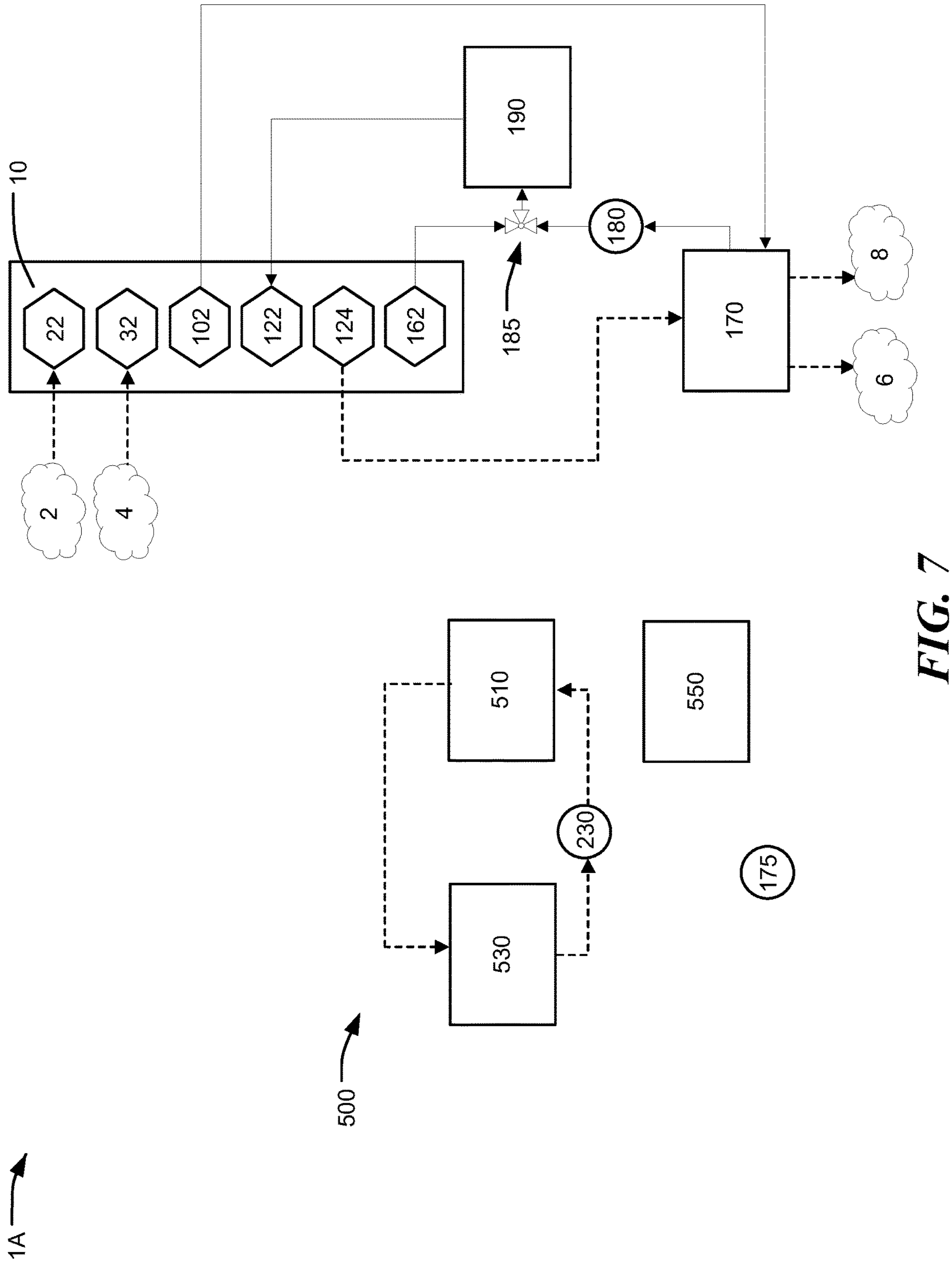
FIG. 7 is a block diagram of an exemplary power plant including the partial base power plant of FIG. 1 along with a carbon capture system and a resistively-heated thermal storage system operated with air and using a hot storage unit during a charging mode.
Figure 8:
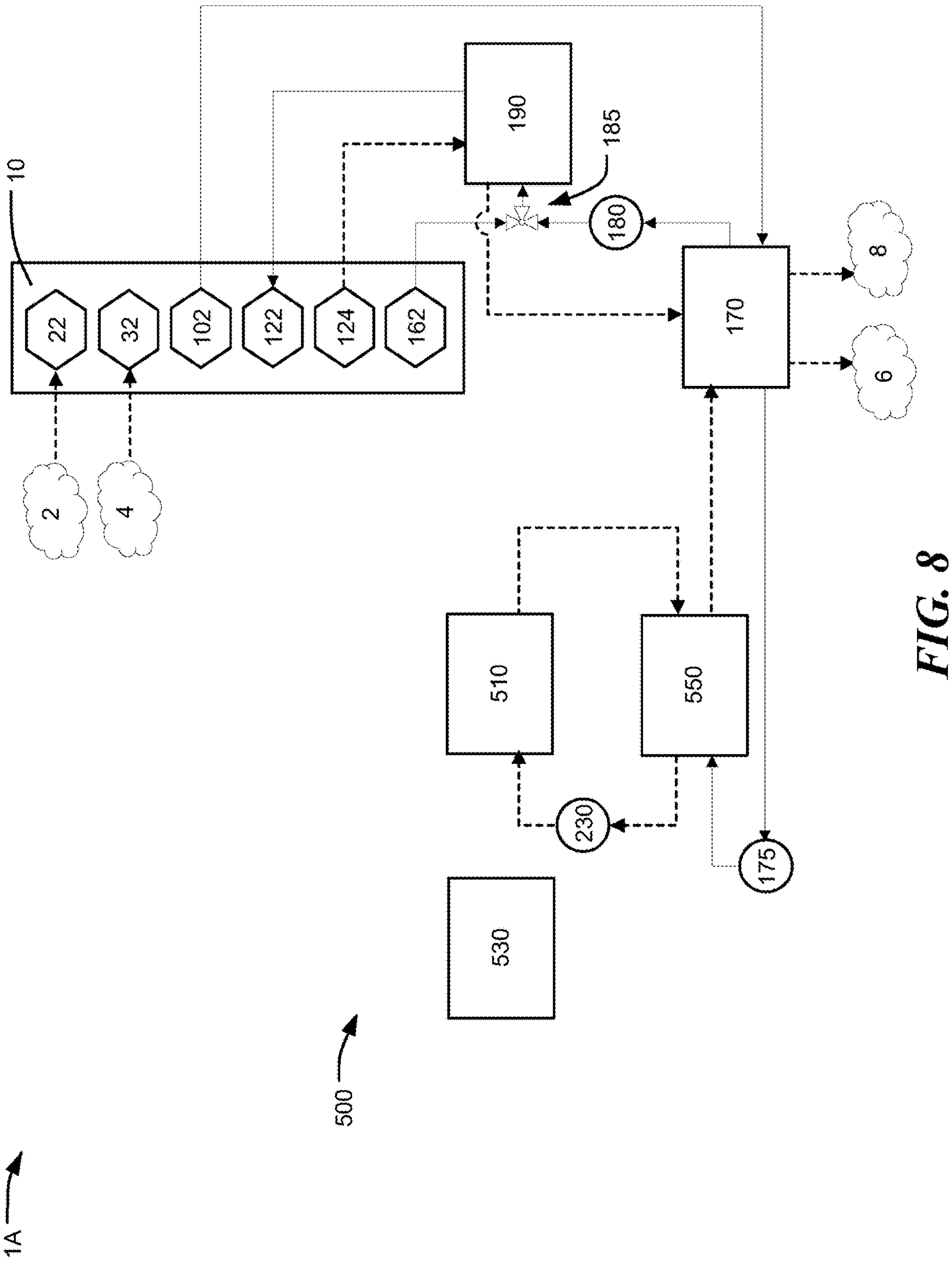
FIG. 8 is a block diagram of the power plant of FIG. 7 during a discharging mode.

FIGS. 7 and 8 illustrate respective charging and discharging modes of a power plant 1A having the resistively-heated thermal storage system 500 in a charging mode that uses the air as the working fluid and includes the hot storage unit 510. The power plant 1A is nearly identical to power plant 1 except that it does not include the vapor compression heat pump 300.

Figure 9:
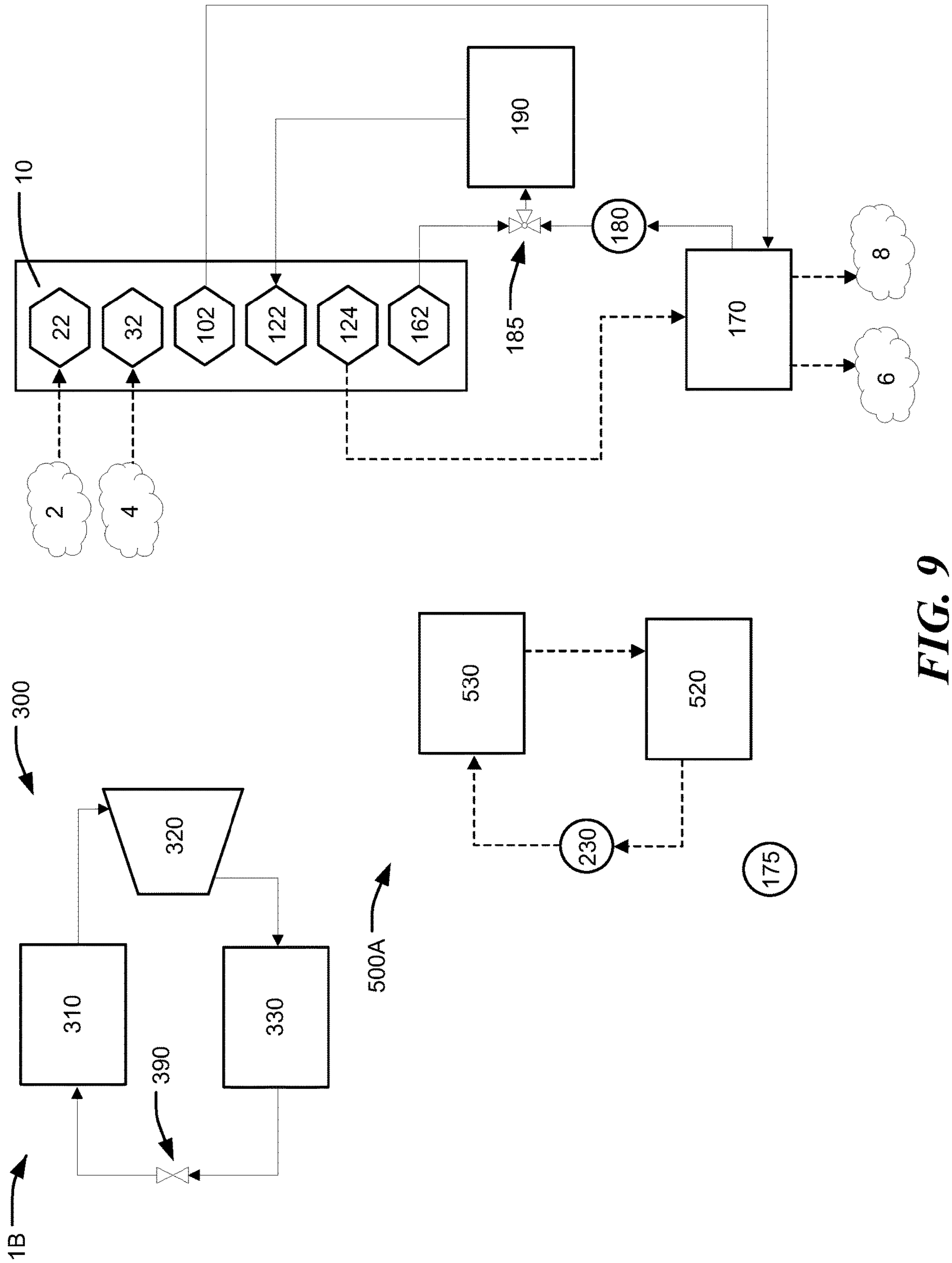
FIG. 9 is a block diagram of an exemplary power plant including the partial base power plant of FIG. 1 along with a carbon capture system and a resistively-heated thermal storage system and a vapor compression heat pump operated with air and a refrigerant and using hot and cold storage units, respectively, during a charging mode.
Figure 10:
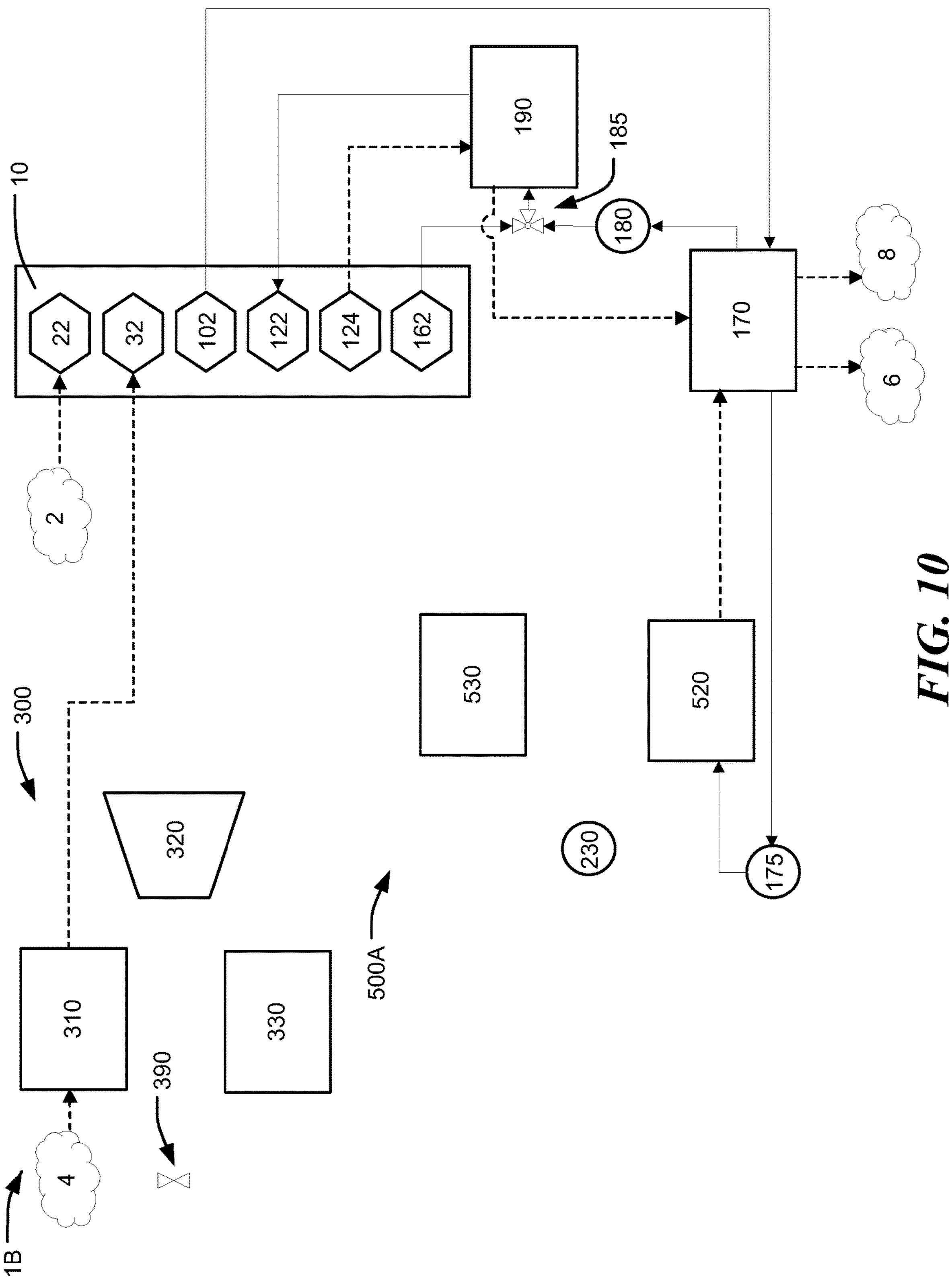
FIG. 10 is a block diagram of the power plant of FIG. 9 during a discharging mode.

FIGS. 9 and 10 illustrate respective charging and discharging modes of a power plant 1B having a resistively-heated thermal storage system 500A and a vapor compression heat pump 300 in a charging mode that uses air and a refrigerant such as, for example, ammonia as the working fluid and includes hot and cold storage units 520, 310. The power plant 1B includes the partial power plant 10 and the resistively-heated thermal storage system 500A is nearly identical to the power plant 1 and the resistively-heated thermal storage system 500 except that it does not include a separate hot storage steam generator 550 and instead includes a hot storage unit 520, which has an integrated steam generator to transfer the stored heat to the water or steam returning to the carbon capture system 170. The hot storage unit 520 may be comprised of the thermal storage unit 210A (FIGS. 50 and 51). Although ammonia is used as the working fluid for the heat pump 300 in this example, one having ordinary skill in the art would appreciate that other working fluids, such as R134a may be used.

Figure 11:
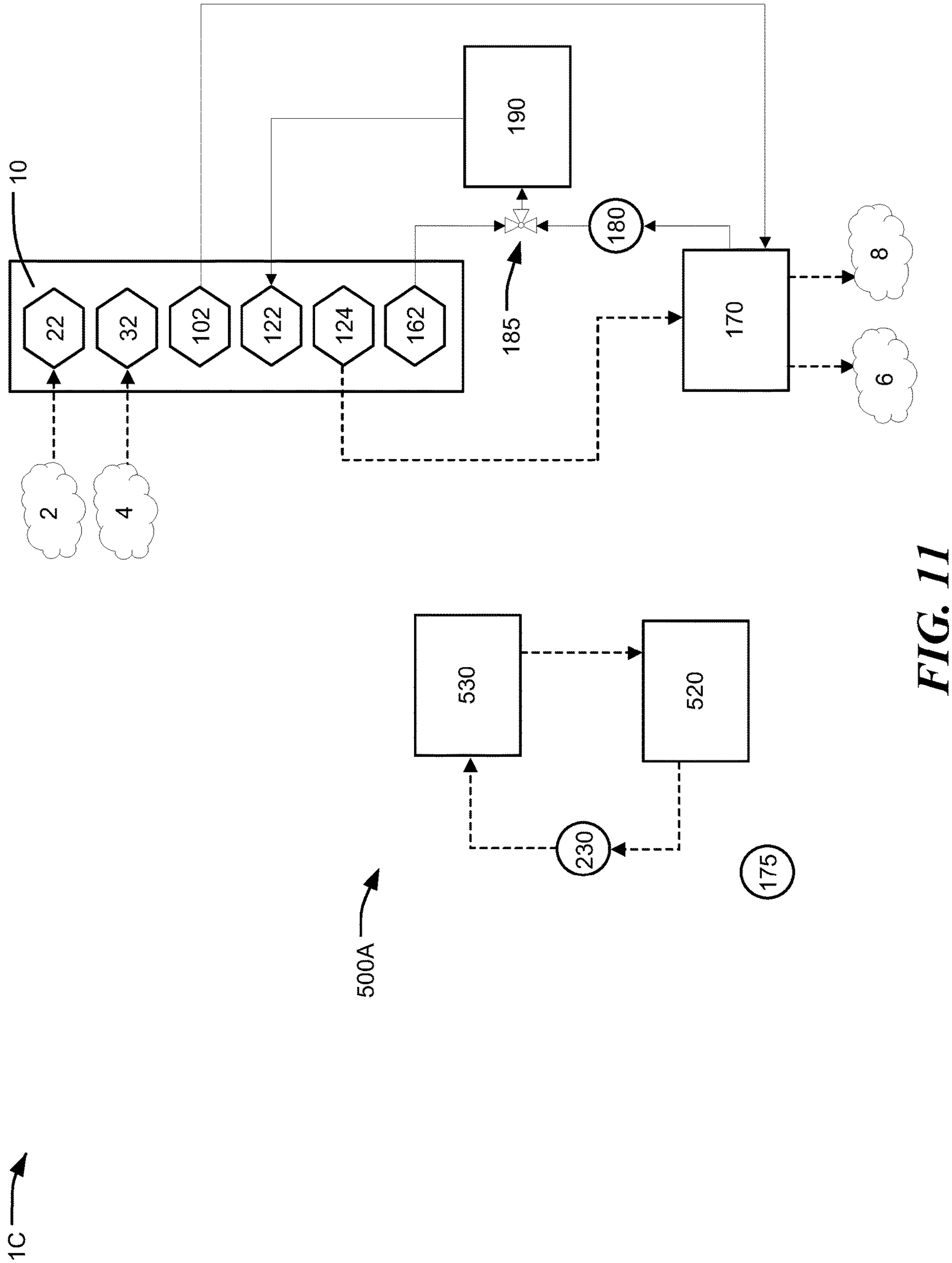
FIG. 11 is a block diagram of an exemplary power plant including the partial base power plant of FIG. 1 along with a carbon capture system and a resistively-heated thermal storage system operated with air and using a hot storage unit during a charging mode.
Figure 12:
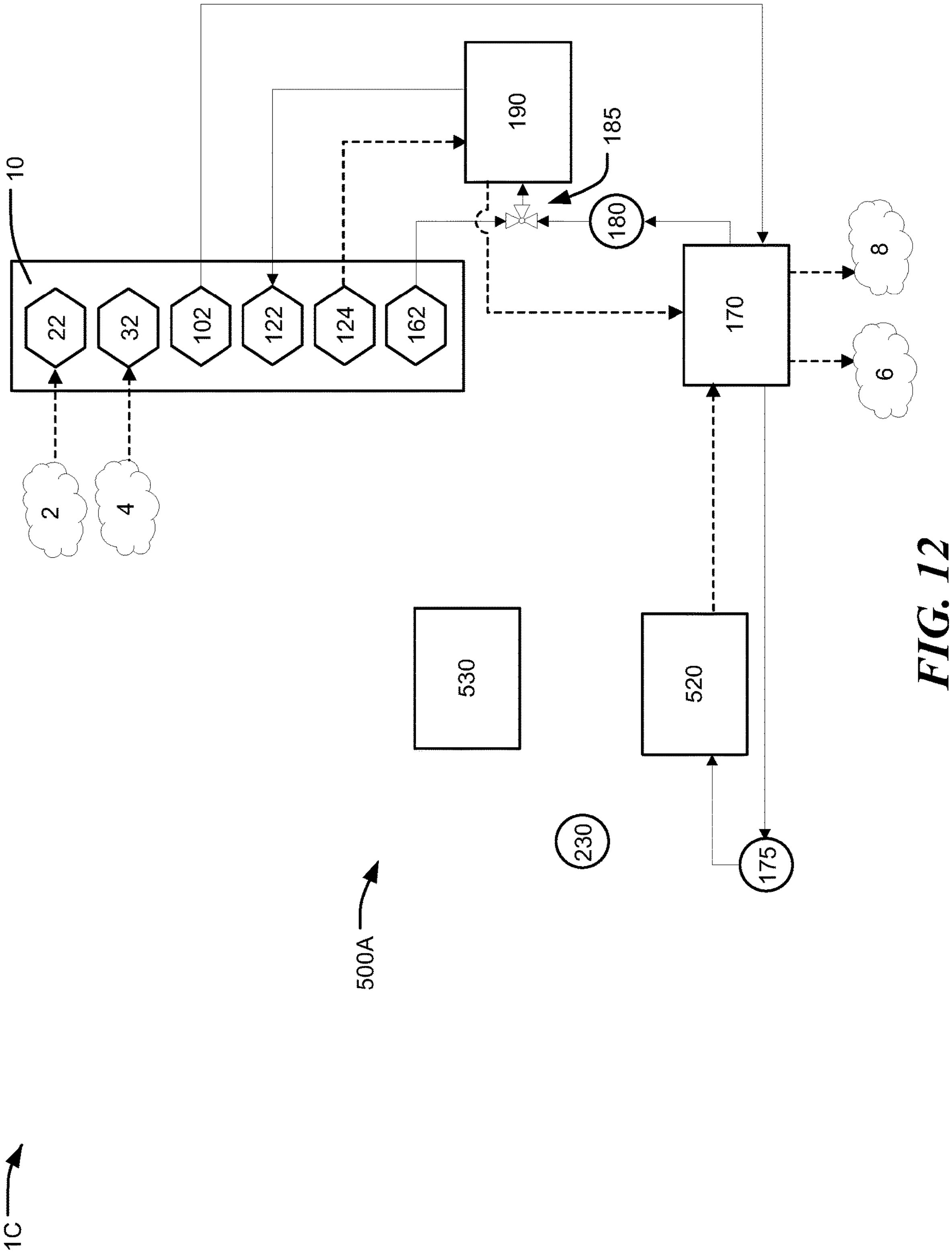
FIG. 12 is a block diagram of the power plant of FIG. 11 during a discharging mode.

FIGS. 11 and 12 illustrate respective charging and discharging modes of a power plant 1C having the resistively-heated thermal storage system 500A in a charging mode that uses the air as the working fluid and includes the hot storage unit 510. The power plant 1C is nearly identical to power plant 1B except that it does not include the vapor compression heat pump 300.

Figure 13:
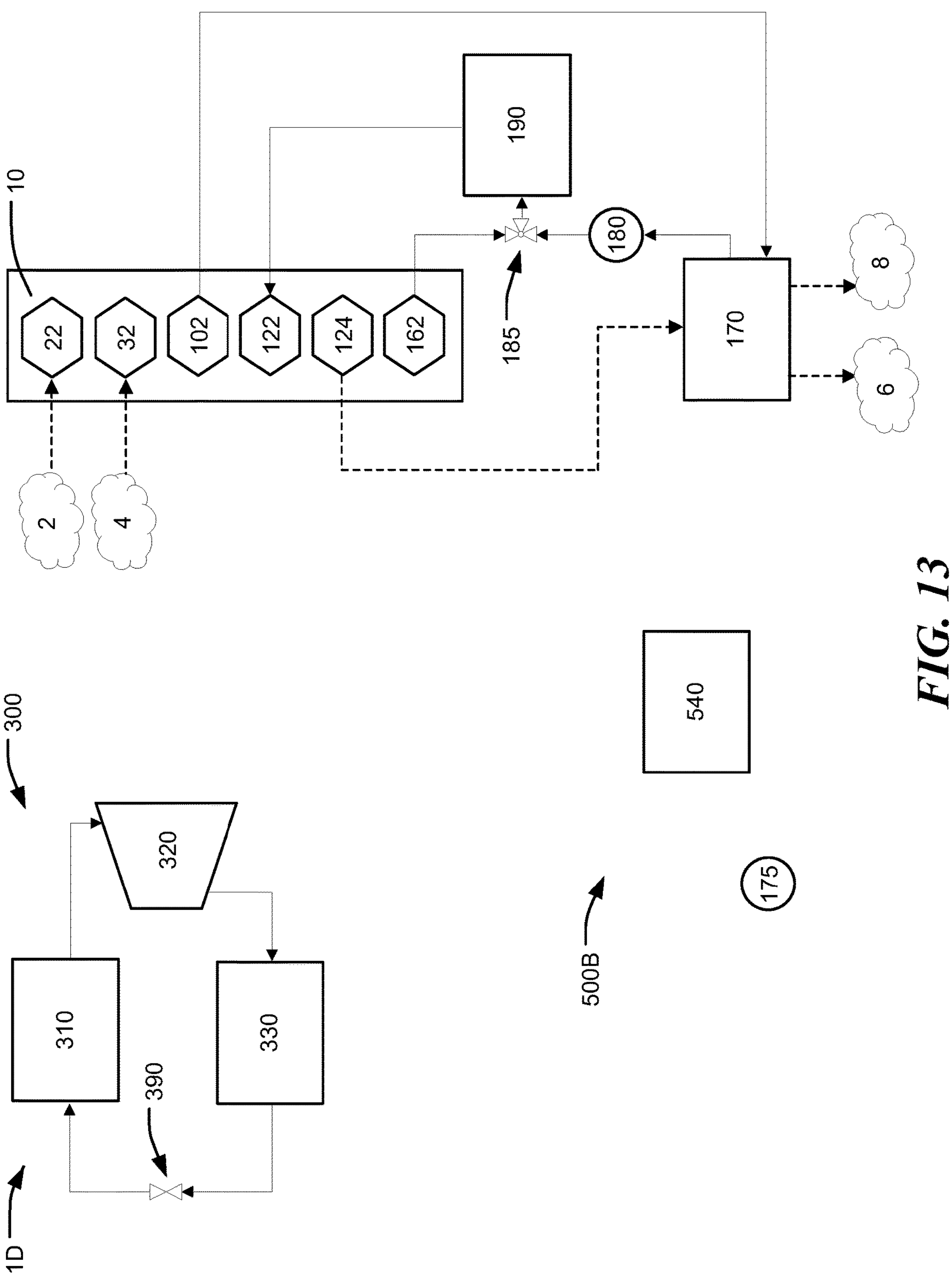
FIG. 13 is a block diagram of an exemplary power plant including the partial base power plant of FIG. 1 along with a carbon capture system and a resistively-heated thermal storage system and a vapor compression heat pump operated with air and a refrigerant and using hot and cold storage units, respectively, during a charging mode.
Figure 14:
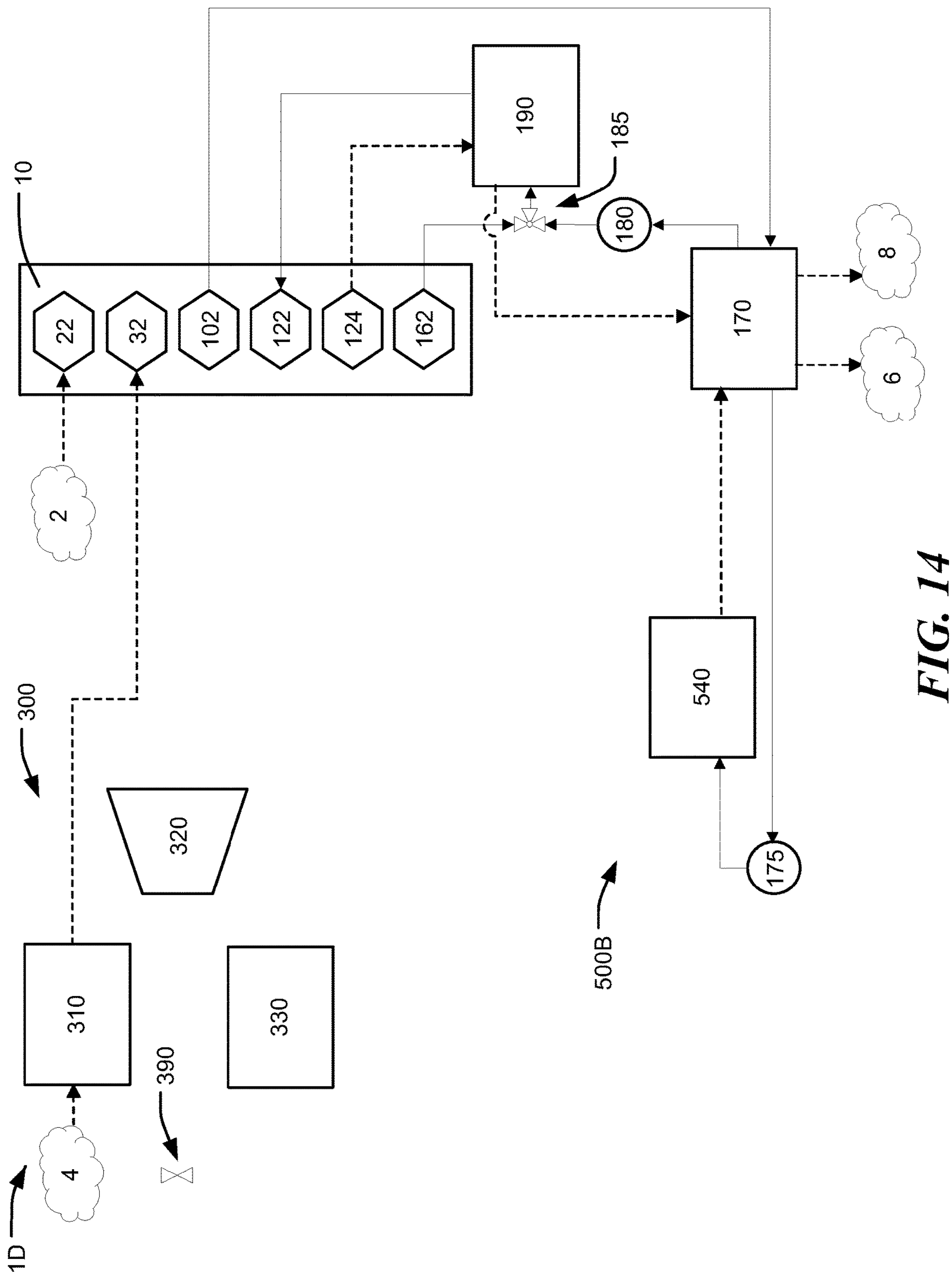
FIG. 14 is a block diagram of the power plant of FIG. 13 during a discharging mode.
Figure 52:
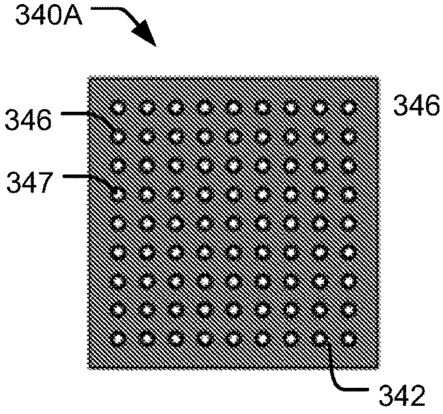
FIG. 52 is a is a front view of an exemplary liquid-fed thermal storage unit.
Figure 53:
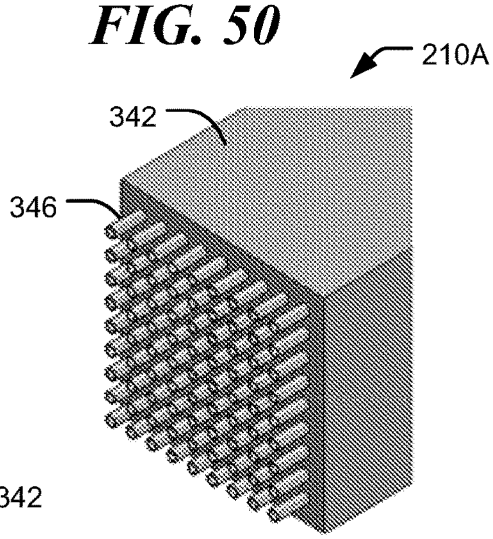
FIG. 53 is a perspective view of the thermal storage unit shown in FIG. 52.

FIGS. 13 and 14 illustrate respective charging and discharging modes of a power plant 1D having a resistively-heated thermal storage system 500B and a vapor compression heat pump 300 in a charging mode that uses air and a refrigerant such as, for example, ammonia as the working fluid and includes hot and cold storage units 540, 310. The power plant 1D includes the partial power plant 10 and the resistively-heated thermal storage system 500B is nearly identical to the power plant 1 and the resistively-heated thermal storage system 500 except that it does not include a separate hot storage steam generator 550 or a separate resistive heater 530, but instead includes a hot storage unit 540, which has an integrated resistive heater and steam generator to generate heat and transfer the stored heat to the water or steam returning to the carbon capture system. The hot storage unit 540 may be comprised of a thermal storage unit 340A which is shown in FIGS. 52 and 53 and discussed in more detail below. Although ammonia is used as the working fluid for the heat pump 300 in this example, one having ordinary skill in the art would appreciate that other working fluids, such as R134a may be used.

Figure 33:
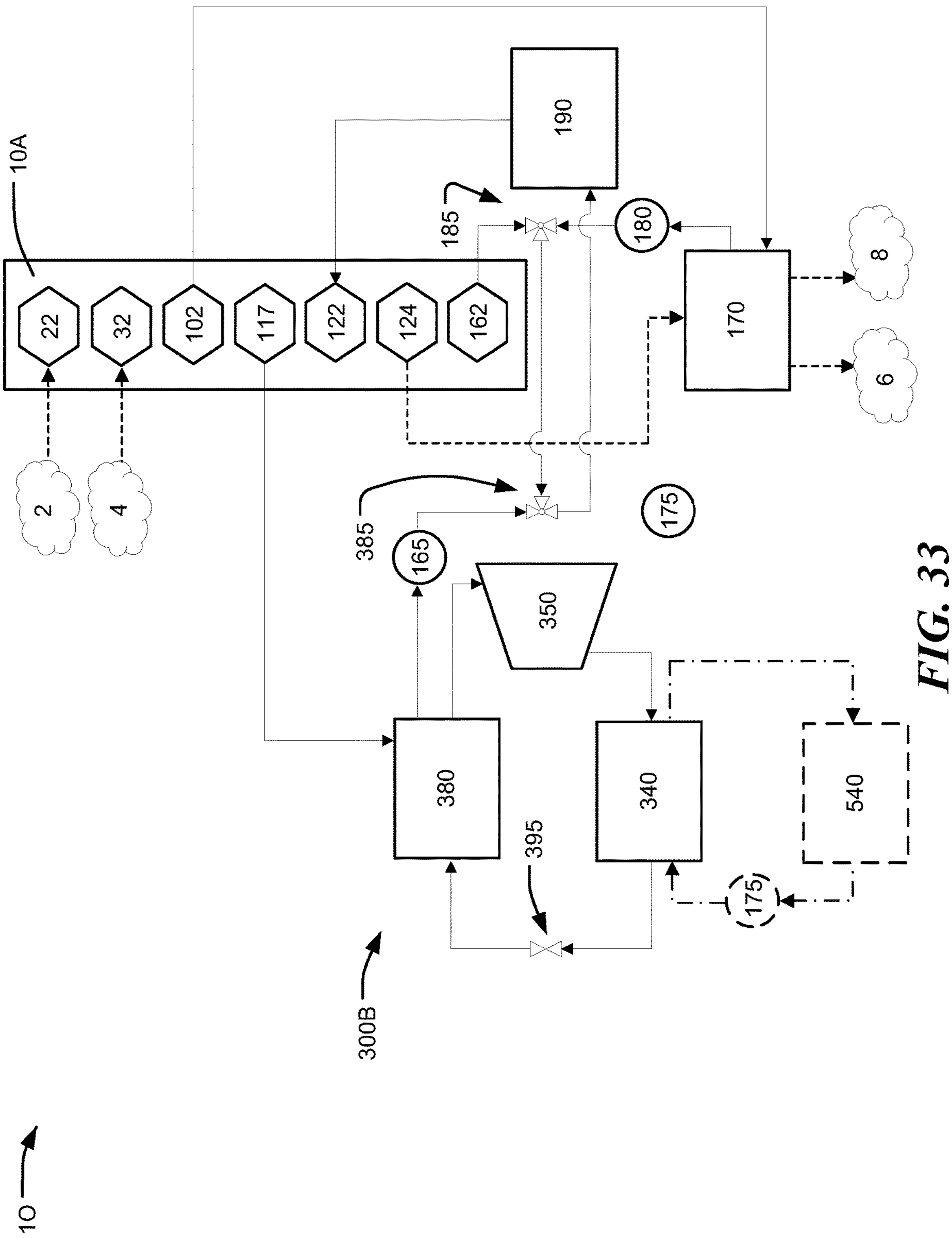
FIG. 33 is a block diagram of an exemplary power plant including the partial base power plant of FIG. 2 along with a carbon capture system and a vapor compression heat pump operated with steam heated steam and using a hot storage unit during a charging mode.
Figure 34:
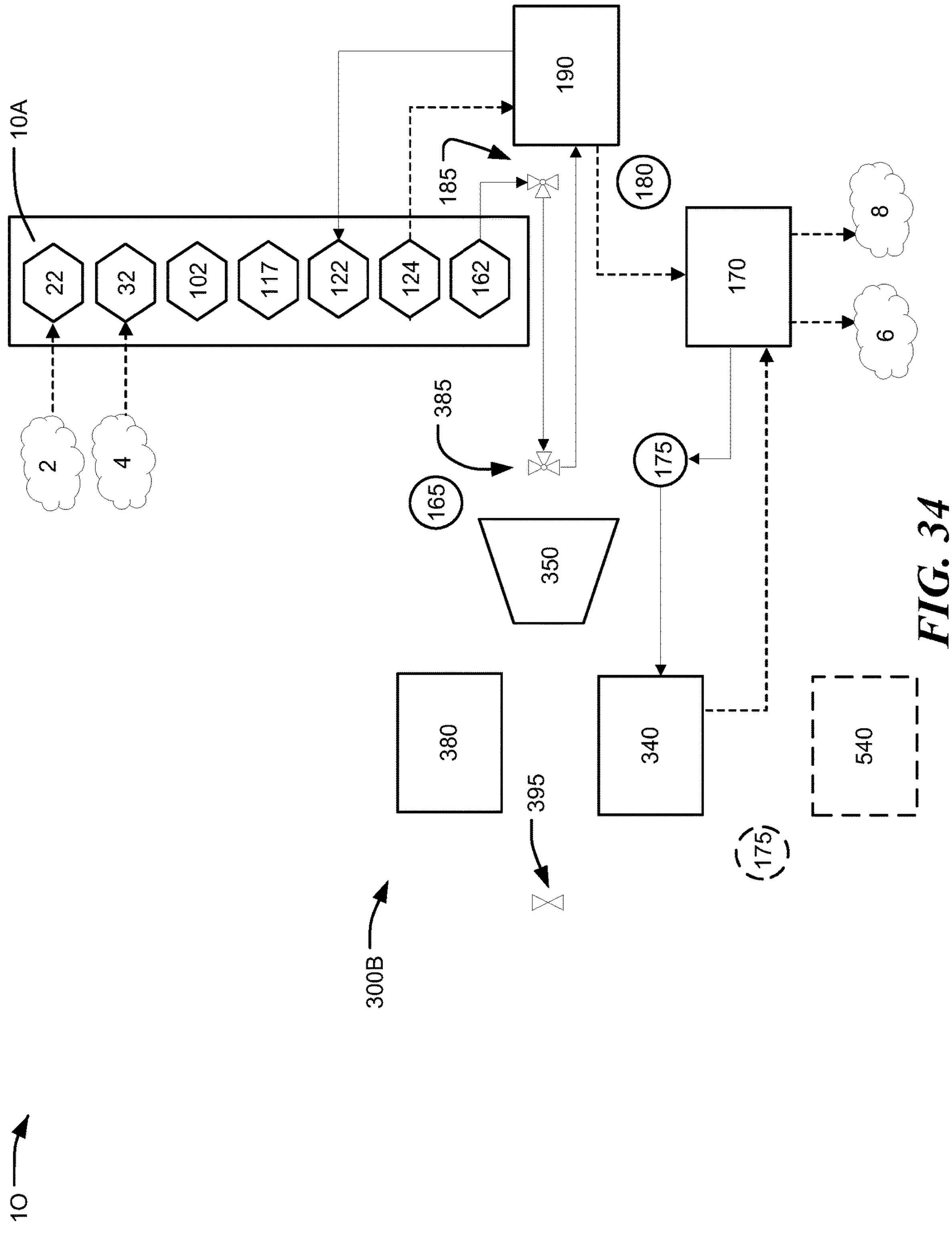
FIG. 34 is a block diagram of the storage system of FIG. 33 during a discharging mode.

Turning briefly to FIGS. 52 and 53, the thermal storage unit 340A may include one or more thermal masses, such as, for example, oil-filled containers, salt blocks, and concrete blocks having a plurality of channels therein. As depicted in FIGS. 52 and 53, the thermal mass may be one or more blocks 342 having embedded pipes 346 forming a passageways 347 by the inwardly facing surfaces of the pipes 346. The pipes 346 may be comprised of metallic materials, such as, for example, steel, copper, lead, or aluminum. The blocks 342 may be comprised of concrete due its high heat capacity and low capital cost. The passageways 347 be fluidically connected to one another with one or more manifolds (not shown). In a first configuration, all of passageways 347 may form a portion of a first fluid circuit configured to route a fluid, such as steam, through the blocks 342 to transfer its heat to the blocks 342. In the embodiment shown in FIGS. 14 and 16, for example, the passageways 347 may be configured to route water to and from the carbon capture system 170 to transfer heat from the blocks 342 of the hot storage unit 340 to the water. In a second configuration, all of the passageways 347 may be configured to switch (via a gate, for example) to form a portion of a second circuit to route fluids, such as water, through the blocks 342 to absorb heat from the blocks 342. In a third configuration, some of the passageways 347 may be configured to form a portion of the first fluid circuit and some others of the passageways 347 may be configured to form a portion of the second fluid circuit. In the second and third configurations, the first circuit may be configured to route water from a compressor 350 to a throttling valve 395 and thereby transfer the heat from the water to the blocks 342 of the hot storage unit 340, as shown in FIG. 33, for example. Similarly, the second circuit may be configured to route water from the from the blocks 342 of the hot storage unit 340 to the carbon capture system 170 as shown in FIG. 34, for example. FIGS. 52 and 53 depict the passageways 347 oriented parallel with respect to each other, but in other embodiments, some of passageways 347 may be oriented perpendicular or at another nonzero angle with respect to some others of the passageways 347.

Figure 15:
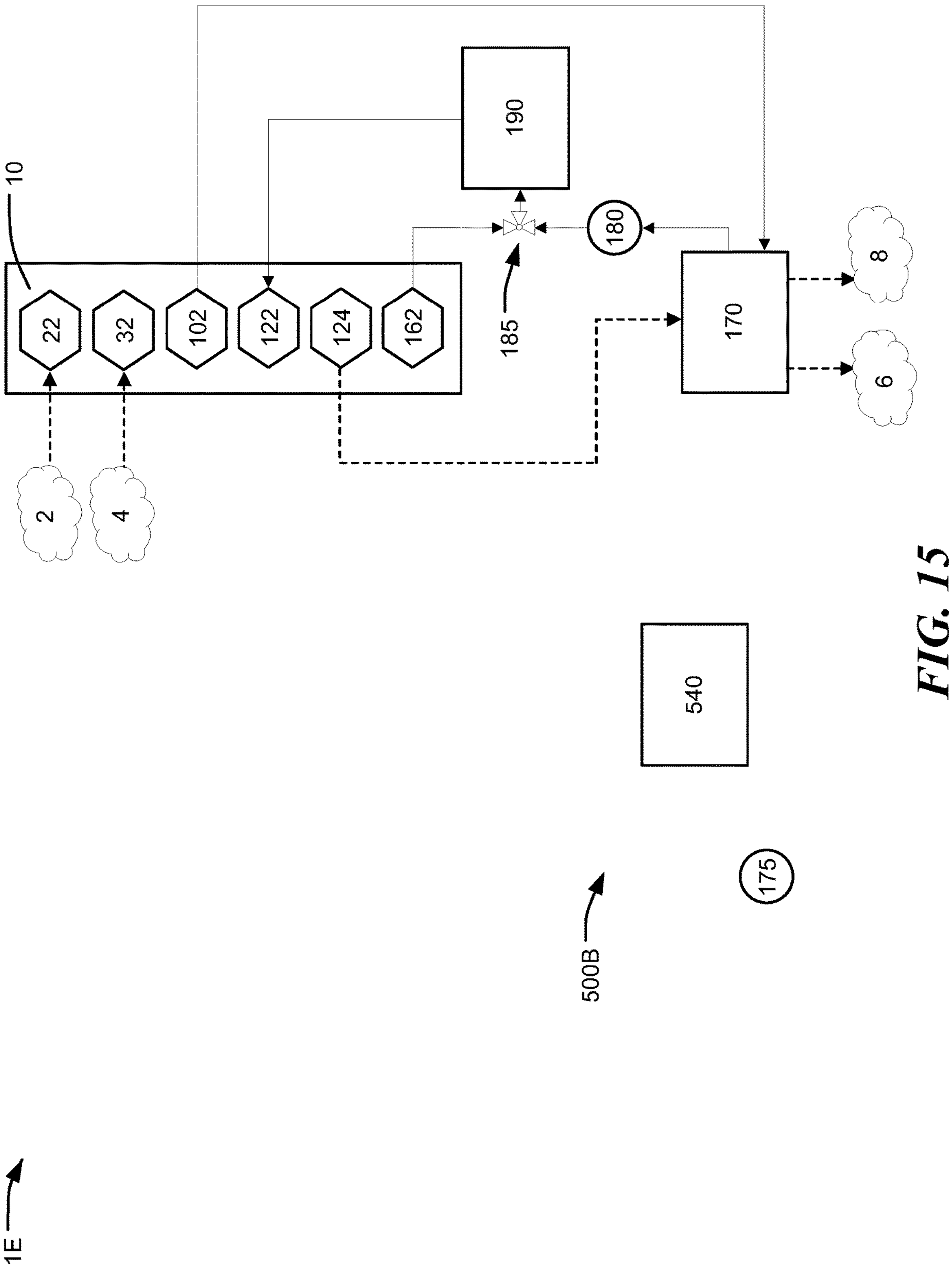
FIG. 15 is a block diagram of an exemplary power plant including the partial base power plant of FIG. 1 along with a carbon capture system and a resistively-heated thermal storage system and using a hot storage unit during a charging mode.
Figure 16:
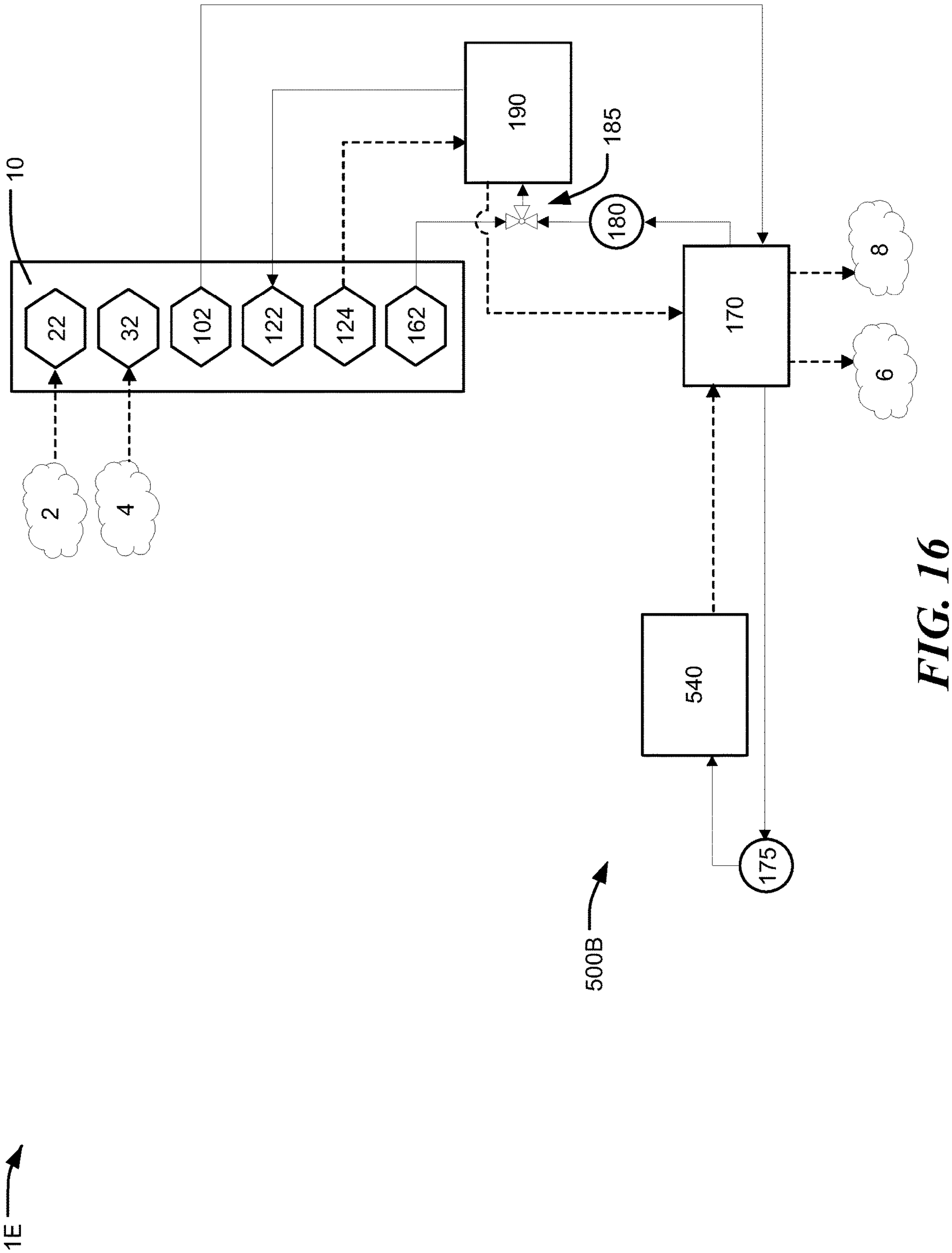
FIG. 16 is a block diagram of the power plant of FIG. 15 during a discharging mode.

FIGS. 15 and 16 illustrate respective charging and discharging modes of a power plant 1E having the resistively-heated thermal storage system 500B in a charging mode that uses the air as the working fluid and includes the hot storage unit 540. The power plant 1E is nearly identical to power plant 1D except that it does not include the vapor compression heat pump 300.

Figure 17:
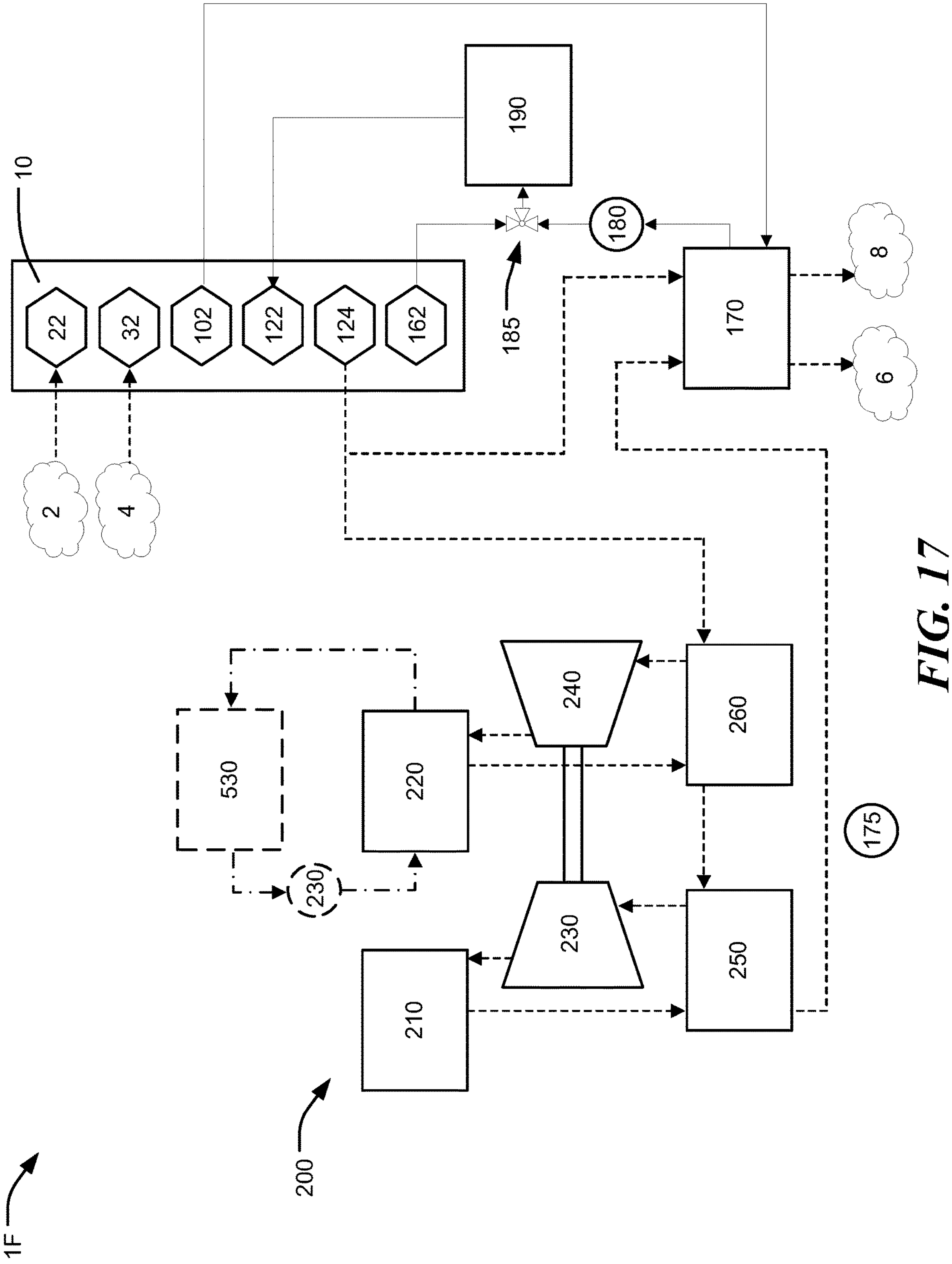
FIG. 17 is a block diagram of an exemplary power plant including the partial base power plant of FIG. 1 along with a carbon capture system and a Brayton cycle heat pump operated with a flue gas and using hot and cold storage units during a charging mode.

FIGS. 17-26 disclose various power plants having Brayton cycle heat pumps integrated with the partial base power plant 10. FIG. 17 illustrates a power plant 1F having a Brayton cycle heat pump 200 in a charging mode that uses the flue gas as the working fluid and includes hot and cold storage units 220, 210, which may include thermal storage units 220A and 210A (FIGS. 48-51) as discussed above. Starting with the inputs of the partial base power plant 10, natural gas 2 is supplied at the inlet 22 of the combustor 20 and ambient air 4 is supplied at the inlet 32 of the compressor 30.

Turning to the outputs of the partial base power plant 10, as the flue gas leaves the low-pressure economizer 120 at the exit 124, a portion of it may be routed to the carbon capture system 170 and the other portion may be routed to a hot recuperator 260 where it is heated before entering a compressor 240 for compressing and heating the flue gas using electricity from the power plant 1F or the grid. The flue gas exits the compressor 240 and enters the hot storage unit 220. The hot storage unit 220 may be configured to store thermal energy at a temperature less than 450° C., less than 400° C., less than 350° C., less than 300° C., less than 250° C., less than 225° C., and preferably about 202° C. The hot storage unit may also be configured to store thermal energy at a temperature greater than 100° C., greater than 125° C., and preferably about 150° C. for solvent regeneration in the carbon capture system 170. After leaving the hot storage unit 220, the flue gas flows back to the hot recuperator 260 where it is cooled before flowing to a cold recuperator 250. Next, the flue gas is expanded in a turbine 230 where mechanical power is recovered and temperature and pressure are reduced before entering the cold storage unit 210, also comprised of concrete, where it can absorb heat. The cold storage unit 210 may be configured to store thermal energy at a temperature less than 15° C., less than 10° C., less than 5° C., less than 0° C., less than −5° C., less than −10° C., and preferably about −15° C. The flue gas then leaves the cold storage unit 210 and is routed to the cold recuperator 250 where it is heated before being routed to the carbon capture system 170 for $CO_2$ removal using, for example, solvent regeneration.

As mentioned above, some of the flue gas may be directly routed from the exit 124 of the low-pressure economizer 120 to the carbon capture system 170 for $CO_2$ removal. After $CO_2$ removal takes place in the carbon capture system 170, compressed $CO_2$ 6 is transported by a pipeline for sequestration and exhaust gasses 8 are exhausted therefrom. In addition, recovered water is pumped from the carbon capture system 170 via pump 180 through valve 185 where it joins water leaving the condensate pump outlet 162 into the preheater 190.

In addition to the Brayton cycle heat pump 200, the power plant 1F may optionally include the resistive heater 530 and blower 230 (shown in broken lines), which operate substantially in the same manner as discussed above with regard to power plants 1 and 1A. The Brayton cycle heat pump 200 and the resistive heater 530 may operate in a hybrid arrangement where only one system at a time or both systems at the same time may generate heat. In such hybrid arrangement, the hot storage unit 220 may have a different construction where the passageways 225 partially extend into the blocks 222, such as less than 50% of the block length (or accessing less than 50% of the effective volume of the blocks 222 for non-uniform geometries of blocks 220), in other embodiments, the passageways 225 partially extend into the blocks 222 less than 40% of the block length, less than 30% of the block length, less than 20% of the block length, or less than 10% of the block length.

In the hybrid example discussed above the resistive heater 530 transfers it heat via air to the hot storage unit 220 of the Brayton cycle heat pump 200, however, in other embodiments, the resistive heater 530 may transfer its heat to an additional hot storage unit 220 (not shown) or directly to the carbon capture system 170 as discussed above with regard to power plants 1-1E (FIGS. 5-16). Moreover, the hot storage unit 220 of the Brayton cycle heat pump 200 may include embedded resistive heaters such as those discussed with regard to power plants 1D and 1E (FIGS. 13-16).

Figure 18:
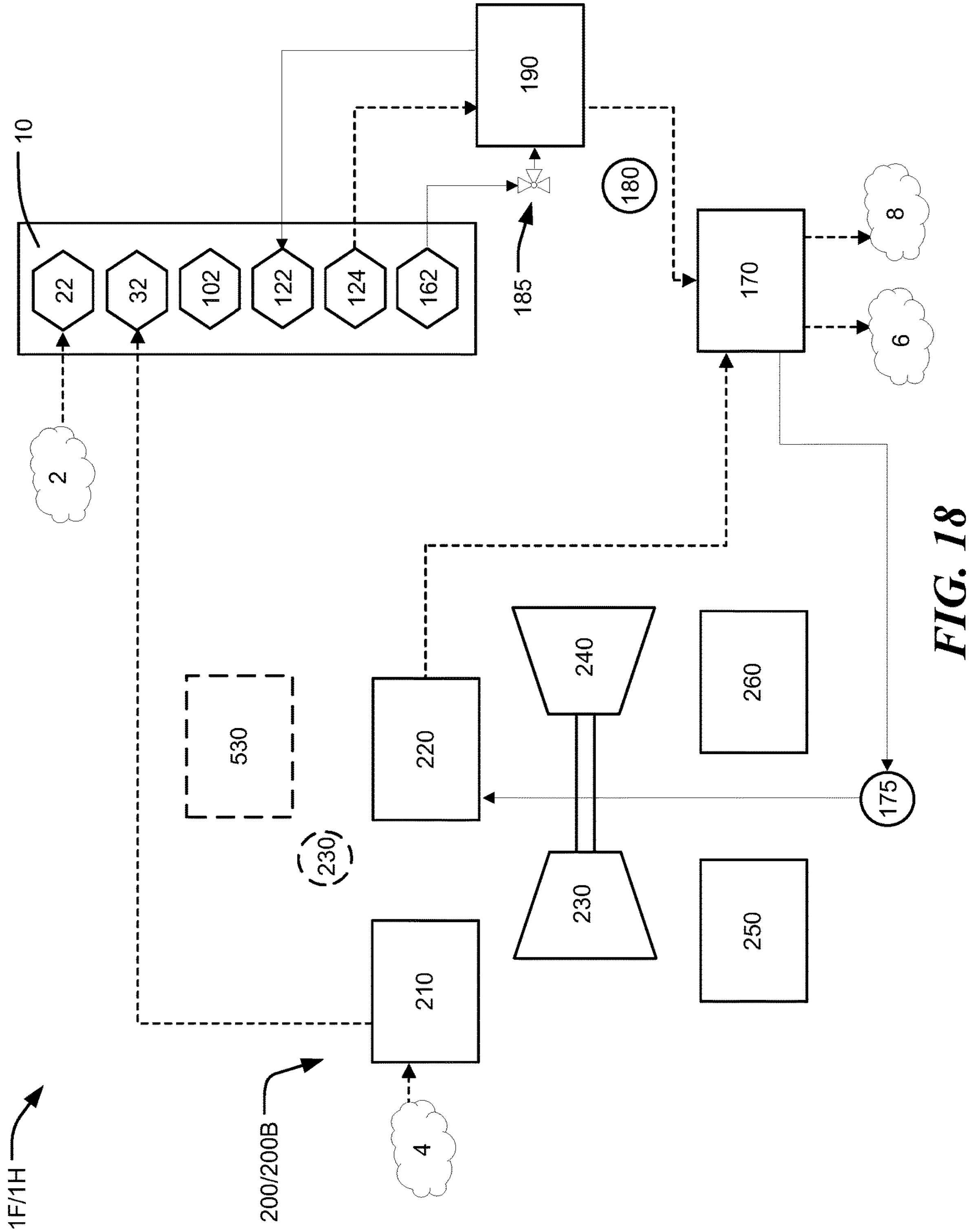
FIG. 18 is a block diagram of the power plants of FIGS. 17 and 21 during discharging modes.

FIG. 18 illustrates a discharging mode of the Brayton cycle heat pump 200 (and heat pump 200B discussed below) of the power plant 1F (and 1H). During discharge, the ambient air 4 is directed through the cold storage unit 210 to reduce its temperature before entering the inlet 32 of the compressor. Instead of utilizing steam from the low-pressure turbine inlet 102, water is pumped from the carbon capture system 170 to the hot storage unit 220 via a pump 175 to produce steam needed for solvent regeneration in the carbon capture system 170. Also, instead of routing the flue gas from the outlet 124 of the low-pressure economizer 120 to the hot recuperator 260 or directly to the carbon capture system 170, it may be routed through the preheater 190, transferring addition heat to the water stream entering the inlet 122 of the low-pressure economizer 120.

Each of power plants 1G-1K (FIGS. 19-26) disclose an optional resistive heater 530 and blower 230 (both shown in broken lines) fluidically connected to the hot storage unit 220 similar to power plants 1F and 1H discussed above. The restive heaters 530 in these power plants may operate in a similar manner as discussed above and for brevity is not discussed in detail below.

Figure 19:
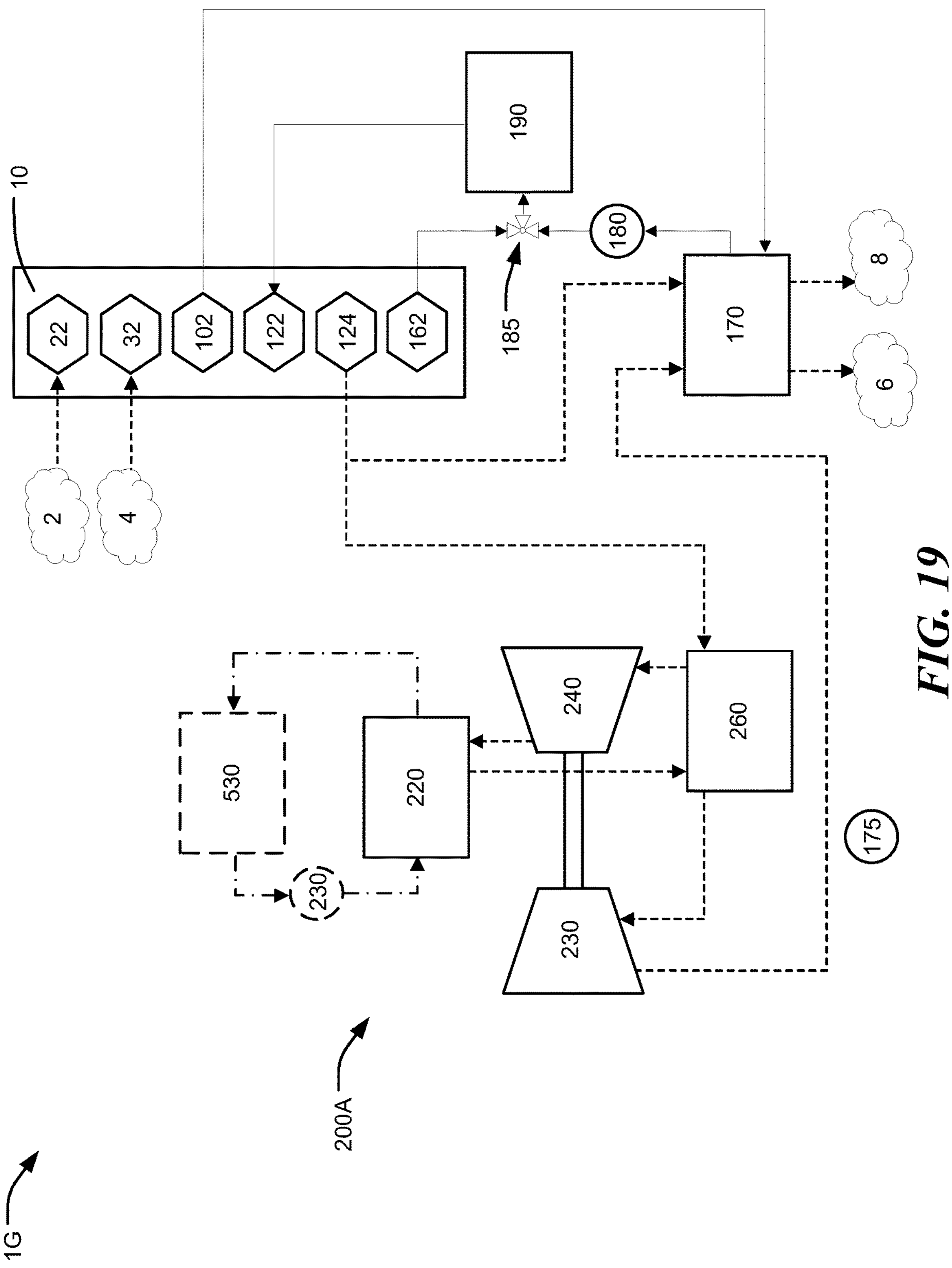
FIG. 19 is a block diagram of an exemplary power plant including the partial base power plant of FIG. 1 along with a carbon capture system and a Brayton cycle heat pump operated with a flue gas and using a hot storage unit during a charging mode.
Figure 20:
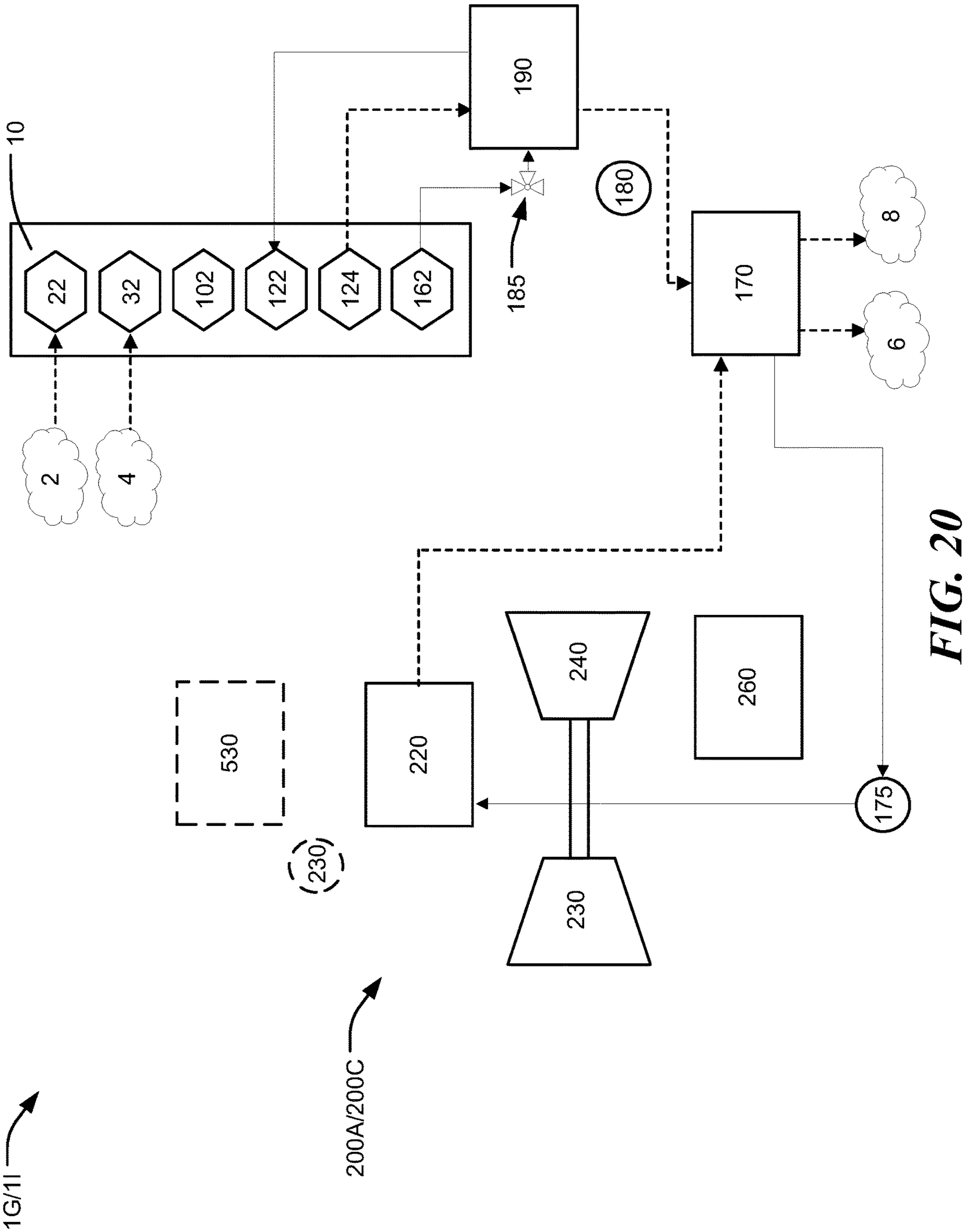
FIG. 20 is a block diagram of the power plant of FIGS. 29 and 32 during discharging modes.

FIGS. 19 and 20 illustrate a power plant 1G having a Brayton cycle heat pump 200A in charging and discharging modes, respectively, that uses the flue gas as the working fluid and includes the hot storage unit 220. The power plant 1G includes the partial power plant 10 and the heat pump 200A is nearly identical to the heat pump 200 except that it does not have a cold storage unit 210 or cold recuperator 260. As shown in FIG. 19, during the charging mode, the flue gas is routed from the hot storage unit 220 through the hot recuperator 260 and to the turbine 230 and then to the carbon capture system 170. During the discharging mode, the inlet of the compressor 32 directly takes in ambient air 4.

Figure 21:
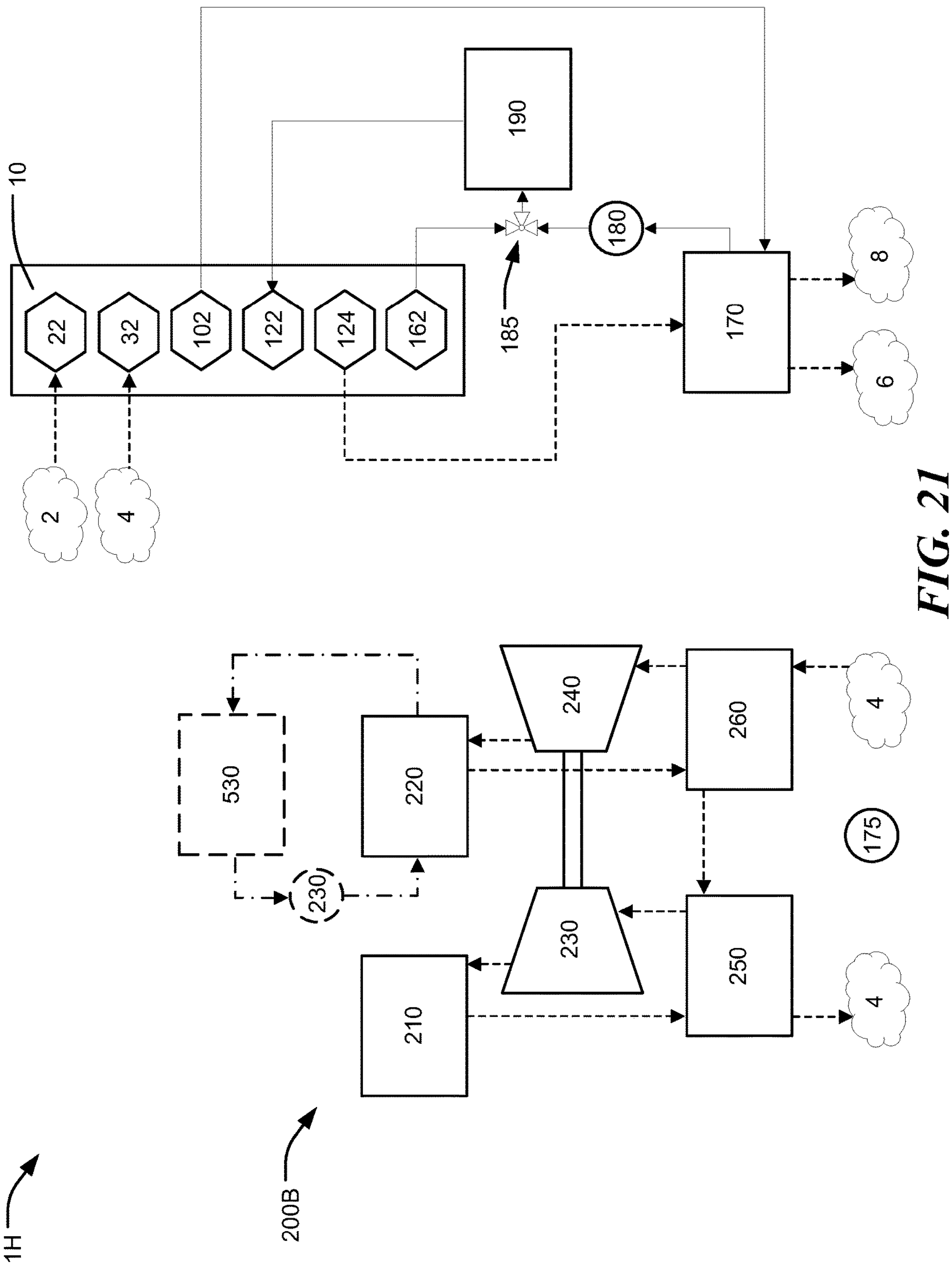
FIG. 21 is a block diagram of an exemplary power plant including the partial base power plant of FIG. 1 along with a carbon capture system and a Brayton cycle heat pump operated with air and using hot and cold storage units during a charging mode.

FIG. 21 illustrates a power plant 1H having a Brayton cycle heat pump 200B in a charging mode that uses air as the working fluid and includes the hot and cold storage units 220, 210. Power plant 1H includes the partial power plant 10 and is similar to power plant 1F (shown in FIGS. 17 and 18), but differs in that air instead of the flue gas is used in the thermal storage system. For example, as shown in FIG. 21, all of the flue gas leaving the exit 124 of the low-pressure economizer 120 enters the carbon capture system 170 instead of having a portion of it routed to the hot recuperator 260 as with the heat pump 200. As an input into the heat pump 200B, ambient air 4 enters the hot recuperator 260 as the working fluid. The air flows through the heat pump 200B in a similar manner as the flue gas previously described in power plant 1F, but is exhausted to the atmosphere after leaving the cold recuperator 250 instead of being routed to the carbon capture system 170. The discharge mode of the power plant 1H is identical to the discharge mode of the power plant 1F as shown in FIG. 18 and described above.

Figure 22:
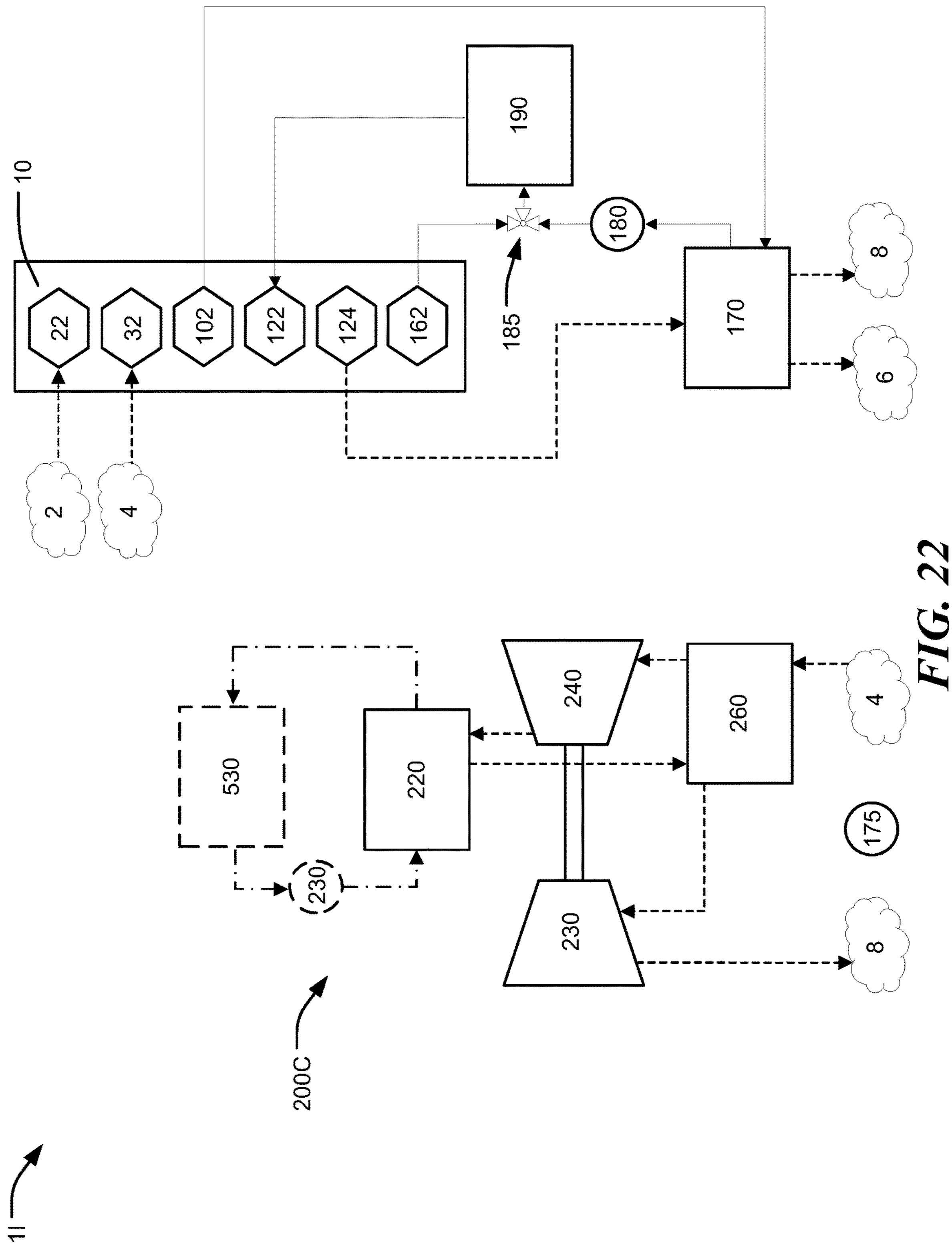
FIG. 22 is a block diagram of an exemplary power plant including the partial base power plant of FIG. 1 along with a carbon capture system and a Brayton cycle heat pump operated with air and using a hot storage unit during a charging mode.

FIG. 22 illustrates a power plant 1L having a Brayton cycle heat pump 200C in a charging mode that uses air as the working fluid and includes the hot storage unit 220. The power plant 1L includes the partial power plant 10 and the heat pump 200C is nearly identical to the power plant 1G and heat pump 200A except that it does not have the cold storage unit 210 or the cold recuperator 260. Thus, as shown in FIG. 22, during the charging mode, air is routed from the hot storage unit 220 through the hot recuperator 260 and to the turbine 230 where it is then exhausted. The discharge mode of the power plant 1L is identical to the discharge mode of the power plant 1F as shown in FIG. 20 and described above.

As can be seen in a comparison of the heat pumps 200 and 200A as shown in FIGS. 17 and 19 with the heat pumps 200B and 200C as shown in FIGS. 21 and 22, the use of air as the working fluid (FIGS. 21 and 22) in the heat pump 200C instead of the flue gas (FIGS. 17 and 19) allows the heat pump 200C to be operated independently from waste heat from the power plant 1L.

Figure 23:
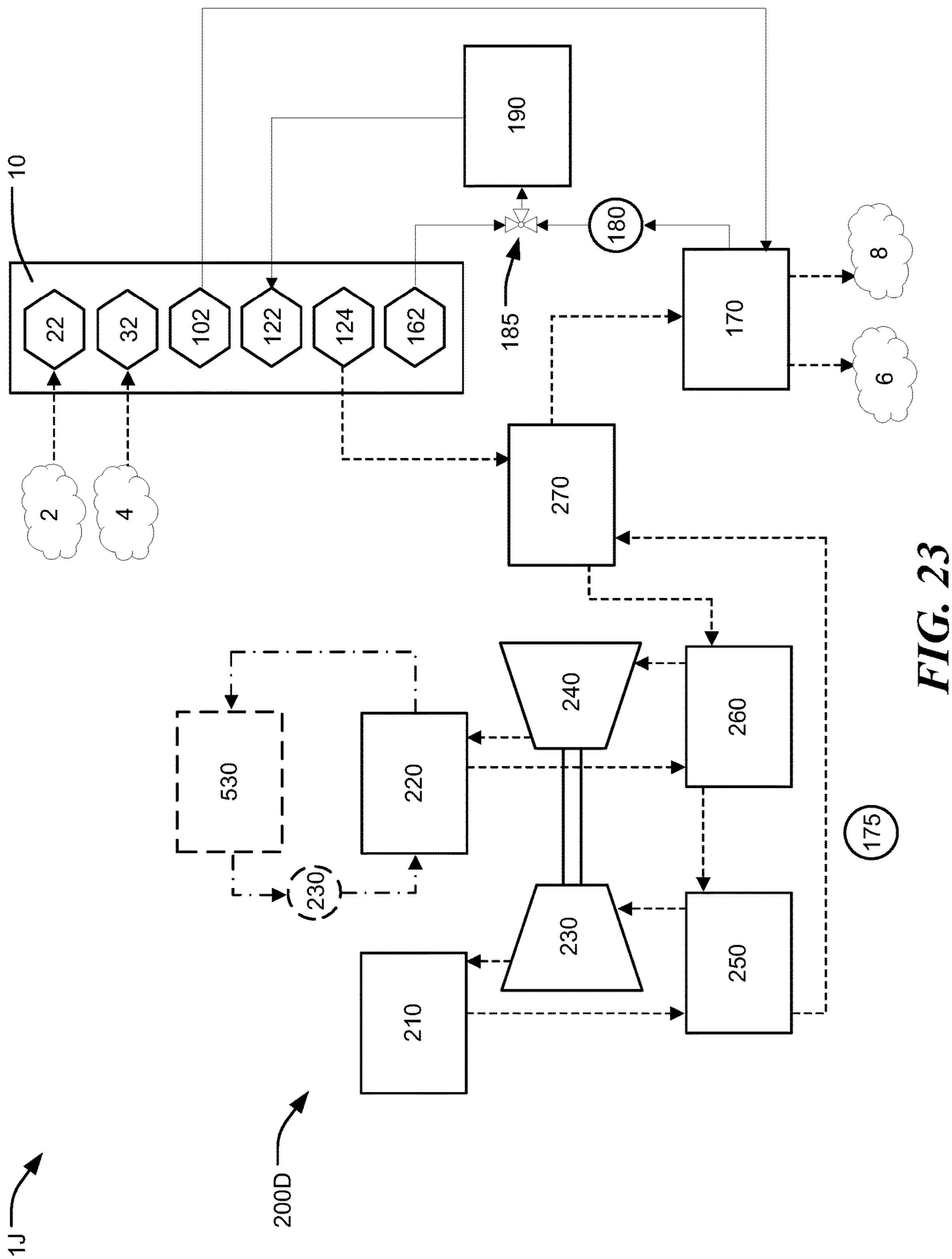
FIG. 23 is a block diagram of an exemplary power plant including the partial base power plant of FIG. 1 along with a carbon capture system and a Brayton cycle heat pump operated with flue gas heated air and using hot and cold storage units during a charging mode.

FIG. 23 illustrates a power plant 1J having a Brayton cycle heat pump 200D in a charging mode that uses flue gas heated air as the working fluid and includes the hot and cold storage units 220, 210. The power plant 1J includes the partial power plant 10 and is substantially the same as the power plant 1H except that in the heat pump 200D, air is recirculated in a closed loop and passes through a heat exchanger 270. For example, after air leaves the cold recuperator 250 it is routed to the heat exchanger 270 to preheat the air. After being preheated, the air is routed back to the hot recuperator 260 where it heated and continues through the heat pump 200D in a similar manner as heat pump 200B described above. The flue gas is routed from the exit 124 of the low-pressure economizer 120 to the heat exchanger 270 for transferring heat to air in the heat pump 200D. After flowing through the heat exchanger 270 the flue gas is then routed to the carbon capture system 170.

Figure 24:
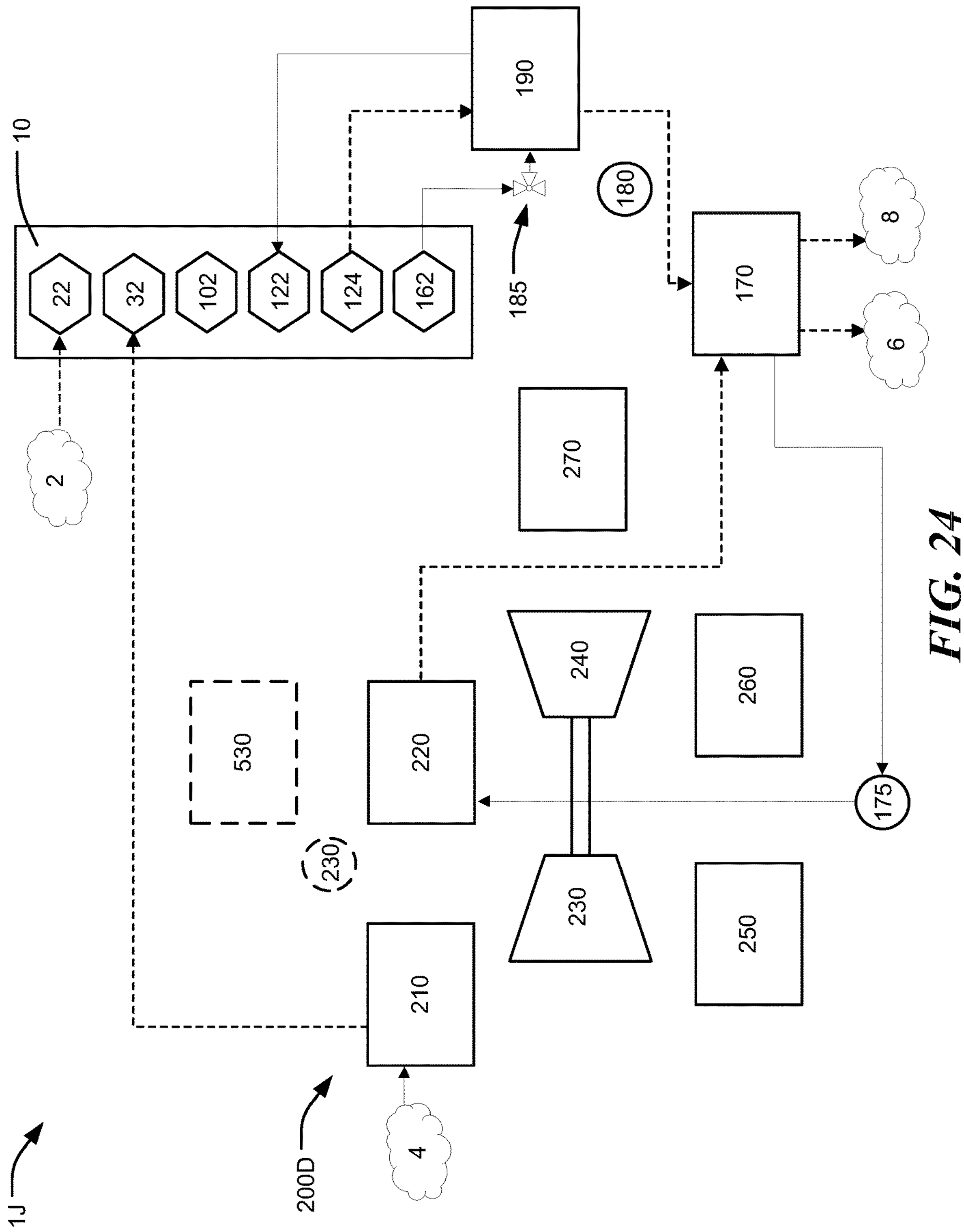
FIG. 24 is a block diagram of the storage system of FIG. 23 during a discharging mode.

FIG. 24 illustrates a discharging mode of the Brayton cycle heat pump 200D of the power plant 1J. The discharging mode of the heat pump 200D is substantially the same as the discharging modes of heat pumps 200 and 200B from power plants 1F and 1H, respectively, as shown in FIG. 17 and described above.

Figure 25:
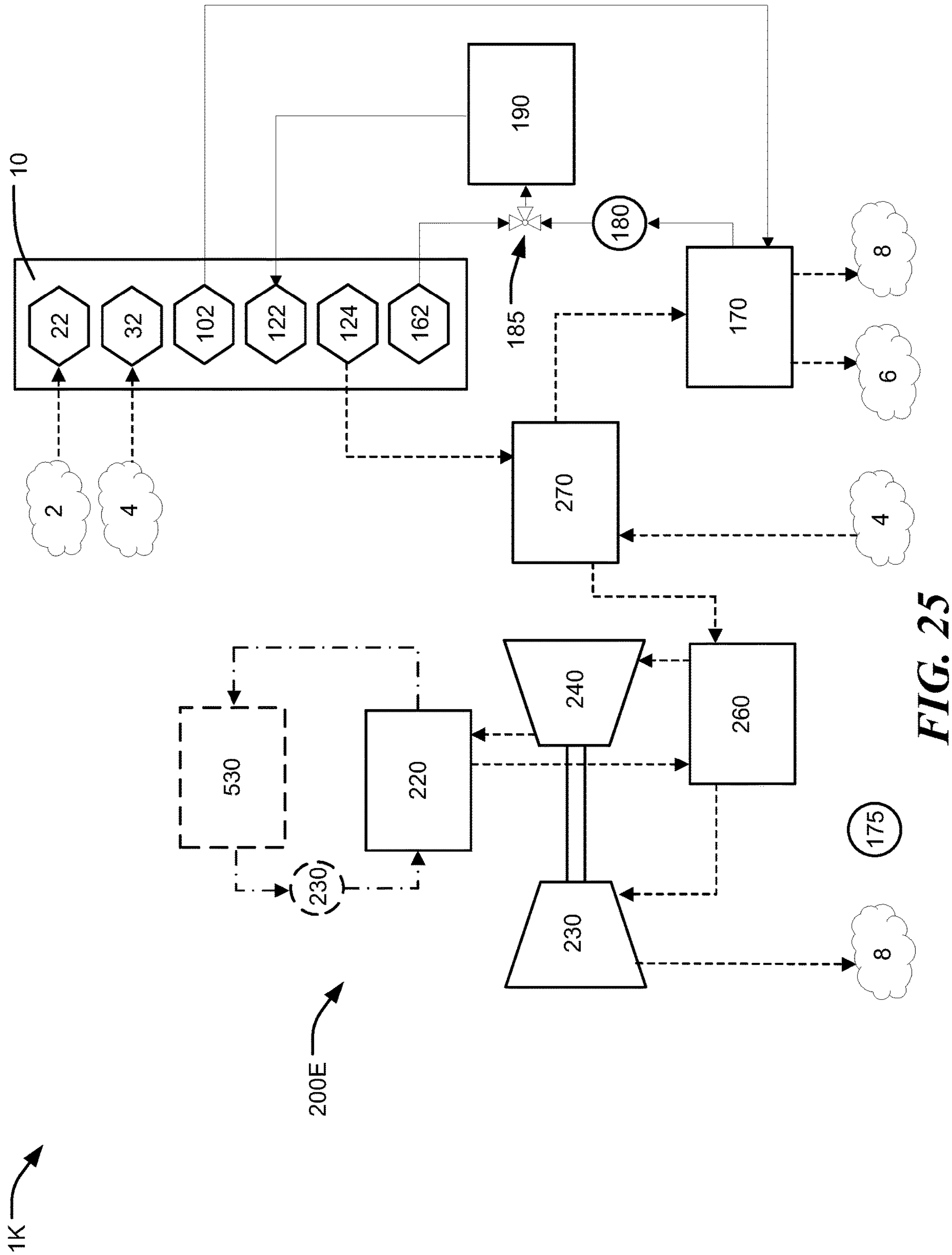
FIG. 25 is a block diagram of an exemplary power plant including the partial base power plant of FIG. 1 along with a carbon capture system and a Brayton cycle heat pump operated with flue gas heated air and using a hot storage unit during a charging mode.

FIG. 25 illustrates a power plant 1K having a Brayton cycle heat pump 200E in a charging mode that uses flue gas heated air as the working fluid and includes the hot and cold storage units 220, 210. The power plant 1K includes the partial power plant 10 and the heat pump 200E and is similar to power plant 1I, including heat pump 200C, except that in the heat pump 200E, the intake air is preheated in the heat exchanger 270 before entering the hot recuperator 260. For example, ambient air 4 is drawn into the heat exchanger 270 to preheat the air. After being preheated, the air is routed back to the hot recuperator 260 where it heated and continues through the heat pump 200D in a similar manner as heat pump 200C described above. The flue gas is routed from the exit 124 of the low-pressure economizer 120 to the heat exchanger 270 for transferring heat to air in the heat pump 200D. After flowing through the heat exchanger 270 the flue gas is then routed to the carbon capture system 170.

Figure 26:
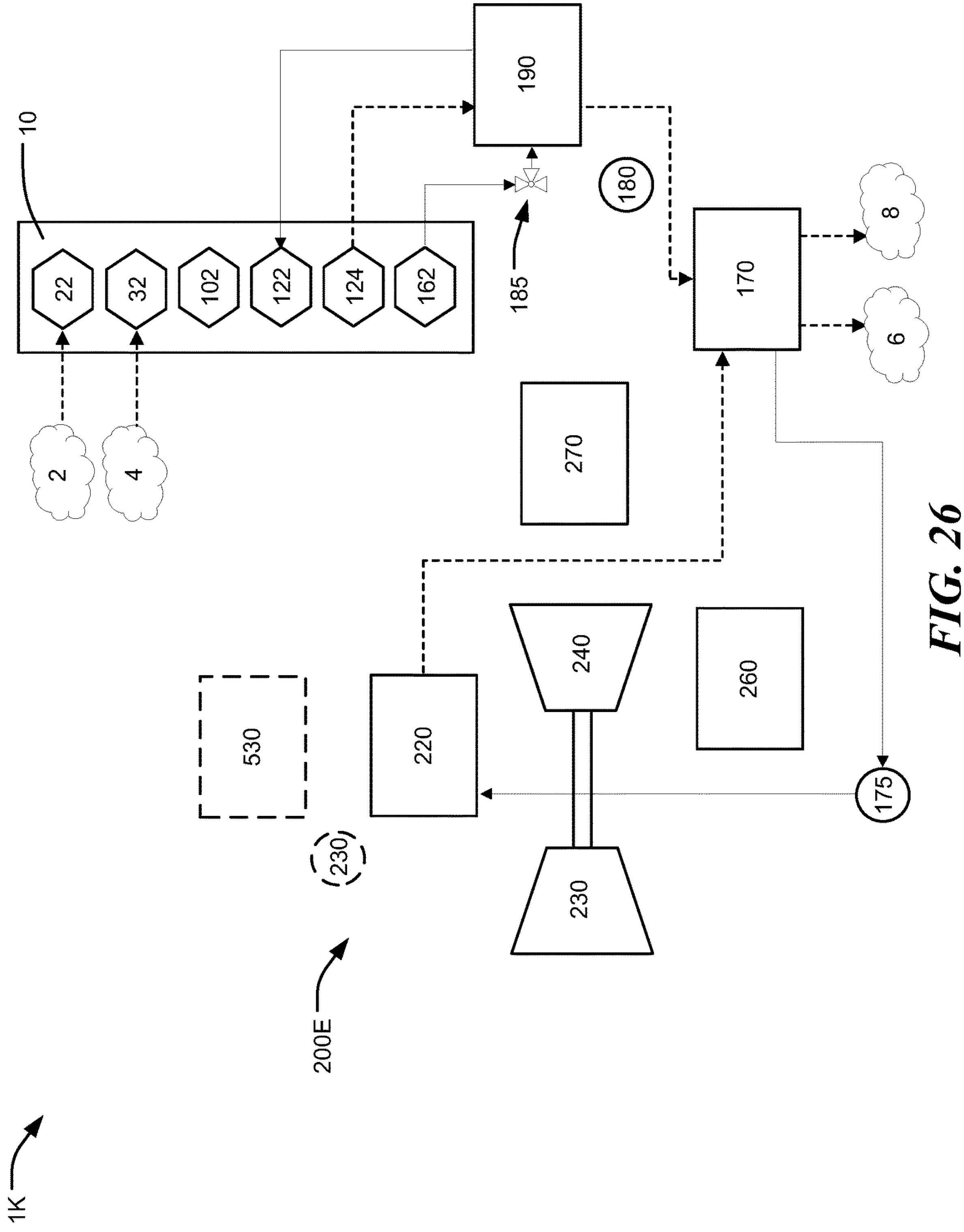
FIG. 26 is a block diagram of the storage system of FIG. 25 during a discharging mode.

FIG. 26 illustrates a discharging mode of the Brayton cycle heat pump 200E of power plant 1K. The discharging mode of the power plant 1K including heat pump 200E is substantially the same as the discharging modes of power plants 1G and 1I including heat pumps 200A and 200C, respectively, as shown in FIG. 20 and described above.

Figure 27:
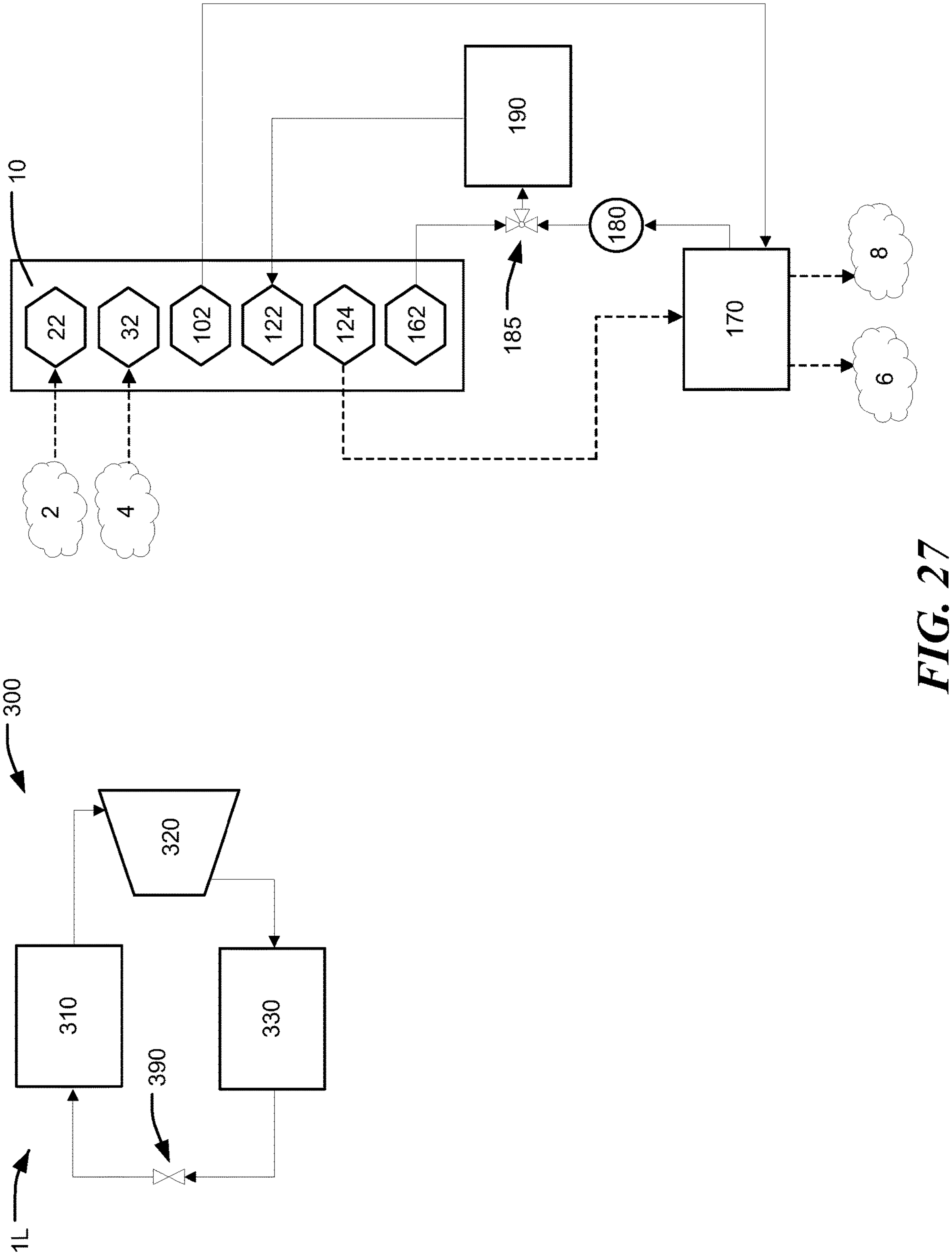
FIG. 27 is a block diagram of an exemplary power plant including the partial base power plant of FIG. 1 along with a carbon capture system and a vapor compression heat pump operated with a refrigerant and using a cold storage unit during a charging mode.

FIGS. 27-38 disclose various power plants having vapor compression heat pumps integrated with the partial base power plant 10 or 10A. FIG. 27 illustrates a power plant 1L having a vapor compression heat pump 300 in a charging mode that uses a refrigerant such as, for example, ammonia as the working fluid and includes a cold storage unit 310. The power plant 1L includes the partial power plant 10. Although ammonia is used as the working fluid in this example, one having ordinary skill in the art would appreciate that other working fluids, such as R134a may be used.

In the heat pump 300, ammonia is compressed in the compressor 320 which is powered by electricity from the power plant 1L or the grid. The compressed ammonia is then routed to a cooling tower 330 where heat is removed. Next the ammonia is routed to a throttling valve 390 where the ammonia expands, evaporates, and absorbs heat from a cold storage unit 310. Similar to the cold storage unit 210, the cold storage unit 310 may also be comprised of concrete, for example. After absorbing the heat, the ammonia is returned to the compressor 320. All fluid pathways entering or leaving the carbon capture system 170 and the preheater 190 are substantially the same as at least power plants 1H and 1I as shown in FIGS. 21 and 22, respectively.

Figure 28:
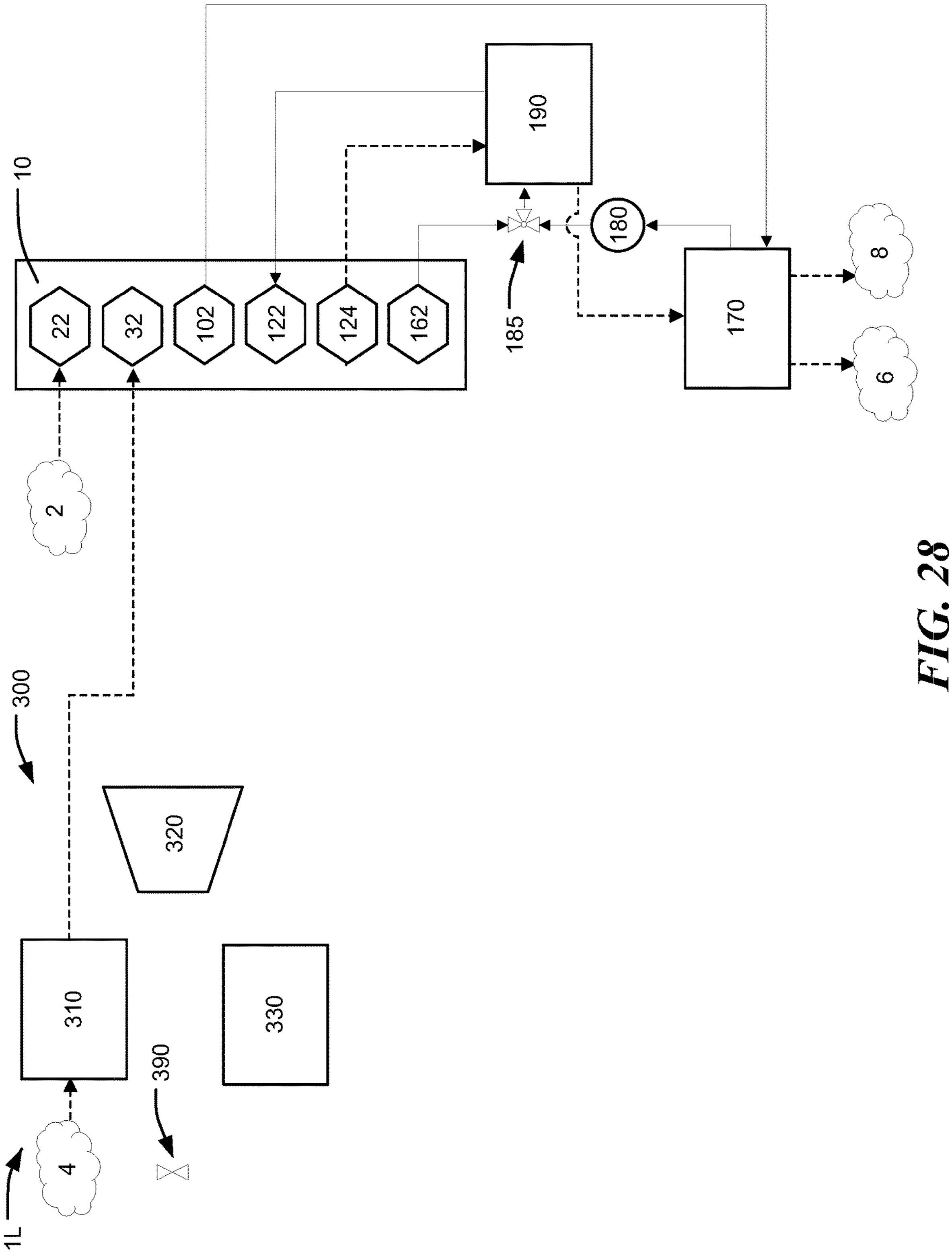
FIG. 28 is a block diagram of the power plant of FIG. 27 during a discharging mode.

FIG. 28 illustrates a discharging mode of the vapor compression heat pump 300 of power plant 1L. During discharge, the ambient air 4 is directed through the cold storage unit 310 to reduce its temperature before entering the inlet 32 of the compressor 320. Also, some or all of the flue gas may be routed from the outlet 124 of the low-pressure economizer 120 through the preheater 190 to provide heat to the water stream entering the inlet of the low-pressure economizer 120 before being routed to the carbon capture system 170 for $CO_2$ removal. Water that has been recovered in the carbon capture system 170 is pumped through valve 185 where it joins water leaving the condensate pump outlet 162 and into the preheater 190. The preheater 190 and the carbon capture system 170 functions in the same manner as described above.

Figure 29:
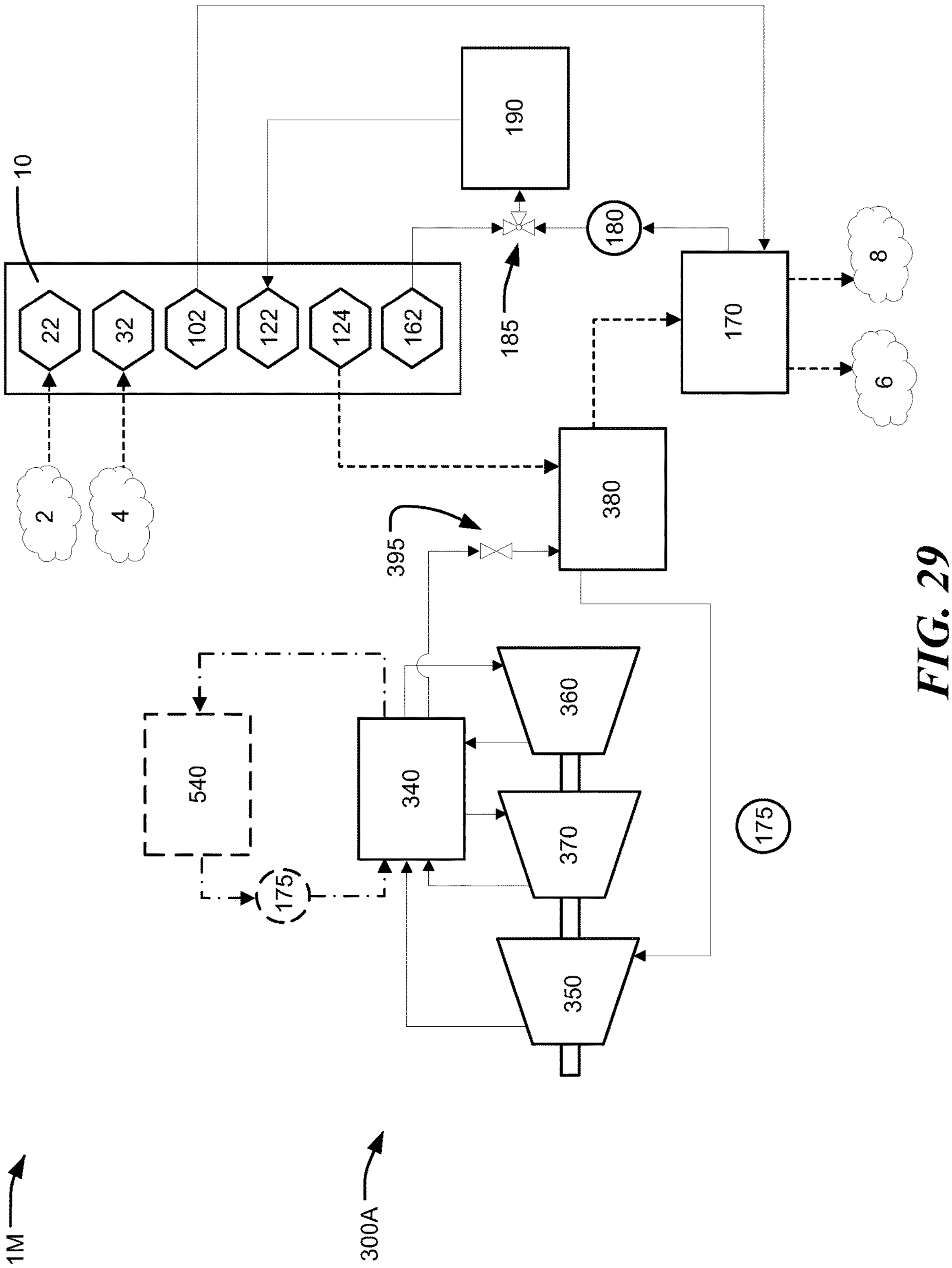
FIG. 29 is a block diagram of an exemplary power plant including the partial base power plant of FIG. 1 along with a carbon capture and a vapor compression heat pump operated with flue gas heated steam and using a hot storage unit during a charging mode.

FIG. 29 illustrates a power plant 1M having a vapor compression heat pump 300A in a charging mode that uses a refrigerant, such as steam as the working fluid and includes the hot storage unit 340, which may include thermal storage unit 340A (FIGS. 52-53) as discussed above. The power plant 1M includes the partial power plant 10 and similar to the power plants 1J and 1K, the flue gas is routed from the exit 124 of the low-pressure economizer 120 to a heat exchanger 380 to transfer heat to the water in the heat pump 300A. After the flue gas leaves the heat exchanger 380, it flows to the carbon capture system 170. In the heat exchanger 380, the water absorbs heat and is converted into steam. Thereafter, the steam is routed to a first compressor 350, causing an increase in temperature and pressure to the steam. The steam then passes through the hot storage unit 340 where it transfers its heat before being routed to a second compressor 360. Similar to the hot storage unit 220, the hot storage unit 340 may also be comprised of concrete, for example. The second compressor 360 further compresses the steam causing its temperature to rise. Next, the steam is routed back to the hot storage unit 340 where heat is transferred from the steam to the hot storage unit 340. The steam is then routed to a third compressor 370 where it compresses the steam causing an increase in temperature and pressure. The steam then flows back through the hot storage unit 340 where heat is again transferred from the steam to the hot storage unit 340. Next, after leaving the hot storage unit 340, the steam is routed through a throttling valve 395 where the pressure and temperature of the steam decreases as it returns to the heat exchanger 380 to repeat the cycle. FIG. 29 depicts the heat pump 300A having three compressors 350, 360, and 370, but in other embodiments not shown, the heat pump 300A may have a single compressor, two compressors, or more than three compressors. Each of the compressors 350, 360, and 370 may be operated with electricity produced by the power plant 1M or from the grid.

In addition, water from the outlet 162 of the condensate pump 160 and water pumped from pump 180 combine at valve 185 then continues to the preheater 190 where it is warmed and returned to the inlet 122 of the low-pressure economizer 120.

In addition to the vapor compression heat pump 300A, the power plant 1M may optionally include the hot storage unit 540 (which includes a restive heater) and a pump 175 (both shown in broken lines), which operate substantially in the same manner as discussed above with regard to power plants 1D and 1E. The vapor compression heat pump 300A and the hot storage unit 540 may operate in a hybrid arrangement where only one system at a time or both systems at the same time may generate heat. In such hybrid arrangement, the hot storage unit 340 may have a different construction where the passageways 347 of thermal storage unit 340A partially extend into the blocks 342, such as less than 50% of the block length (or accessing less than 50% of the effective volume of the blocks 342 for non-uniform geometries of blocks 342), in other embodiments, the passageways 347 partially extend into the blocks 222 less than 40% of the block length, less than 30% of the block length, less than 20% of the block length, or less than 10% of the block length.

In the hybrid example discussed above the hot storage unit 540 transfers it heat via steam to the hot storage unit 340 of the vapor compression heat pump 300A, however, in other embodiments, the hot storage unit 540 may transfer its heat directly to the carbon capture system 170 as discussed above with regard to power plants 1-1E (FIGS. 5-16). In other embodiments, the hot storage unit 340 may be replaced with a hot storage unit 210 (using a thermal storage unit 210A) and the hot storage unit 540 may be replaced with a resistive heater 530 with or without additional hot storage units 510 as discussed above in a similar manner with respect to power plant 1F (FIGS. 17-18).

Figure 30:
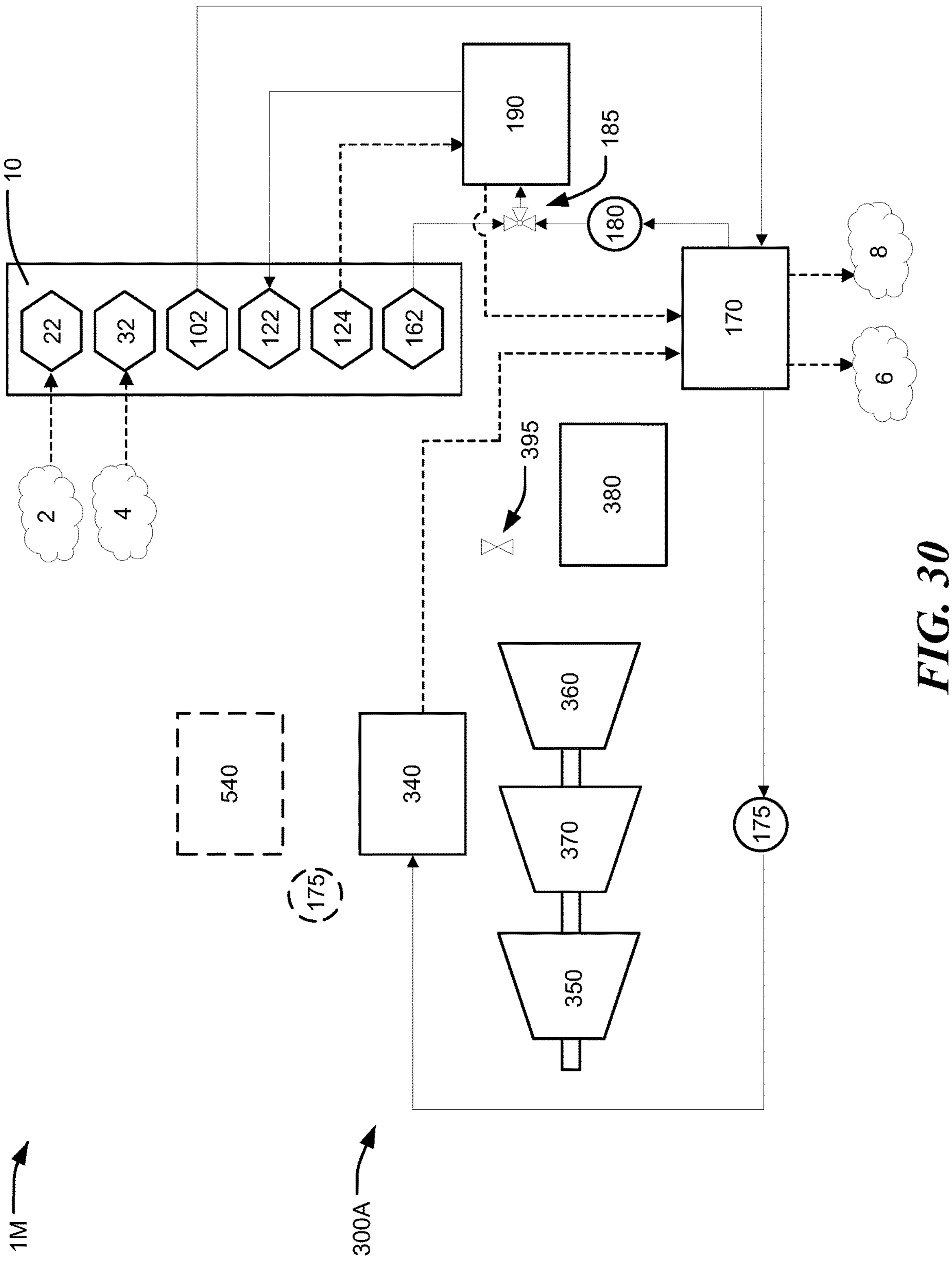
FIG. 30 is a block diagram of the power plant of FIG. 29 during a discharging mode.

FIG. 30 illustrates a discharging mode of the vapor compression heat pump 300A of power plant 1M. During discharge, the flue gas is routed through the preheater 190 before entering the carbon capture system 170 in a similar manner as the power plant 1L as shown in FIG. 28. In addition, water from the carbon capture system 170 is pumped by pump 175 through the hot storage unit 340 where it absorbs heat therefrom for solvent regeneration.

Each of power plants 1N-1U (FIGS. 31-46) disclose an optional hot storage unit 540 and pump 175 (both shown in broken lines) fluidically connected to the hot storage unit 340 similar to power plants 1M discussed above. The hot storage units 540 in these power plants may operate in a similar manner as discussed above and for brevity is not discussed in detail below.

Figure 31:
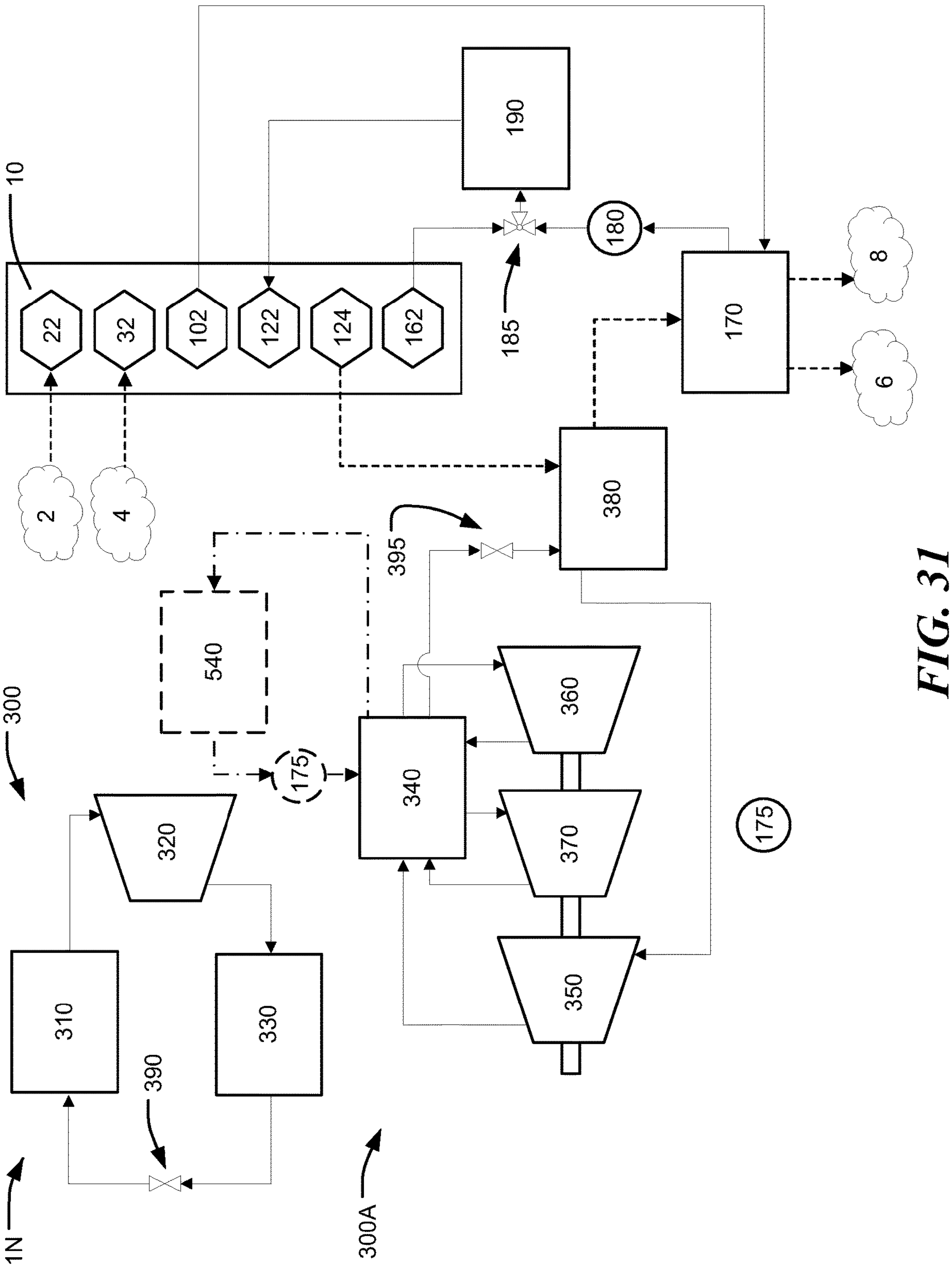
FIG. 31 is a block diagram of an exemplary power plant including the partial base power plant of FIG. 1 along with a carbon capture system and two vapor compression heat pumps operated with flue gas heated steam and a refrigerant and using hot and cold storage units, respectively, during a charging mode.
Figure 32:
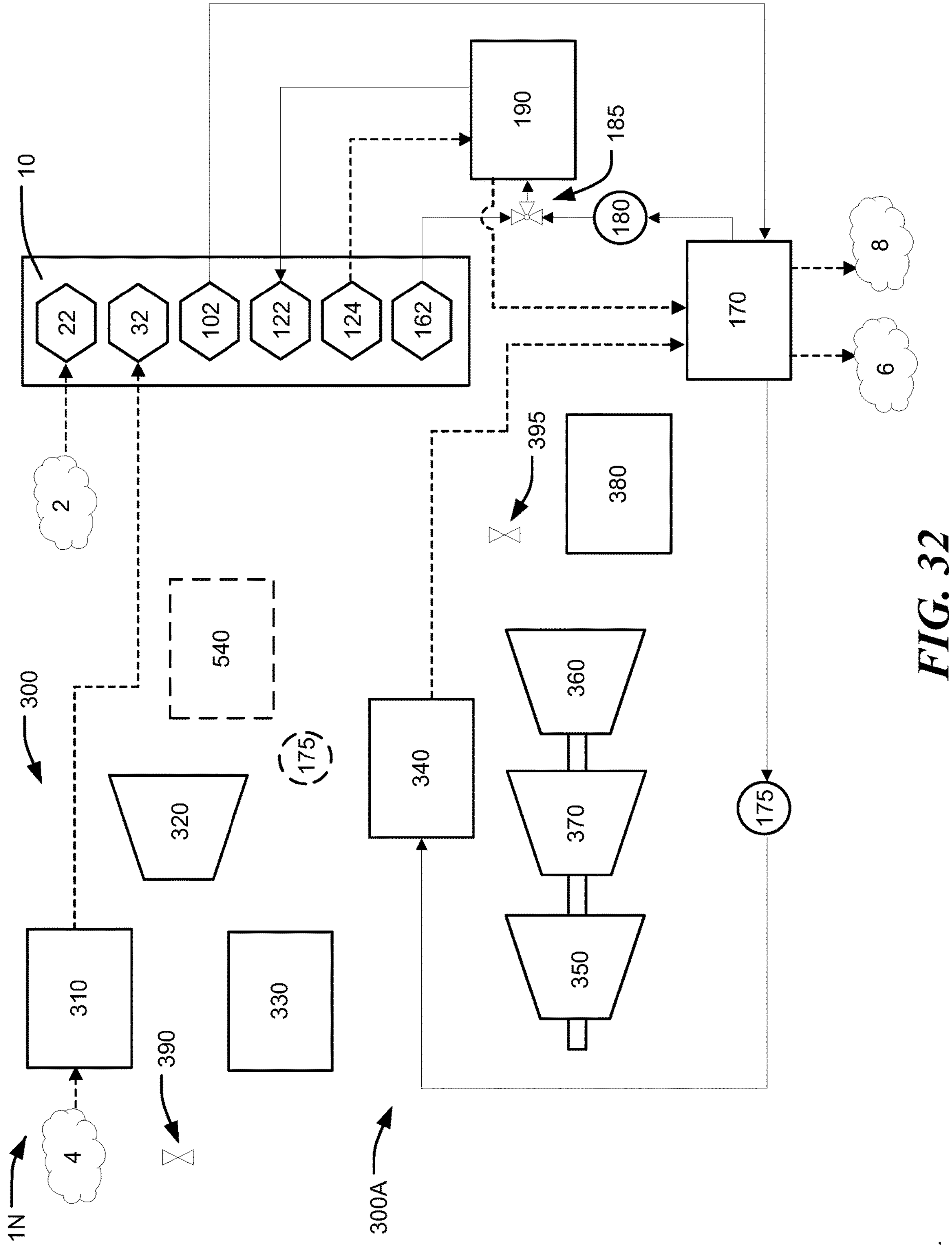
FIG. 32 is a block diagram of the power plant of FIG. 31 during a discharging mode.

FIGS. 31 and 32 illustrate respective charging and discharging modes of a power plant 1N having vapor compression heat pumps 300 and 300A that uses refrigerants, such as ammonia and steam as the working fluids and include the cold and hot storage units 310, 340. The power plant 1N includes the partial power plant 10 and similar to power plants 1L and 1M, the heat pumps 300 and 300A operate in substantially the same manner as they are respectively shown in FIGS. 27-30.

FIG. 33 illustrates a power plant 10 having a vapor compression heat pump 300B in a charging mode that uses a refrigerant, such as steam as the working fluid and includes the hot storage unit 340. The power plant 10 includes the partial base power plant 10A, which, as mentioned above, includes a second low-pressure steam turbine 115, which may receive water in parallel with the low-pressure steam turbine 110. The second low-pressure steam turbine 115 may output water at an exit 117 to a heat exchanger 380 where it condenses and transfers heat to steam in the heat pump 300B. After condensing, the water is pumped by pump 165 to a valve 385 where it combines with condensed water from the outlet 162 of the condensate pump 160 and water from the carbon capture system 170. The water then continues to the preheater 190 where it is warmed and returned to the inlet 122 of the low-pressure economizer 120.

Returning to heat exchanger 380, the steam from output 117 causes water in a separate closed loop in the heat pump 300B to boil. The created steam is routed to the compressor 350 which is driven by electricity from the power plant 1I or the grid to compress the steam causing its temperature and pressure to increase. The steam then flows to the hot storage unit 340 where the steam transfers some of its heat to the hot storage unit 340. Next, the steam flows through the throttling valve 395 where its pressure and temperature decrease before returning to the heat exchanger 380.

FIG. 34 illustrates a discharging mode of the vapor compression heat pump 300B of the power plant 10. As with the power plant 1M shown in FIG. 30, during discharge, the flue gas is routed through the preheater 190 before entering the carbon capture system 170 and water from the carbon capture system 170 is pumped by pump 175 through the hot storage unit 340 where it absorbs heat therefrom for solvent regeneration.

Figure 35:
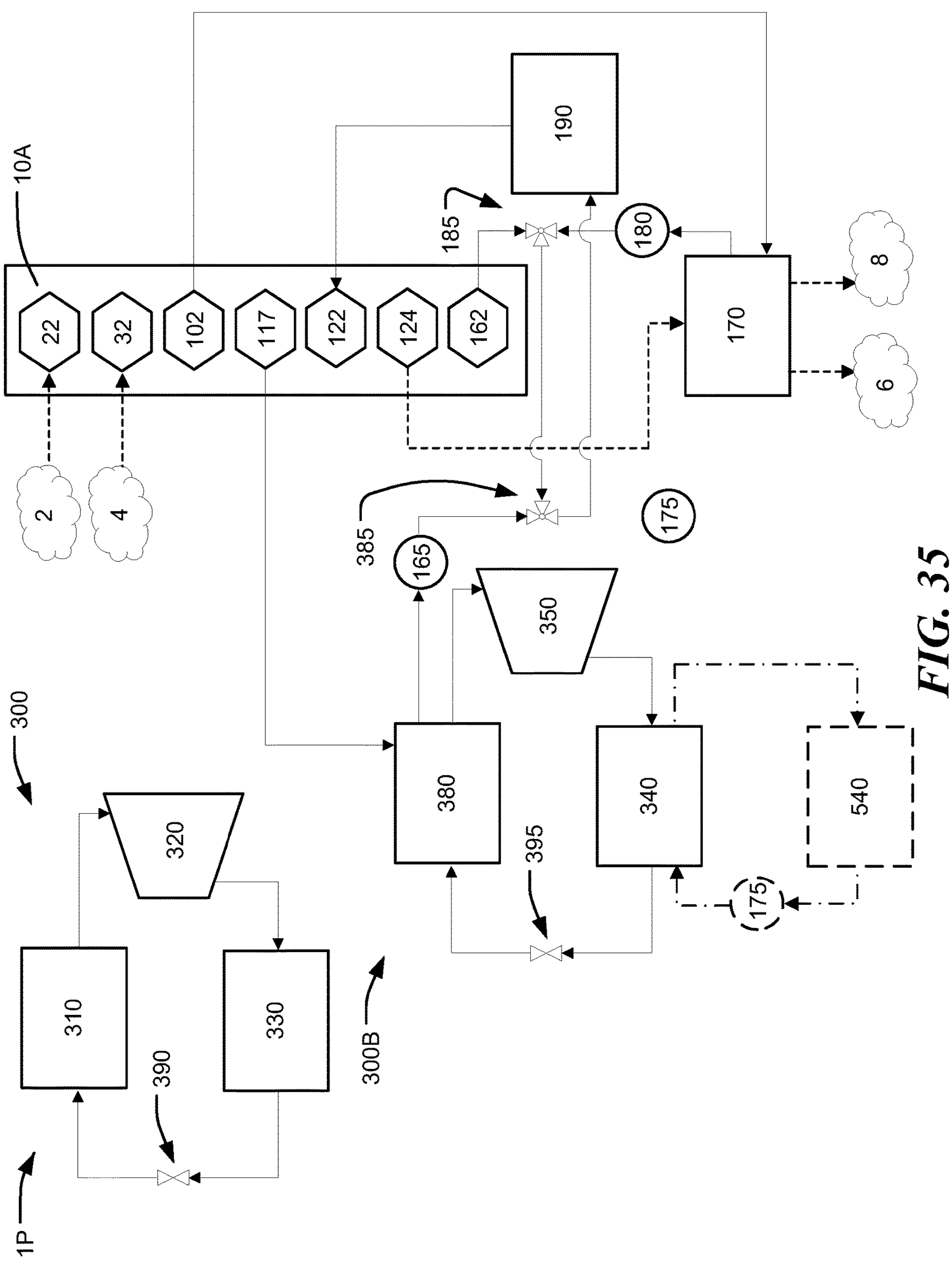
FIG. 35 is a block diagram of an exemplary power plant including the partial base power plant of FIG. 2 along with a carbon capture system and two vapor compression heat pumps operated with steam heated steam and a refrigerant and using hot and cold storage units, respectively, during a charging mode.
Figure 36:
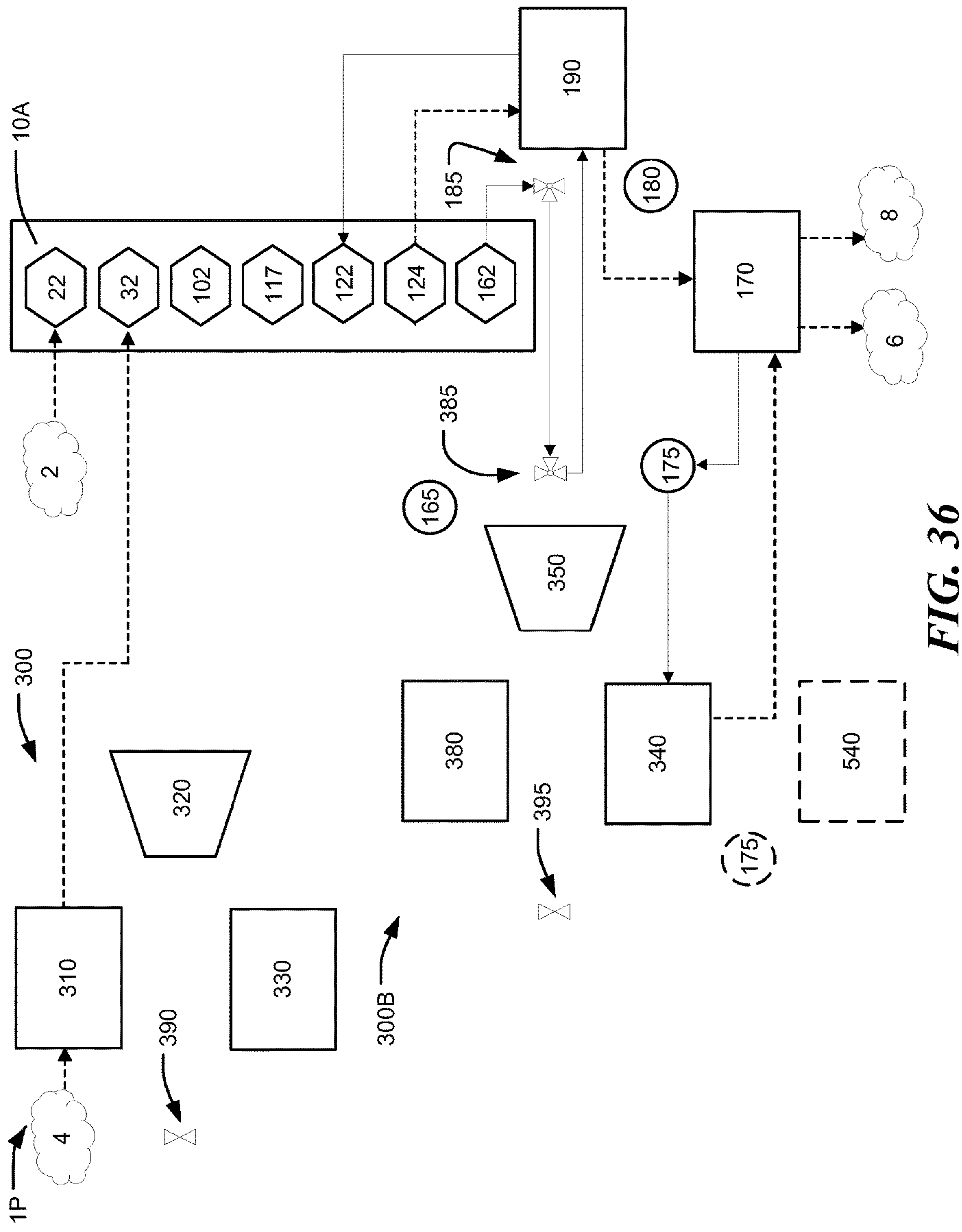
FIG. 36 is a block diagram of the power plant of FIG. 35 during a discharging mode.

FIGS. 35 and 36 illustrate respective charging and discharging modes of a power plant 1P having vapor compression heat pumps 300 and 300B that uses refrigerants, such as ammonia and steam as the working fluids and include the cold and hot storage units 310, 340. The power plant 1P includes the partial power plant 10A and the heat pumps 300 and 300B, the carbon capture system 170, and the preheater 190 operate in substantially the same manner as in power plants 1L and 1O as shown in FIGS. 27, 28, 33, and 35.

Figure 37:
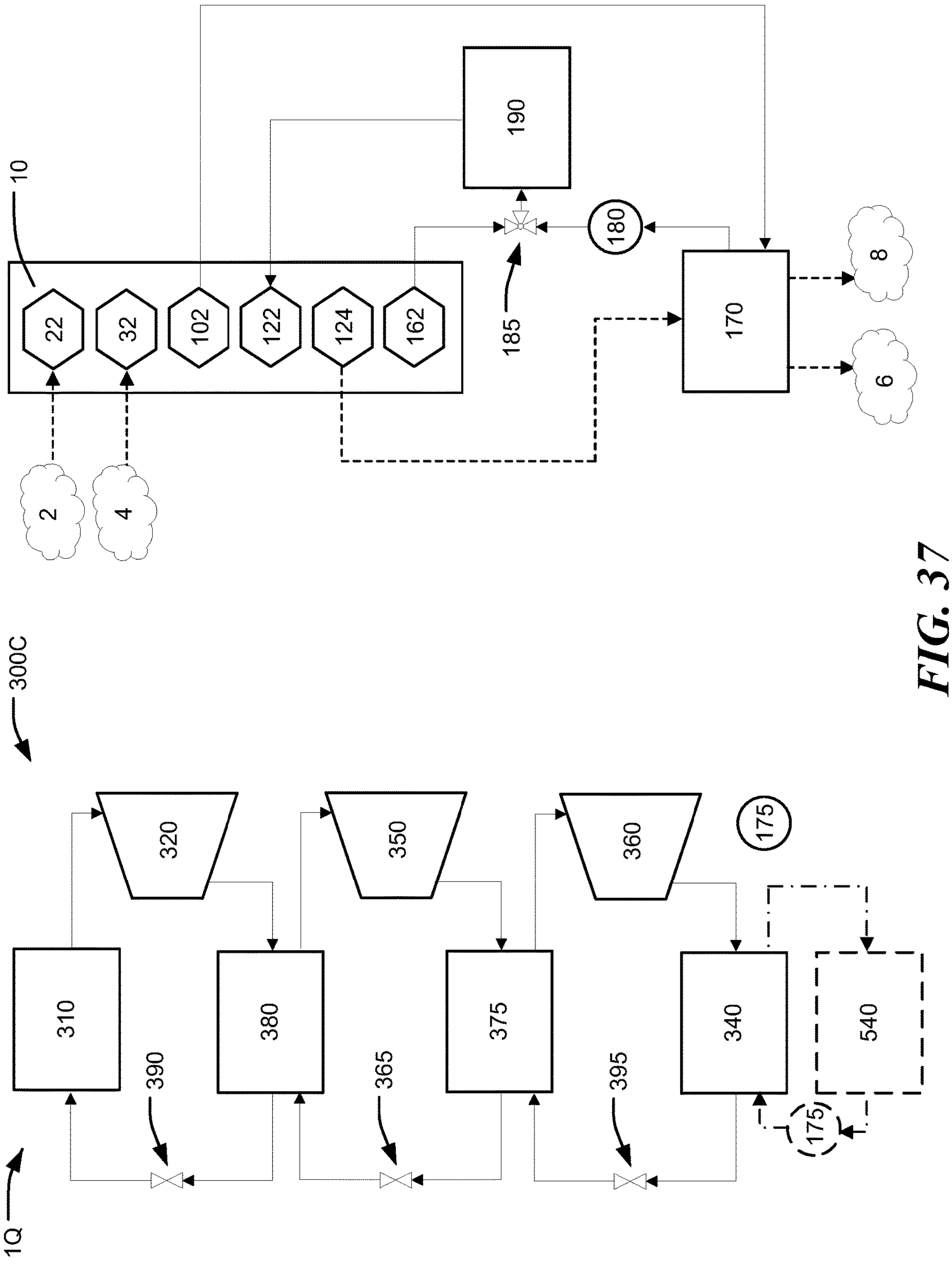
FIG. 37 is a block diagram of an exemplary power plant including the partial base power plant of FIG. 1 along with a carbon capture system and a tiered vapor compression heat pump operated with steam and multiple refrigerants and using hot and cold storage units during a charging mode.

FIG. 37 illustrates a power plant 1Q having a tiered vapor compression heat pump 300C in a charging mode that uses low, intermediate, and high temperature refrigerants as the working fluids and includes the hot and cold storage units 340, 310. The power plant 1Q includes the partial power plant 10. Similar to the power plants 1H and 1I shown in FIGS. 21 and 22, respectively, during the charging mode, the flue gas is routed from the exit 124 of the low-pressure economizer 120 to the carbon capture system 170 and water leaving the condensate pump exit 162 joins water leaving the carbon capture system 170 as it is routed to the preheater 190 and then back to the inlet 122 of low-pressure economizer 120.

The tiered vapor compression heat pump 300C has three closed loop cycles joined together via heat exchangers. Starting with the cold storage cycle, a low temperature refrigerant ("LTR") is compressed by the first compressor 320 causing an increase in temperature and pressure. The LTR is then routed to the first heat exchanger 380 where it transfers its heat to an intermediate temperature refrigerant ("ITR") flowing in an intermediate temperature cycle. Next the LTR is routed to the throttling valve 390 where the LTR expands, evaporates, and absorbs heat from the cold storage unit 310. After absorbing the heat, the LTR is returned to the compressor 320.

In the intermediate temperature cycle, before passing through the first exchanger 380, the ITR passes through a throttling valve 365 where the ITR expands, evaporates, and subsequently absorbs heat from the LTR in the first heat exchanger 380. After absorbing the heat, the LTR is routed to the second compressor 350 causing an increase in temperature and pressure. The ITR then flows to a second heat exchanger 375 where it transfers its heat to an high temperature refrigerant ("HTR") flowing in a high temperature cycle. Next, the ITR returns to the throttling valve 365.

In the high temperature cycle, before passing through the second exchanger 380, the HTR passes through a throttling valve 395 where the HTR expands, evaporates, and subsequently absorbs heat from the ITR in the second heat exchanger 375. After absorbing the heat, the HTR is routed to the third compressor 360 causing an increase in temperature and pressure. The HTR then flows to the hot storage unit 340 to where it transfers its heat. Next, the HTR returns to the throttling valve 395.

Each of the compressors 320, 350, and 360 may be powered by electricity generated by the power plant 1Q or from the grid.

Figure 38:
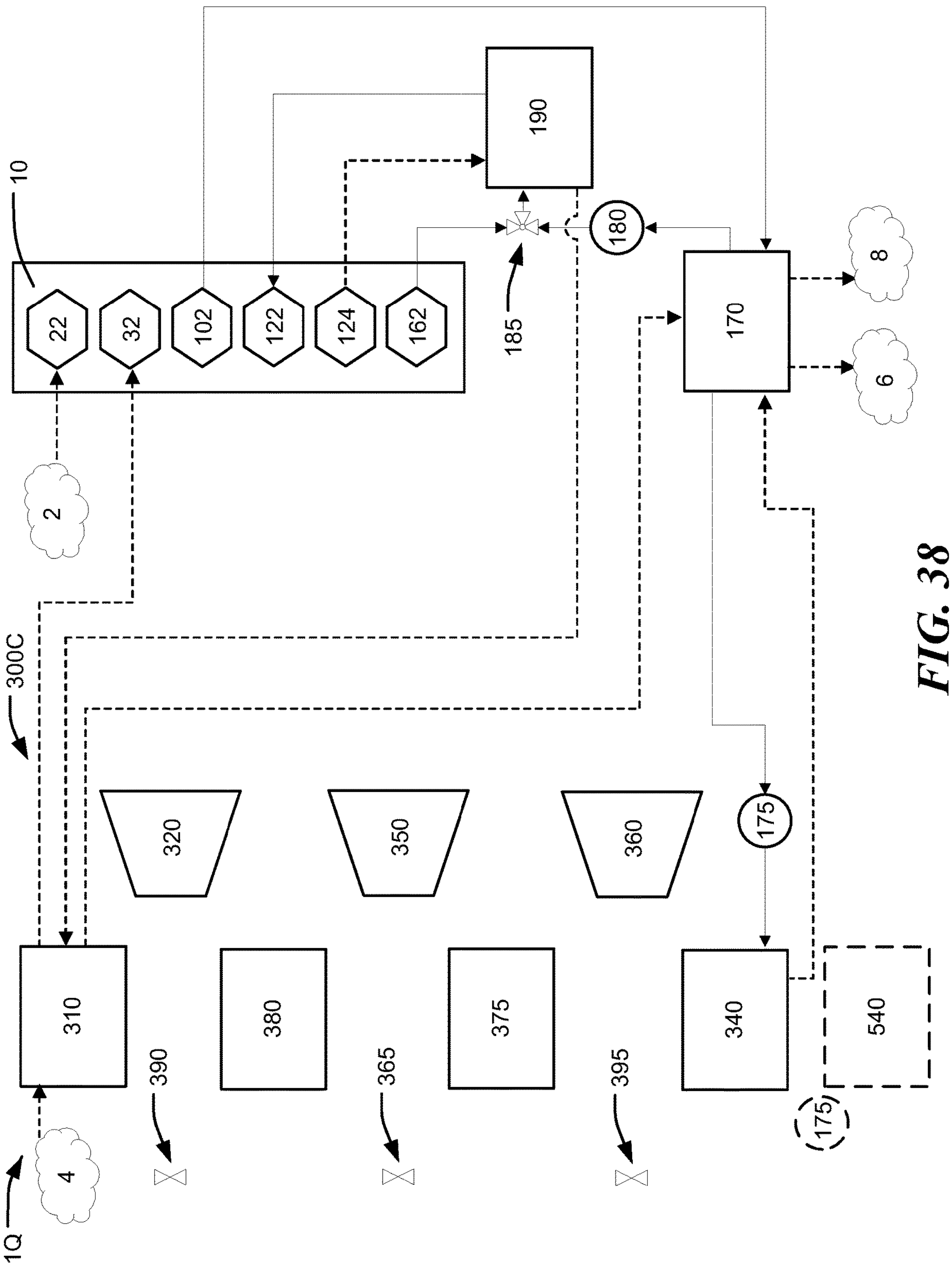
FIG. 38 is a block diagram of the storage system of FIG. 37 during a discharging mode.
Figure 39:
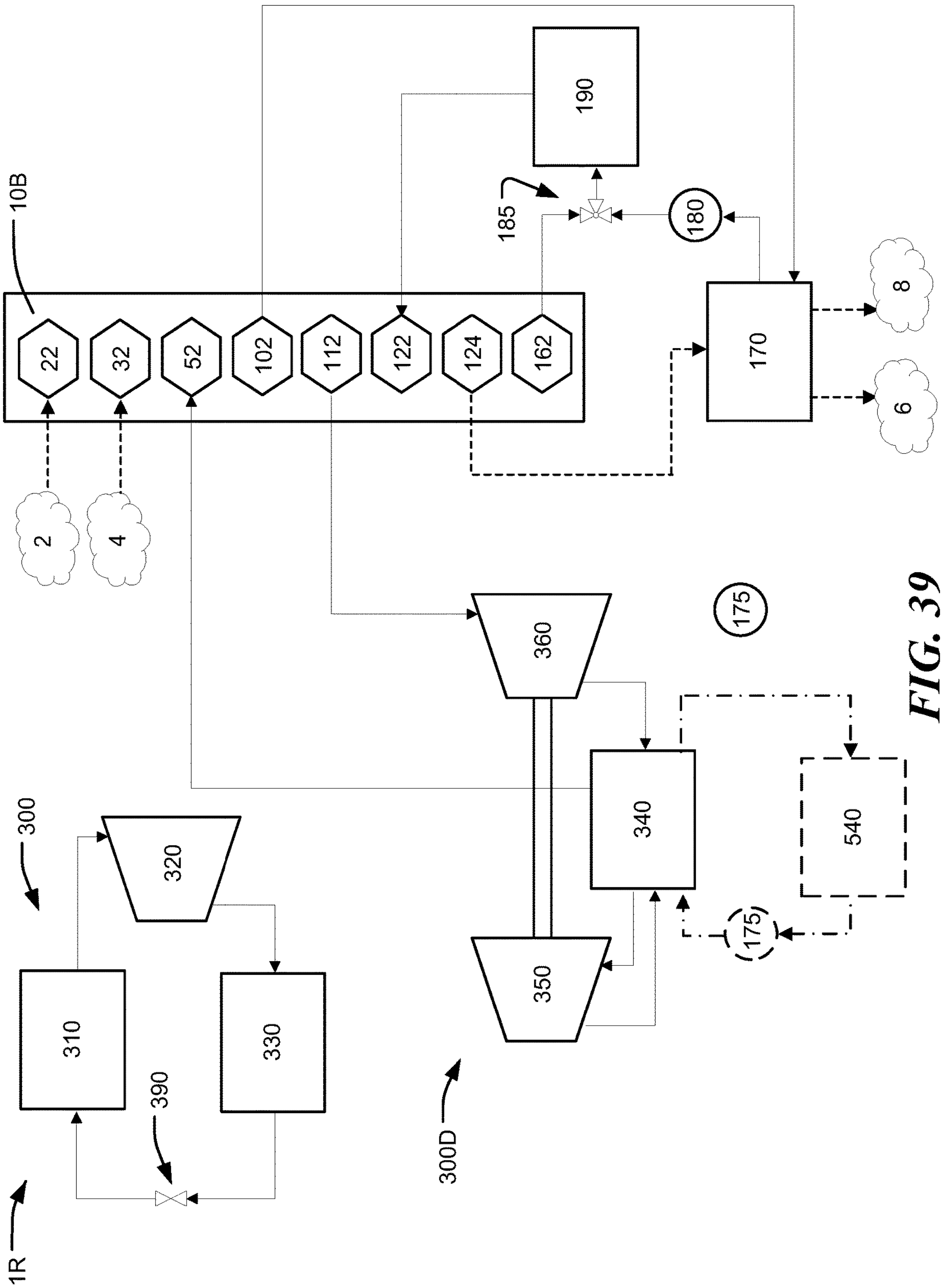
FIG. 39 is a block diagram of an exemplary power plant including the partial base power plant of FIG. 3 along with a carbon capture system and uses the heat recovery steam generator and a vapor compression heat pump operated with a refrigerant for hot and cold storage, respectively, during a charging mode.

FIG. 38 illustrates a discharging mode of the tiered vapor compression heat pump 300C of power plant 1Q. During discharge, the ambient air 4 is directed through the cold storage unit 310 to reduce its temperature before entering the inlet 32 of the compressor. Also, the flue gas leaves the exit 124 of the low-pressure economizer 120 and flows through the preheater 190 where it cools off on its way to the cold storage unit 310. In the cold storage unit 310, the flue gas temperature is further reduced and it is routed to the carbon capture system 170. Some of the water in the carbon capture system 170 is pumped by pump 175 to the hot storage unit 340 where it absorbs heat to assist in the solvent regeneration upon its return to the carbon capture system 170.

FIGS. 39-46 disclose various power plants having heat recovery steam generators with steam extraction for storage integrated with the partial base power plant 10B or 10C. FIG. 27 illustrates a power plant 1R having a steam extraction heat pump 300D and a vapor compression heat pump 300 in a charging mode that use steam and a refrigerant as the working fluids and include the hot and cold storage units 340, 310. The power plant 1R includes the heat pump 300 which operates in the same manner as in power plant 1L shown in FIG. 27, for example. In addition, all fluid pathways entering or leaving the carbon capture system 170 and the preheater 190 are substantially the same as at least those in the power plant 1L.

The power plant 1R includes the partial base power plant 10B, which, as mentioned above and shown in FIG. 3, is substantially the same as the power plant 10 except that the valve 195 is positioned between the high pressure pump 140 and the high pressure heat exchanger 50, which has a third input for receiving water at the inlet 52 of the pump 55 from the hot storage unit 340. In addition, some of the steam leaving the low-pressure steam turbine 110 before entering the condenser 150 is routed to the inlet 112 of the compressor 360. Referring back to FIG. 39, after the steam is compressed by the compressor 360 its temperature and pressure increases. Next, the steam enters the hot storage unit 340 where the steam transfers heat to the hot storage unit 340. The steam is then routed to the compressor 350 where it is further compressed resulting in a higher temperature pressure. After leaving the compressor 350, the steam returns to the hot storage unit 340, where heat is again transferred from the steam to the hot storage unit 340. The steam is then routed to the pump inlet 52.

Figure 40:
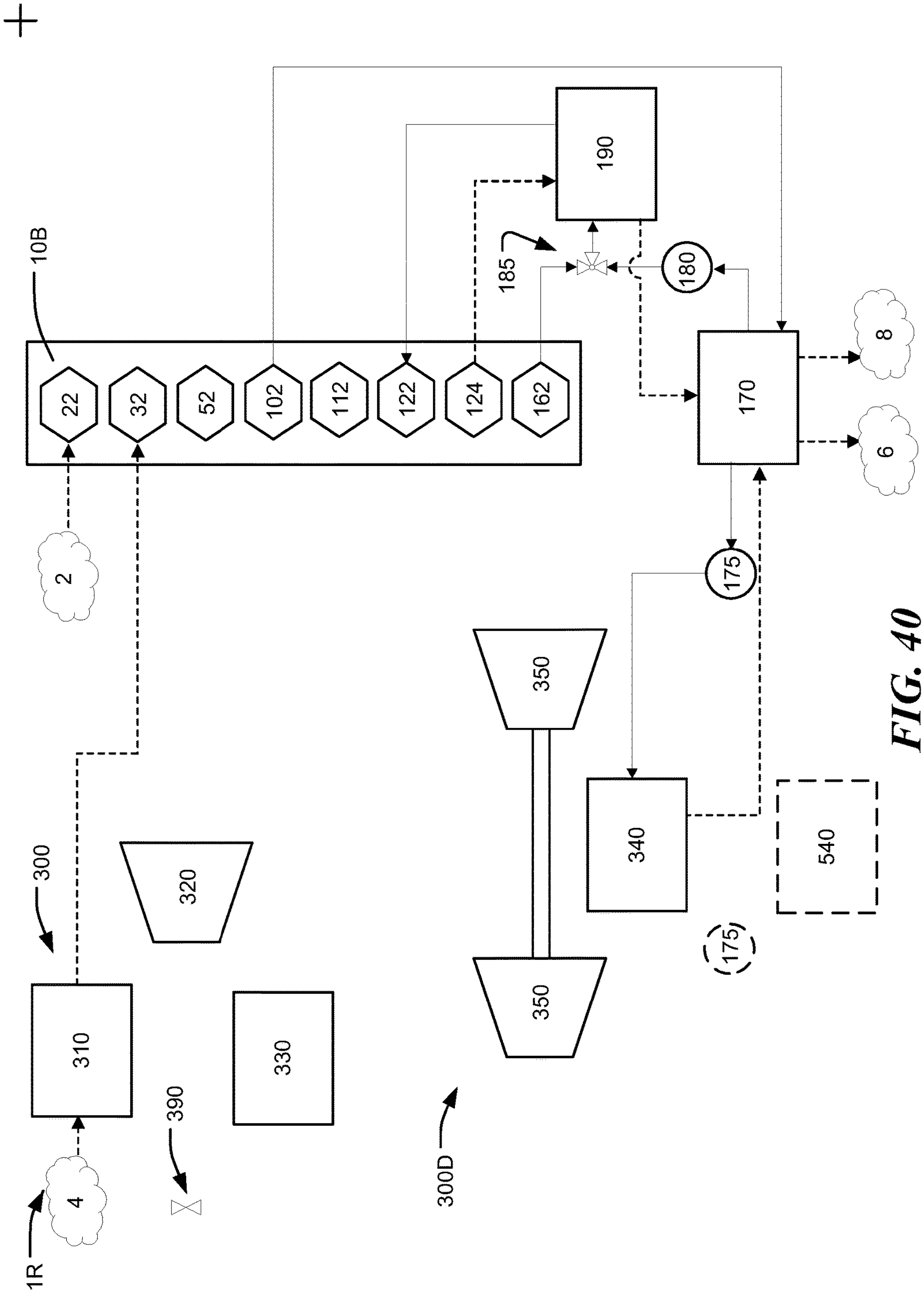
FIG. 40 is a block diagram of the power plant of FIG. 39 during a discharging mode.

FIG. 40 illustrates a discharging mode of the steam extraction heat pump 300D and the vapor compression heat pump 300 of the power plant 1R. During discharge, the flue gas is routed through the preheater 190 before entering the carbon capture system 170 in a similar manner as the power plant 1L as shown in FIG. 28. In addition, water from the carbon capture system 170 is pumped by pump 175 through the hot storage unit 340 where it absorbs heat therefrom for solvent regeneration.

Figure 41:
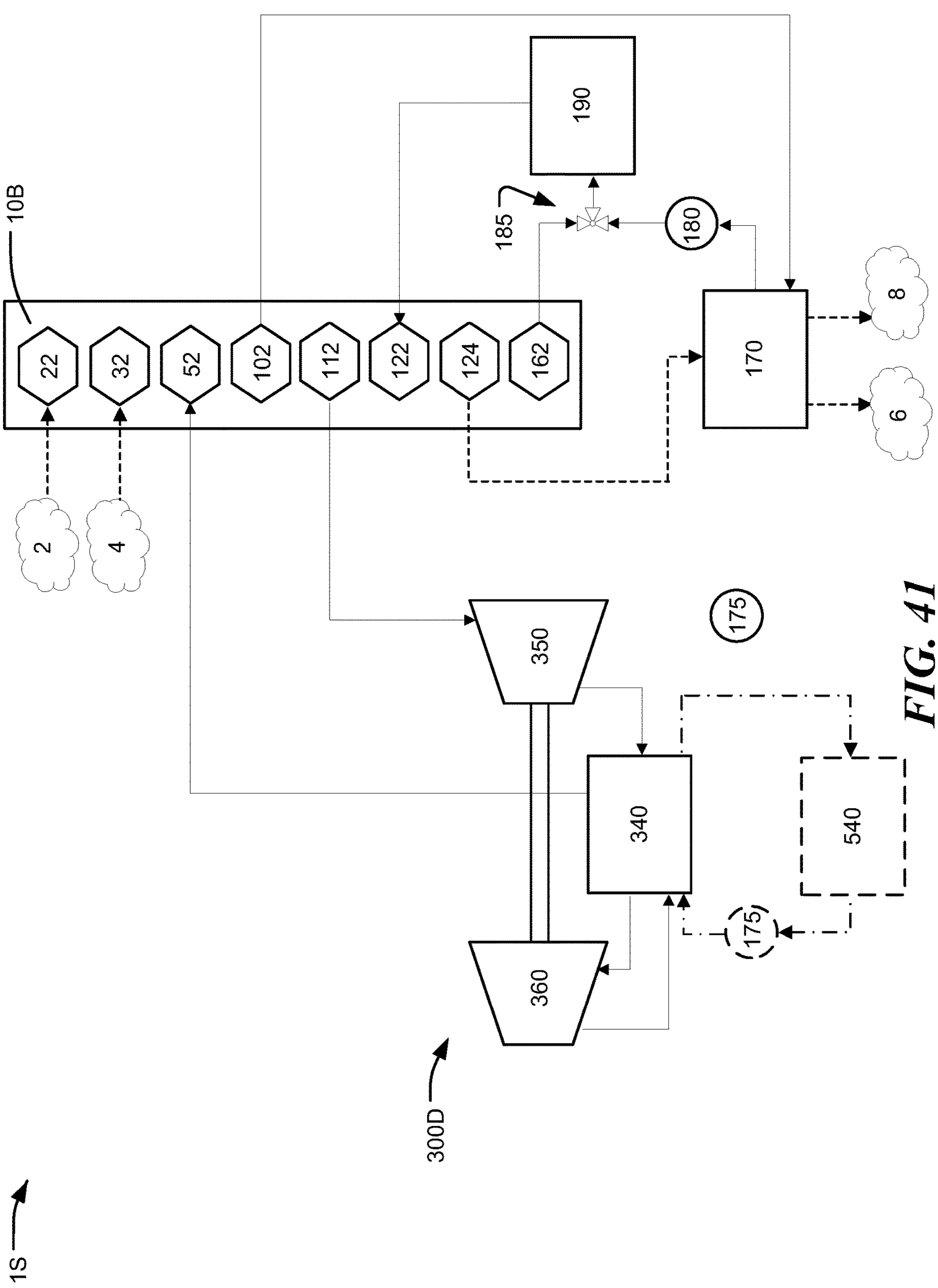
FIG. 41 is a block diagram of an exemplary power plant including the partial base power plant of FIG. 3 along with a carbon capture system and uses compressed steam from the heat recovery steam generator for hot storage during a charging mode.
Figure 42:
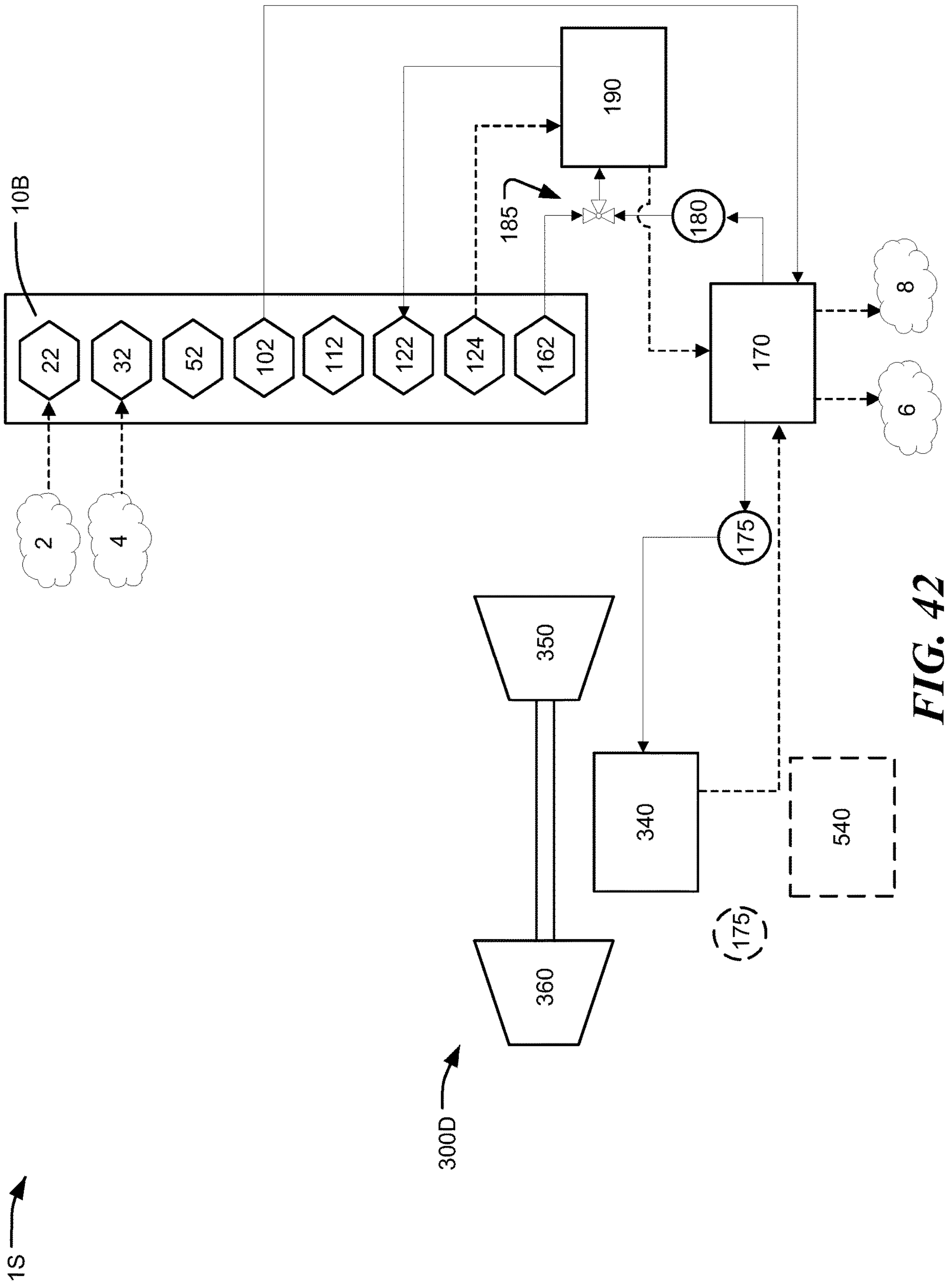
FIG. 42 is a block diagram of the power plant of FIG. 41 during a discharging mode.

FIGS. 41 and 42 illustrate respective charging and discharging modes of a power plant 1S having a steam extraction heat pump 300D that uses steam as the working fluid and includes the hot storage unit 340. The power plant 1S is nearly identical to power plant 1R, but without the vapor compression heat pump 300. The steam extraction pump 300D operates as describe above and also shown in FIGS. 39 and 40.

Figure 43:
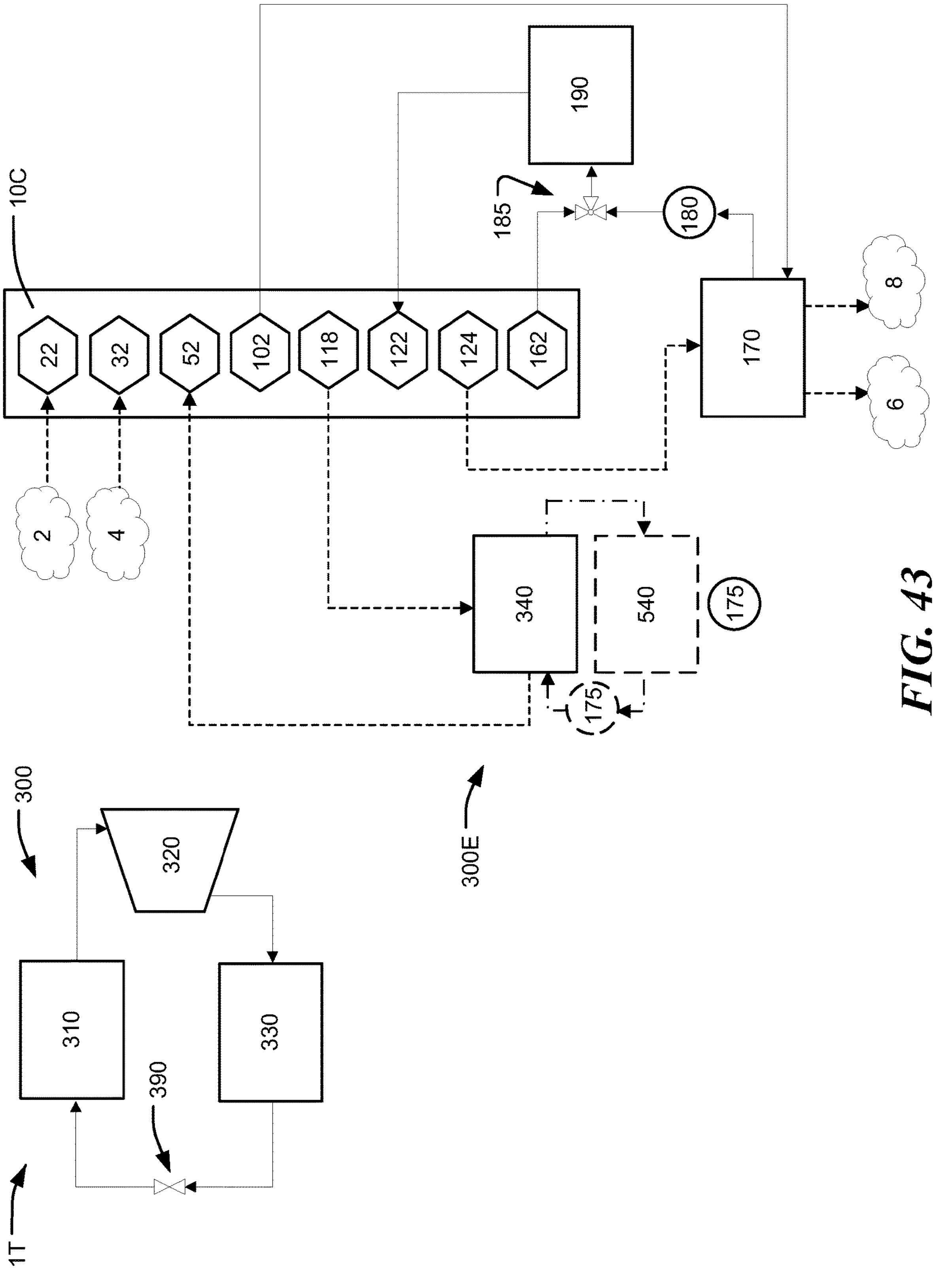
FIG. 43 is a block diagram of an exemplary power plant including the partial base power plant of FIG. 4 along with a carbon capture system and uses compressed steam from the heat recovery steam generator and a vapor compression heat pump operated with a refrigerant for hot and cold storage, respectively, during a charging mode.

FIG. 43 illustrates a power plant 1T having a steam extraction system 300E and a vapor compression heat pump 300 in a charging mode that use steam and a refrigerant as the working fluids and include the hot and cold storage units 340, 310. The power plant 1T includes the heat pump 300 which operates in the same manner as in power plant 1L shown in FIG. 27, for example. In addition, all fluid pathways entering or leaving the carbon capture system 170 and the preheater 190 are substantially the same as at least those in the power plant 1L.

The power plant 1T includes the partial base power plant 10C, which, as mentioned above and shown in FIG. 4, is substantially the same as the power plant 10A except that power plant 10C also includes the valve 195 positioned between the high pressure pump 140 and the high pressure heat exchanger 50 and which has a third input for receiving water at the inlet 52 of the pump 55 from the hot storage unit 340. As discussed above, the power plant 10C also includes the second intermediate pressure steam turbine 116, which may receive water in parallel with the low-pressure steam turbine 110. The second intermediate pressure steam turbine 116 may output water at an exit 118. Referring back to FIG. 43, the steam is routed to the hot storage unit 340 where the steam transfers heat to the hot storage unit 340. The steam is then routed to the pump inlet 52.

Figure 44:
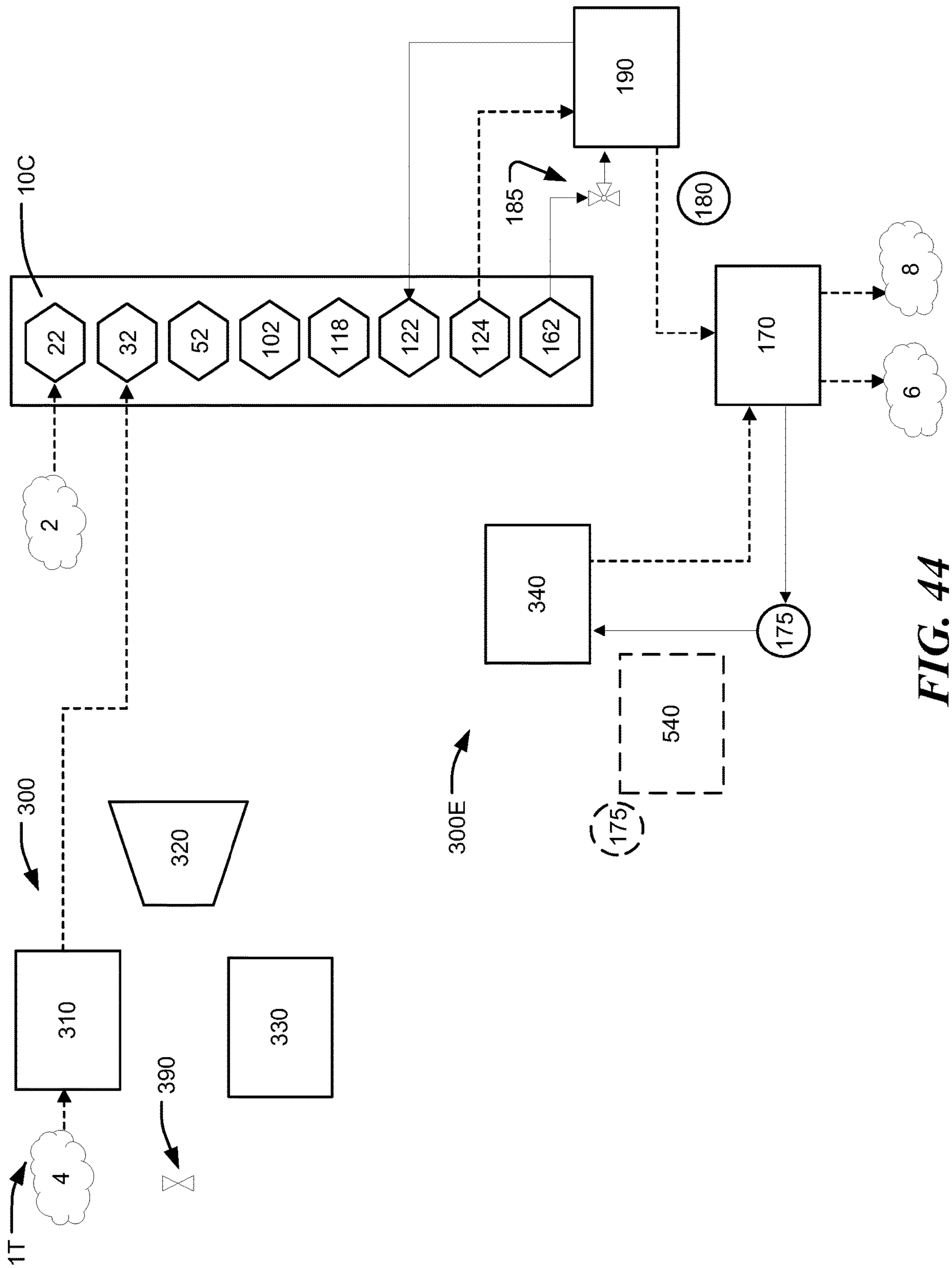
FIG. 44 is a block diagram of the power plant of FIG. 43 during a discharging mode.

FIG. 44 illustrates a discharging mode of the steam extraction system 300E and the vapor compression heat pump 300 of the power plant 1T. During discharge, the flue gas is routed through the preheater 190 before entering the carbon capture system 170 in a similar manner as the power plant 1L as shown in FIG. 28. In addition, water from the carbon capture system 170 is pumped by pump 175 through the hot storage unit 340 where it absorbs heat therefrom for solvent regeneration.

Figure 45:
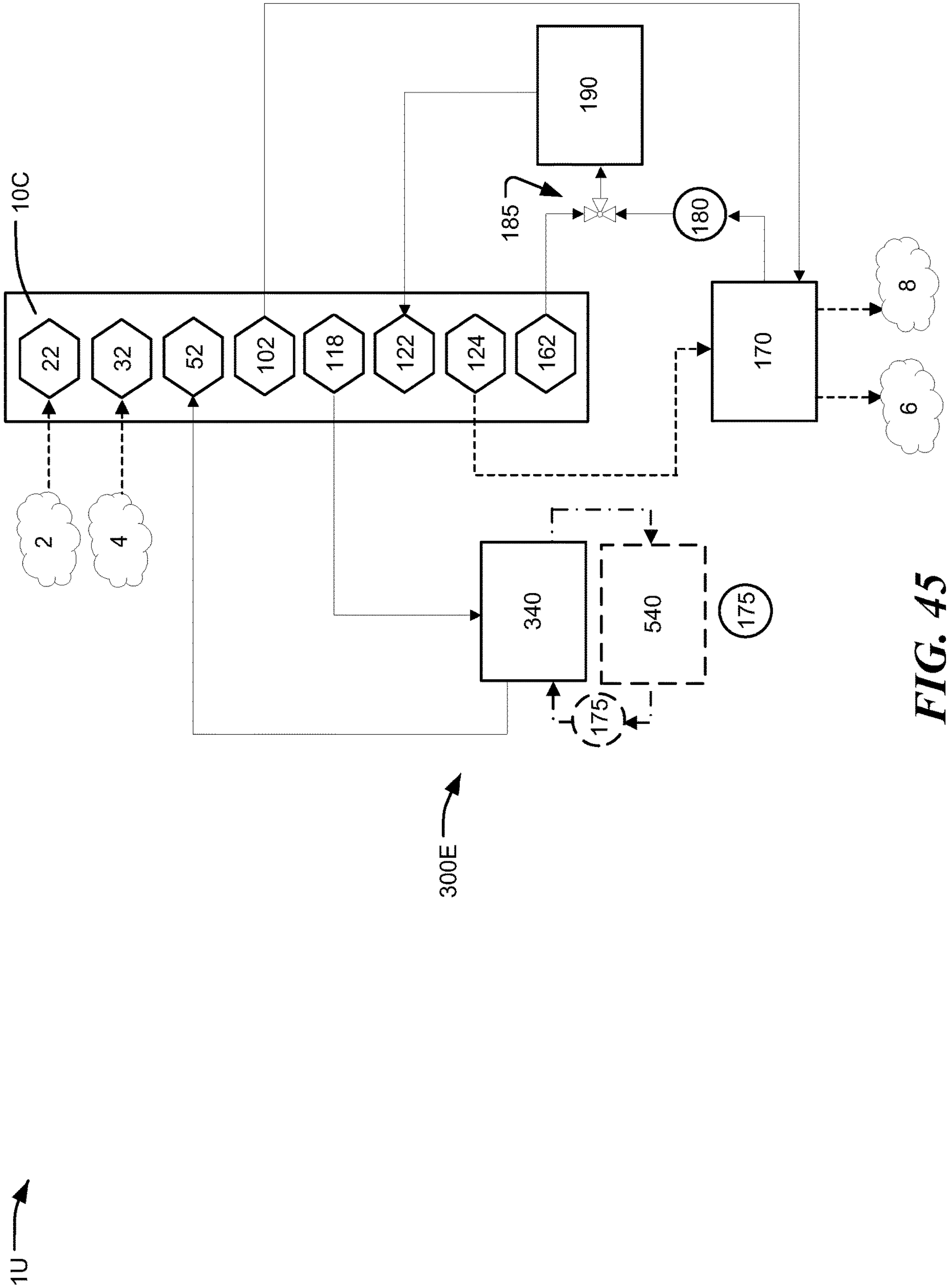
FIG. 45 is a block diagram of an exemplary power plant including the partial base power plant of FIG. 4 along with a carbon capture system and uses compressed steam from the heat recovery steam generator for hot storage during a charging mode.
Figure 46:
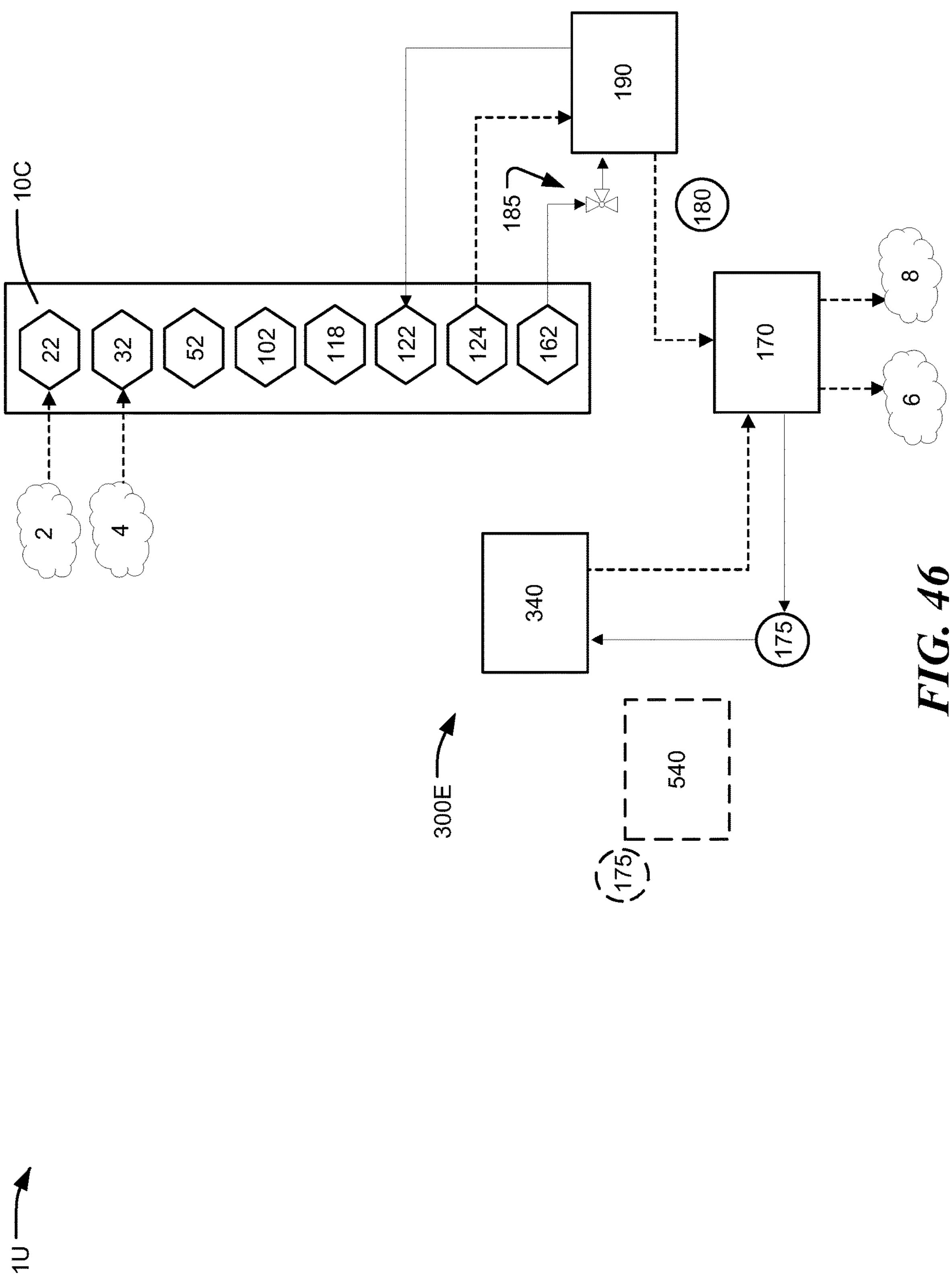
FIG. 46 is a block diagram of the power plant of FIG. 45 during a discharging mode.

FIGS. 45 and 46 illustrate respective charging and discharging modes of a power plant 1U having a steam extraction system 300E that uses steam as the working fluid and includes the hot storage unit 340. The power plant 1U is nearly identical to power plant 1T, but without the vapor compression heat pump 300. The steam extraction system 300E operates as describe above and also shown in FIGS. 43 and 44.

As discussed briefly above, the power plant systems 1-1U may store or charge their thermal storage system with thermal energy when demand and electricity costs are low and release the thermal energy to the carbon capture systems when the demand and electricity costs are high. In more detail, the power plant systems 1-1U may operate in three different modes (charging, discharging, bypass) depending on which mode produces the greatest economic benefit to the system. Each power plant system 1-1U may operate within an electricity market with set electricity price profiles. Electricity price profiles typically vary throughout the day with low electricity prices correlating to low electricity demand and high electricity prices correlating to high electricity demand. As such, the power plant systems 1-1U can use arbitrage techniques to create the most profit. To perform this arbitrage, the power plant systems 1-1U use excess electricity to generate and store thermal energy when electricity prices are low and discharge the thermal energy to output more electricity to the grid when electricity prices are high. However, the power plant systems 1-1U may have a breakeven electricity price that is the minimum electricity price that it can operate while generating revenue. Therefore, if the electricity price is slightly above the breakeven price, then the power plant may enter the charging operation mode to store electricity as thermal energy for later use. When electricity prices are well above the breakeven price then the power plant systems 1-1U may enter the discharging operation mode to output maximum electricity to the grid while operating the carbon capture system. When the electricity price is somewhere between these two prices, then the power plant systems 1-1U may operate in bypass mode, which does not charge or discharge the thermal storage units.

Figure 47:
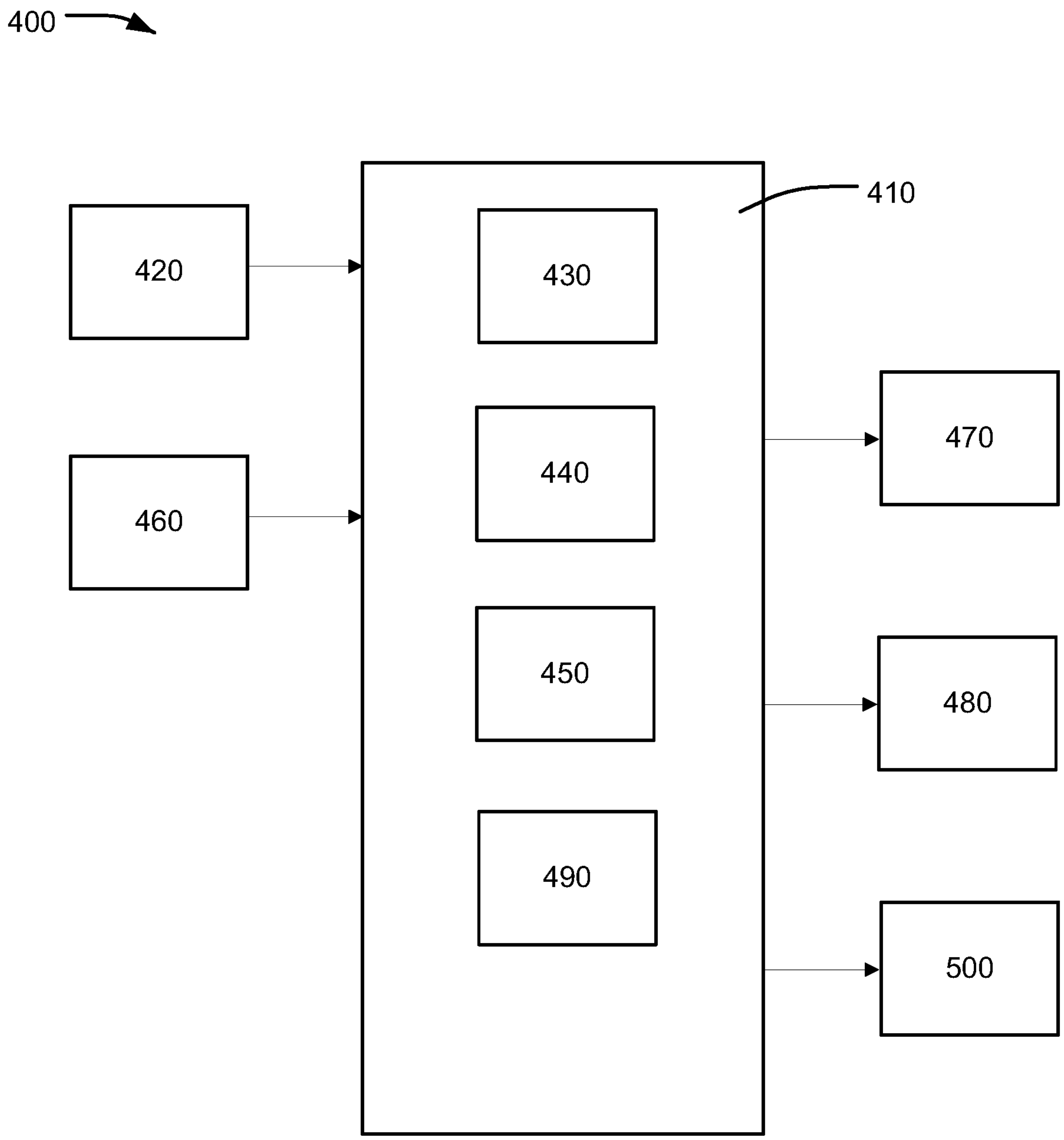
FIG. 47 is a block diagram of a power plant controller during operation of the power plant.

FIG. 47 shows the basic operation of a controller 410 in any of the power plant systems 1-1U. In operation, the controller 410 of one of the power plant systems 1-1U may determine when the power plant systems 1-1U begins generating electricity, begin the charging mode, begin the discharging mode, and begin the bypass mode. The controller 410 may include a processor or general computing device and may include personal computers, laptops, server computers, network PCs, mainframe computers, or similar devices. This determination may be made by receiving a predetermined price schedule 420 at least one day in advance. The price schedule 420 may be received electronically or may be manually programmed into the controller 410. Based on the price schedule, the controller 410 can determine the breakeven point 430 and when to begin generating electricity 440. The controller 410 may determine when to begin the charging mode 450, based on whether the price of electricity is above the breakeven point. If it determines that it is economically favorable for the power plant systems 1-1U to operate in the charging mode, it may send instructions 470 to the various components in the above-mentioned charging cycles to begin charging. This may include powering one or more compressor with electrical energy, opening or closing one or more valves to route fluid to the changing components shown in the figures. The controller 410 may determine when to switch to bypass mode 450, based on whether the thermal storage system is at or near full capacity. The controller 410 may calculate the time period when the thermal storage system will be at full capacity or it may receive a signal 460 from the thermal storage system indicating the charge level. When switching from the charging mode to the bypass mode, the controller 410 may send instructions 480 to the charging components to shut down charging compressor or pumps or reroute the fluids back to normal operation. The controller 410 may determine when to begin the discharging mode 490, based on when it will maximize the price of electricity over the discharge period. When the switching from the bypass mode to the discharging mode, the controller 410 may send instructions 500 to the various components in the above-mentioned discharging cycles to begin discharging. This may include opening or closing one or more valves to route fluid to the discharging components shown in the figures. Although switching operation modes may be performed by a controller as described, it may also be performed manually. One having ordinary skill in the art would understand the details of the processes involved with switching from mode to mode.

It should be understood from the foregoing that, while particular aspects have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A power plant system configured to generate electricity, the power plant system comprising:

a carbon-based fuel-fired power plant including a combustor configured to receive and combust air and a carbon-based fuel thereby producing heat and exhausting a flue gas, and a turbine configured to generate electricity;

a carbon capture system configured to remove at least a portion of carbon-based gasses from the flue gas downstream from the combustor; and a thermal storage system including a hot storage unit configured to store heat generated at least by resistively-heated gas at a hot temperature, wherein the thermal storage system includes a resistive heater configured to heat the gas, and a blower configured to circulate the heated gas from the resistive heater to the hot storage unit, and wherein the heated gas transfers heat to the hot storage unit, the hot temperature greater than ambient temperature;

wherein the power plant is configured to operate in at least a first mode for storing thermal energy in the thermal storage system and a second mode for releasing the stored thermal energy from the thermal storage system; and wherein during the second mode, thermal energy stored in the hot storage unit is used for solvent regeneration in the carbon capture system.

2. The power plant system of claim 1, wherein the resistively-heated gas is generated by the resistive heater powered by electricity from a power grid.

3. The power plant system of claim 1, wherein the thermal storage system includes a cold storage unit configured to store thermal energy at a cold temperature, the cold temperature less than ambient temperature; and wherein during the second mode, before the air is combusted in the combustor the air is configured to transfer heat to the cold storage unit thereby lowering the temperature of the air received in the combustor.

4. The power plant system of claim 3, wherein the thermal storage system includes a first heat pump using a refrigerant as a first working fluid and a second heat pump using a second refrigerant as a second working fluid; and wherein the first refrigerant is configured to transfer heat from the cold storage unit and the second refrigerant is configured to transfer heat to the hot storage unit.

5. The power plant system of claim 4, wherein the second refrigerant is steam.

6. The power plant system of claim 1, wherein the thermal storage system includes a heat pump configured to use the flue gas as a working fluid.

7. The power plant system of claim 1, wherein the thermal storage system includes a heat pump configured to use the air as a working fluid.

8. The power plant system of claim 7, wherein the flue gas is configured to transfer heat to the air in the heat pump during the first mode.

9. The power plant system of claim 1, wherein the thermal storage system includes a heat pump configured to use steam as a working fluid.

10. The power plant system of claim 7, wherein the flue gas is configured to transfer heat to the steam in the heat pump during the first mode but not in the second mode.

11. The power plant system of claim 7, further comprising a heat recovery steam generator including at least one heat exchanger and at least one steam turbine, the at least one heat exchanger configured to receive the flue gas and transfer heat from the flue gas to a fluid of the heat recovery steam generator before the fluid of the heat recovery steam generator enters the at least one steam turbine.

12. The power plant system of claim 11, wherein the fluid of the heat recovery steam generator is configured to transfer heat to the steam in the heat pump during the first mode.

13. The power plant system of claim 11, wherein the fluid of the heat recovery steam generator is configured to be the working fluid.

14. The power plant system of claim 11, wherein the fluid of the heat recovery steam generator is configured to transfer heat to the hot storage unit during the first mode.

15. A method of operating the power plant system of claim 1, the method comprising:

generating, with the power plant system from claim 1, the electricity to be supplied to a power grid;

determining, with a controller, when to begin the first mode for temporarily storing thermal energy with the thermal storage system;

determining, with the controller, when to begin the second mode for transferring heat from the hot storage unit to the carbon capture system; and transferring, during the second mode, heat from the hot storage unit to the carbon capture system.

16. The method of claim 15, further including resistively-heating the gas with the resistive heater powered by electricity from the power grid.

* * * * *